(12) United States Patent
Kim et al.

(10) Patent No.: US 12,646,412 B2
(45) Date of Patent: *Jun. 2, 2026

(54) IMAGE CAPTURING APPARATUS OF VEHICLE, SERVER, USER TERMINAL APPARATUS AND METHOD FOR PROVIDING PARKING LOT GUIDANCE SERVICE USING THEM

(71) Applicant: THINKWARE CORPORATION, Seongnam-si (KR)

(72) Inventors: Jae Young Kim, Seongnam-si (KR); Seung Yo Jang, Seongnam-si (KR); Jae Cheol Han, Seongnam-si (KR); Tae Kyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 2 days.

This patent is subject to a terminal disclaimer.

(21) Appl. No.: 18/765,565

(22) Filed: Jul. 8, 2024

(65) Prior Publication Data

US 2024/0363007 A1 Oct. 31, 2024

Related U.S. Application Data

(63) Continuation of application No. 17/496,049, filed on Oct. 7, 2021, now Pat. No. 12,033,508.

(30) Foreign Application Priority Data

Oct. 8, 2020 (KR) ........................ 10-2020-0130436
Oct. 7, 2021 (KR) ........................ 10-2021-0133505

(51) Int. Cl.
*G08G 1/14* (2006.01)
*G06T 17/05* (2011.01)
(Continued)

(52) U.S. Cl.
CPC ............... *G08G 1/14* (2013.01); *G06T 17/05* (2013.01); *G06V 20/586* (2022.01); *G08G 1/017* (2013.01); *G06T 2207/30264* (2013.01)

(58) Field of Classification Search
CPC ........... G08G 1/14; G08G 1/017; G08G 1/16; G08G 1/205; G08G 1/144; G08G 1/146;
(Continued)

(56) References Cited

U.S. PATENT DOCUMENTS 10,755,571 B1 8/2020 Eather et al.
12,033,508 B2 * 7/2024 Kim ...................... G08G 1/144
2021/0319697 A1 10/2021 Higuchi et al.

FOREIGN PATENT DOCUMENTS

KR 10-2017-0000091 A 1/2017
KR 10-2019-0084916 A 7/2019

* cited by examiner

*Primary Examiner* — Daryl C Pope
(74) *Attorney, Agent, or Firm* — WHDA, LLP

(57) ABSTRACT

Disclosed herein is a method for providing a parking lot guidance service of a server. The method includes: receiving parking lot data including information of a parking space in a parking lot from an image capturing apparatus for a vehicle provided in the vehicle; generating a parking lot model representing a real-time parking situation of the parking lot as an image based on the received parking lot data; and providing the parking guidance service to a user terminal apparatus using the generated parking lot model.

20 Claims, 26 Drawing Sheets

1000

(51) Int. Cl.
    *G06V 20/58*          (2022.01)
    *G08G 1/017*          (2006.01)

(58) Field of Classification Search
    CPC .................... G08G 1/143; G06T 17/05; G06T
                        2207/30264; G06V 20/586; G06V 10/82
    See application file for complete search history.

<u>1000</u>

<u>100</u>

175

| | |
|---|---|
| Parking lot location information generator | 175-1 |
| Parking space information generator | 175-2 |
| Parked vehicle information generator | 175-3 |
| Own vehicle location information generator | 175-4 |
| AI processor | 175-5 |

FIG. 4

Parking lot image   12

30

Prediction result   32

QR code 0.96

Sticker 0.02

Text 0.01

FIG. 25
Autonomous parking service request
(2502)
Autonomous parking is completed
Parking in third space of B3 34 area is completed
(2504)
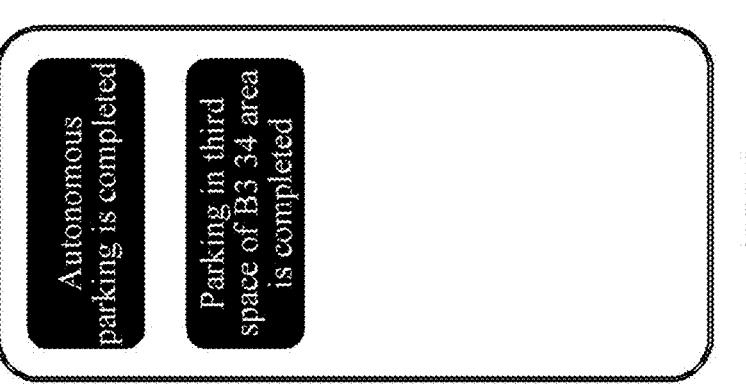
Hailing location selection is completed
(2506)
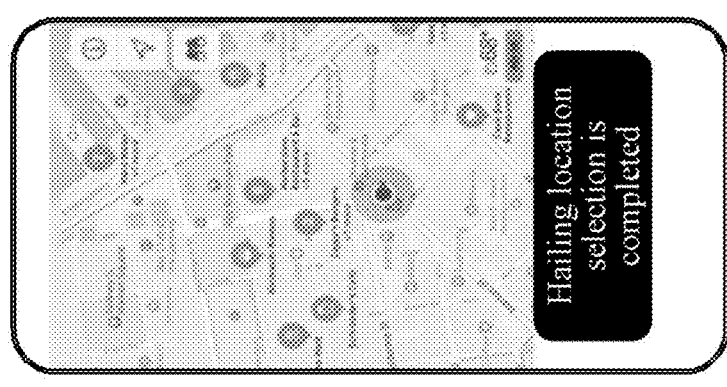

FIG. 26

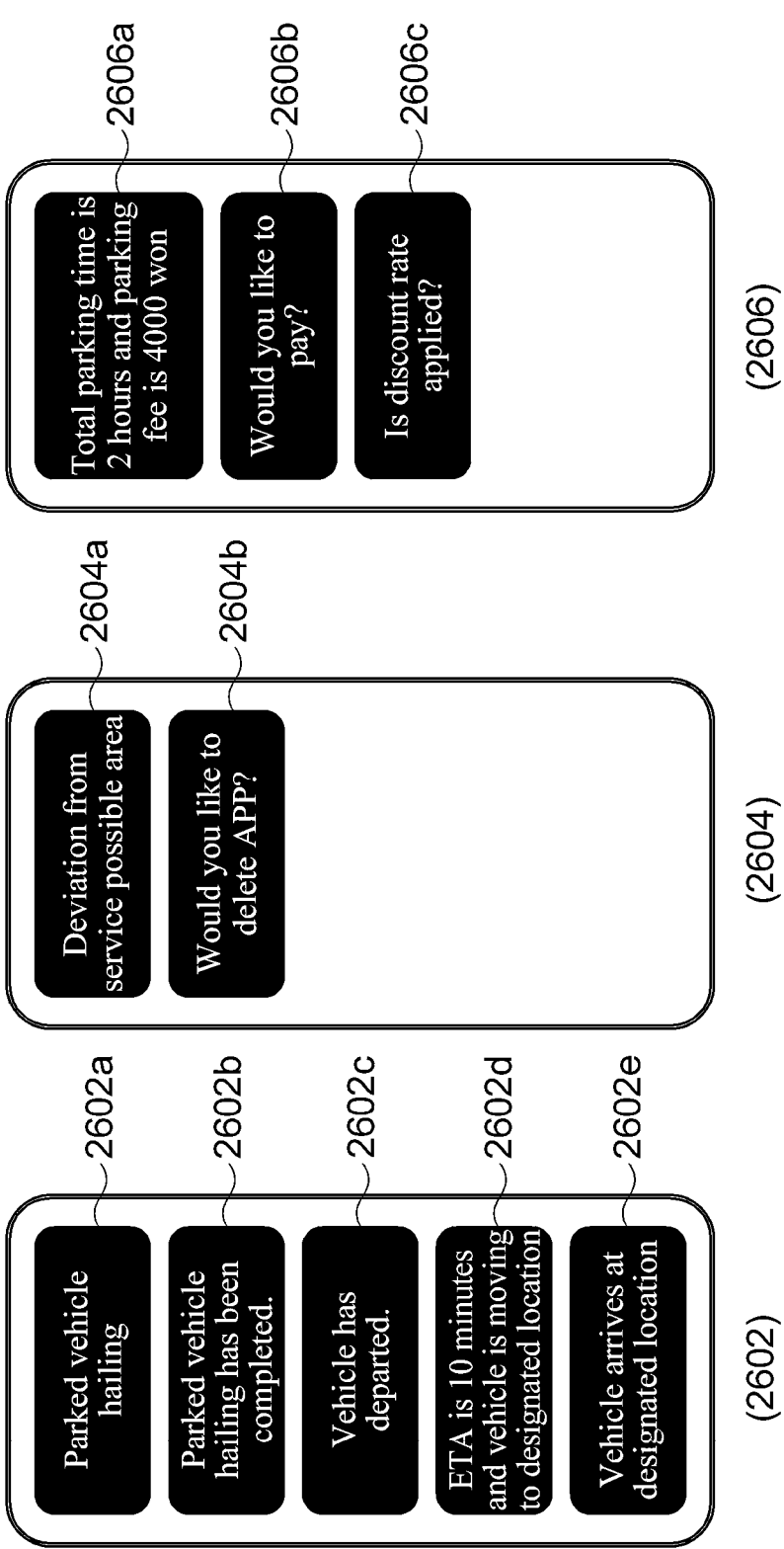

2606a — Total parking time is 2 hours and parking fee is 4000 won
2606b — Would you like to pay?
2606c — Is discount rate applied?

(2606)

2604a — Deviation from service possible area
2604b — Would you like to delete APP?

(2604)

2602a — Parked vehicle hailing
2602b — Parked vehicle hailing has been completed.
2602c — Vehicle has departed.
2602d — ETA is 10 minutes and vehicle is moving to designated location
2602e — Vehicle arrives at designated location (2602)

IMAGE CAPTURING APPARATUS OF VEHICLE, SERVER, USER TERMINAL APPARATUS AND METHOD FOR PROVIDING PARKING LOT GUIDANCE SERVICE USING THEM

CROSS-REFERENCE TO RELATED APPLICATION(S)

This application is a continuation application of Ser. No. 17/496,049 filed on Oct. 7, 2021, which claims benefit of priority to Korean Patent Application No. 10-2020-0130436 filed on Oct. 8, 2020 and Korean Patent Application No. 10-2021-0133505 filed on Oct. 7, 2021 in the Korean Intellectual Property Office, the disclosure of which is incorporated herein by reference in its entirety.

BACKGROUND

1. Field

The present invention relates to an image capturing apparatus for a vehicle, a server, a user terminal apparatus, and a method for providing a parking lot guidance service using them.

2. Description of Related Art

As vehicles have become general means of transportation, the vehicles have become indispensable for persons living in modern society, and the number of owners who own vehicles has gradually increased.

Accordingly, the importance of a parking space for parking the vehicles has also increased, and a parking lot having a large number of parking spaces has been indispensably provided in large buildings such as department stores, government offices, or apartments or parking garages.

Accordingly, various management technologies for providing a more efficient parking service to drivers have been developed.

Conventionally, in order to determine a parking possible area of the parking lot, a method for counting the number of vehicles entering and exiting from the parking lot and a method for installing an infrared sensor in each parking area have been used.

However, according to the conventional method, it is difficult for the driver to accurately grasp the number of parking possible floors or parking possible locations, and thus, the driver should wander about an empty parking area for each floor in order to park the vehicle, which is inconvenient.

In addition, the driver who has parked the vehicle has memorized a parking location or has recorded an approximate parking location of the vehicle by a photograph obtained by photographing the surrounding of the parking location. However, in such methods, the driver should bring back his/her memory or confirm a stored photograph, which is inconvenient, and it is difficult for the driver to grasp an accurate parking location, such that the driver wanders about the parking location, which is inconvenient.

Accordingly, the necessity for a parking lot guidance service for improving convenience of a user before and after parking the vehicle has increased.

SUMMARY

An object of the present invention is to generate a parking lot model representing a real-time situation of a parking lot as an image using an image captured from an image capturing apparatus for a vehicle and provide a parking lot guidance service to a user terminal apparatus based on the generated parking lot model.

According to an aspect of the present invention, a method for providing a parking lot guidance service of an image capturing apparatus for a vehicle may include: obtaining a parking lot image according to image capturing; generating parking lot data including information of a parking space in a parking lot using the parking lot image; and transmitting the generated parking lot data to a server for providing a parking lot guidance service, wherein the parking lot data is used to generate a parking lot model for service provision in the server for providing a parking lot guidance service.

The generating of the parking lot data may include: recognizing a location identifier making a location of the parking space in the parking lot identifiable and a parked vehicle parked in the parking space from the parking lot image; generating location information of the parking space based on the recognized location identifier; and generating information on whether or not the vehicle has been parked in a parking slot included in the parking space according to a location of the recognized parked vehicle.

The generating of the parking lot data may further include generating parked vehicle information including at least one of vehicle type information and vehicle number information for the recognized parked vehicle, and the parked vehicle information may be generated separately for each of a plurality of parking slots constituting the parking space.

The method for providing a parking lot guidance service may further include determining whether or not the parking lot data needs to be updated by sensing a change in the parking lot image as a parked vehicle exits from a parking slot included in the parking space or another vehicle enters a parking slot included in the parking space.

The method for providing a parking lot guidance service may further include: determining whether or not an impact event has occurred in a parked vehicle parked in the surrounding of an own vehicle; updating the parking lot data when it is determined that the impact event has occurred in the parked vehicle; and transmitting the updated parking lot data to the server for providing a parking lot guidance service, wherein the updated parking lot data includes data a predetermined time before and after an occurrence point in time of the impact event.

According to another aspect of the present invention, an image capturing apparatus for a vehicle may include: a communication unit; an image capturing unit obtaining a parking lot image according to image capturing; a parking lot data generation unit generating parking lot data including information of a parking space in a parking lot using the parking lot image; and a control unit controlling the communication unit to transmit the generated parking lot data to a server for providing a parking lot guidance service, wherein the parking lot data is used to generate a parking lot model for service provision in the server for providing a parking lot guidance service.

The parking lot data generation unit may include: an image processor recognizing a location identifier making a location of the parking space in the parking lot identifiable and a parked vehicle parked in the parking space from the parking lot image; and a parking lot location information generator generating location information of the parking space based on the recognized location identifier and generating information on whether or not the vehicle has been parked in a parking slot included in the parking space according to a location of the recognized parked vehicle.

The parking lot data generation unit may further include: a parked vehicle information generator generating parked vehicle information including at least one of vehicle type information and vehicle number information for the recognized parked vehicle, and the parked vehicle information may be generated separately for each of a plurality of parking slots constituting the parking space.

The control unit may determine whether or not the parking lot data needs to be updated by sensing a change in the parking lot image as a parked vehicle exits from a parking slot included in the parking space or another vehicle enters a parking slot included in the parking space.

The control unit may determine whether or not an impact event has occurred in a parked vehicle parked in the surrounding of an own vehicle, control the parking lot data generation unit to update the parking lot data when it is determined that the impact event has occurred in the parked vehicle, and control the communication unit to transmit the updated parking lot data to the server for providing a parking lot guidance service, and the updated parking lot data may include data a predetermined time before and after an occurrence point in time of the impact event.

According to still another aspect of the present invention, a method for providing a parking lot guidance service of a server includes: receiving parking lot data including information of a parking space in a parking lot from an image capturing apparatus for a vehicle provided in the vehicle; generating a parking lot model representing a real-time parking situation of the parking lot as an image based on the received parking lot data; and providing the parking guidance service to a user terminal apparatus using the generated parking lot model.

The information of the parking space may include location information of the parking space and information on whether or not a vehicle has been parked in a parking slot constituting the parking space, and the generating of the parking lot model may include: determining a location of the parking space in the parking lot based on the location information of the parking space; determining whether or not to dispose a vehicle model in the parking slot based on the information on whether or not the vehicle has been parked in the parking slot; and generating a parking lot model in which the vehicle model is disposed in the parking slot according to a determination result.

The parking lot data may include parked vehicle information including at least one of type information of a parked vehicle and number information of the parked vehicle, and the generating of the parking lot model may further include: generating a vehicle model reflecting at least one of a license plate and a vehicle type based on the parked vehicle information.

The generated parking lot model may be a three-dimensional (3D) model.

The method for providing a parking lot guidance service may further include updating the generated parking lot model, wherein in the updating, the parking lot model is updated by extracting only a difference portion between the generated parking lot model and a subsequently generated parking lot model and reflecting only the extracted difference portion.

The providing of the parking guidance service may include: detecting the parking lot model and the parking lot data corresponding to a parking lot in which a vehicle of a user of the user terminal apparatus that has accessed the server is parked; and providing at least one of a parking possible location guidance service, a vehicle parking location guidance service, and a parking lot route guidance service to the user terminal apparatus using the detected parking lot model and parking lot data.

The providing of the parking guidance service may include: transmitting a first vehicle impact event occurrence notification to an image capturing apparatus for a vehicle of a second vehicle located in the surrounding of a first vehicle parked in the parking lot when an impact event occurs in the first vehicle; receiving parking data from the image capturing apparatus for a vehicle of the second vehicle according to the notification; generating impact information on an impact situation of the first vehicle based on the parking data from the image capturing apparatus for a vehicle of the second vehicle; and providing a parking impact event guidance service based on the generated impact information.

According to yet still another aspect of the present invention, a server for providing a parking lot guidance service includes: a communication unit receiving parking lot data including information of a parking space in a parking lot from an image capturing apparatus for a vehicle provided in the vehicle; a parking lot model generation unit generating a parking lot model representing a real-time parking situation of the parking lot as an image based on the received parking lot data; and a control unit providing the parking guidance service to a user terminal apparatus using the generated parking lot model.

The information of the parking space may include location information of the parking space and information on whether or not a vehicle has been parked in a parking slot constituting the parking space, and the parking lot model generation unit may determine a location of the parking space in the parking lot based on the location information of the parking space, determine whether or not to dispose a vehicle model in the parking slot based on the information on whether or not the vehicle has been parked in the parking slot, and generate a parking lot model in which the vehicle model is disposed in the parking slot according to a determination result.

The parking lot data may include parked vehicle information including at least one of type information of a parked vehicle and number information of the parked vehicle, and the parking lot model generation unit may generate a vehicle model reflecting at least one of a license plate and a vehicle type based on the parked vehicle information.

The generated parking lot model may be a 3D model.

The parking lot model generation unit may update the parking lot model by extracting only a difference portion between the generated parking lot model and a subsequently generated parking lot model and reflecting only the extracted difference portion.

The control unit may detect the parking lot model and the parking lot data corresponding to a parking lot in which a vehicle of a user of the user terminal apparatus that has accessed the server is parked, and provide at least one of a parking possible location guidance service, a vehicle parking location guidance service, and a parking lot route guidance service to the user terminal apparatus using the detected parking lot model and parking lot data.

The communication unit may transmit a first vehicle impact event occurrence notification to an image capturing apparatus for a vehicle of a second vehicle located in the surrounding of a first vehicle parked in the parking lot when an impact event occurs in the first vehicle and receive parking data from the image capturing apparatus for a vehicle of the second vehicle according to the notification, and the control unit may generate impact information on an impact situation of the first vehicle based on the parking data from the image capturing apparatus for a vehicle of the second vehicle and provide a parking impact event guidance service based on the generated impact information.

According to yet still another aspect of the present invention, a method for providing a parking lot guidance service of a user terminal apparatus may include: accessing a server for providing a parking lot guidance service that provides a parking lot guidance service based on an image capturing apparatus for a vehicle; receiving a parking lot model representing a real-time parking situation of a parking lot as an image and parking lot data from the server for providing a parking lot guidance service; and generating a user interface based on the received parking lot model and parking lot data and displaying the generated user interface, wherein the user interface includes at least one of a parking possible location guidance user interface, a vehicle parking location guidance user interface, a parking lot route guidance user interface, and a parking impact event guidance user interface.

The parking possible location guidance user interface may be an interface that displays parking possible location information of a parking lot in which the user terminal apparatus is located on the parking lot model based on the parking lot data.

The parking lot route guidance user interface may be an interface that displays a route from a current location of a user to a parking location on the parking lot model based on parking location information of the user and location information of the user terminal apparatus in the parking lot.

The vehicle parking location guidance user interface may be an interface that displays parking location information of a user on the parking lot model based on the parking lot data.

The parking impact event guidance user interface may be an interface that displays information on a generated impact situation on the parking lot model based on parking lot data of an image capturing apparatus for a vehicle provided in another vehicle.

According to yet still another aspect of the present invention, a user terminal apparatus may include: a display unit; a communication unit accessing a server for providing a parking lot guidance service that provides a parking lot guidance service based on an image capturing apparatus for a vehicle and receiving a parking lot model representing a real-time parking situation of a parking lot as an image and parking lot data from the server for providing a parking lot guidance service; and a control unit generating a user interface based on the received parking lot model and parking lot data and controlling the display unit to display the generated user interface, wherein the user interface includes at least one of a parking possible location guidance user interface, a vehicle parking location guidance user interface, a parking lot route guidance user interface, and a parking impact event guidance user interface.

The parking possible location guidance user interface may be an interface that displays parking possible location information of a parking lot in which the user terminal apparatus is located on the parking lot model based on the parking lot data.

The parking lot route guidance user interface may be an interface that displays a route from a current location of a user to a parking location on the parking lot model based on parking location information of the user and location information of the user terminal apparatus in the parking lot.

The vehicle parking location guidance user interface may be an interface that displays parking location information of a user on the parking lot model based on the parking lot data.

The parking impact event guidance user interface may be an interface that displays impact information on a generated impact situation on the parking lot model based on parking lot data of an image capturing apparatus for a vehicle provided in another vehicle.

According to yet still another embodiment of the present invention, a computer-readable recording medium may record a program for executing the method for providing a parking lot guidance service described above.

According to yet still another embodiment of the present invention, a program stored in a recording medium may include a program code for executing the method for providing a parking lot guidance service described above.

BRIEF DESCRIPTION OF DRAWINGS

The above and other aspects, features, and advantages of the present disclosure will be more clearly understood from the following detailed description taken in conjunction with the accompanying drawings, in which:

FIG. 4 is a view illustrating a configuration of a neural network according to an embodiment of the present invention;

FIGS. 22A and 22B are flowcharts for describing a flow of operations for providing a vehicle hailing service or a passenger pick-up service of an autonomous driving system according to another embodiment of the present invention;

FIG. 25 is a view illustrating an example of a push notification or a push message displayed on a user terminal apparatus of a user using an autonomous parking service/vehicle hailing service of a vehicle according to another embodiment of the present invention;

FIG. 26 is a view illustrating an example of a push notification or a push message displayed on a user terminal apparatus of a user using an autonomous parking service of a vehicle according to another embodiment of the present invention.

DETAILED DESCRIPTION

Figure 1:
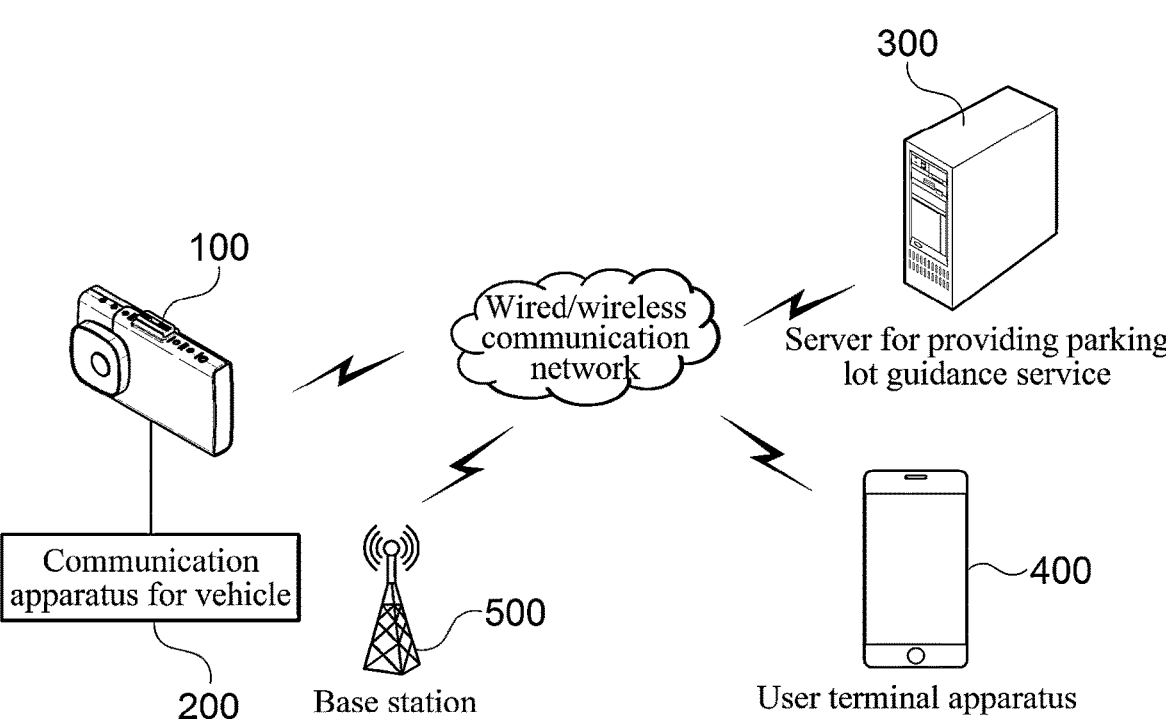
FIG. 1 is a block diagram illustrating a parking lot guidance service system according to an embodiment of the present invention.

The following description illustrates only a principle of the present invention. Therefore, those skilled in the art may implement the principle of the present invention and invent various apparatuses included in the spirit and scope of the present invention although not clearly described in or illustrated the present specification. In addition, it is to be understood that all conditional terms and embodiments mentioned in the present specification are obviously intended only to allow those skilled in the art to understand a concept of the present invention in principle, and the present invention is not limited to embodiments and states particularly mentioned as such.

Further, it is to be understood that all detailed descriptions mentioning specific embodiments of the present invention as well as principles, aspects, and embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flowcharts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, they may be provided by a single dedicated processor, a single shared processor, or a plurality of individual processors, and some of them may be shared with each other.

In addition, it is to be understood that terms mentioned as a processor, control, or a concept similar to the processor or the control are not interpreted to exclusively cite hardware having capability to execute software, and are implicitly include digital signal processor (DSP) hardware and a read only memory (ROM), a random access memory (RAM), and a non-volatile memory for storing software without being limited thereto. The abovementioned terms may also include well-known other hardware.

In the claims of the present specification, components represented as means for performing functions mentioned in a detailed description are intended to include all methods of performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a method demanded by the claims in the present invention defined by the claims, any means capable of providing these functions are equivalent to means recognized from the present specification.

The abovementioned objects, features, and advantages will become more obvious from the following detailed description associated with the accompanying drawings. Therefore, those skilled in the art to which the present invention pertains may easily practice a technical idea of the present invention. Further, in describing the present invention, when it is decided that a detailed description of the well-known technology associated with the present invention may unnecessarily make the gist of the present invention unclear, it will be omitted.

Hereinafter, various embodiments of the present invention will be described in detail with reference to the accompanying drawings.

FIG. 1 is a block diagram illustrating a parking lot guidance service system according to an embodiment of the present invention. Referring to FIG. 1, a parking lot guidance service system 1000 includes an image capturing apparatus 100 for a vehicle, a communication apparatus 200 for a vehicle, a server 300 for providing a parking lot guidance service, a user terminal apparatus 400, and a base station 500.

Such a parking lot guidance service system 1000 may generate a parking lot model representing a real-time situation for a parking lot by using an image captured by the image capturing apparatus 100 for a vehicle, and provide a parking lot guidance service to the user terminal apparatus 400 based on the generated parking lot model.

Here, the parking lot may be a concept including both an indoor parking lot and an outdoor parking lot.

In addition, the parking lot may include one or more floors, each floor may include a plurality of parking spaces, and each of the parking spaces may include a plurality of parking slots.

In the present invention, the vehicle is an example of a moving body, but the moving body according to the present invention is not limited to the vehicle. The moving body according to the present invention may include various objects that may move, such as a vehicle, a person, a bicycle, a ship, and a train. Hereinafter, for convenience of explanation, a case where the moving object is the vehicle will be described by way of example.

The base station 500 is a wireless communication facility connecting a network and various terminals to each other for a wireless communication service, and may enable communication between the image capturing apparatus 100 for a vehicle, the communication apparatus 200 for a vehicle, the server 300 for providing a parking lot guidance service, and the user terminal apparatus 400 that constitute the parking lot guidance service system 1000 according to the present invention. As an example, the communication apparatus 200 for a vehicle may be wirelessly connected to a communication network through the base station 500, and when the communication apparatus 200 for a vehicle is connected to the communication network, the communication apparatus 200 for a vehicle may exchange data with other devices (e.g., the server 300 for providing a parking lot guidance service and the user terminal apparatus 400) connected to the communication network.

The image capturing apparatus 100 for a vehicle may be provided in the vehicle to capture an image in a situation such as driving, stopping, or parking of the vehicle and store the captured image.

In addition, the image capturing apparatus 100 for a vehicle may be controlled by a user control input through the user terminal apparatus 400. For example, when a user selects an executable object installed in the user terminal apparatus 400, the image capturing apparatus 100 for a vehicle may perform operations corresponding to an event generated by a user input for the executable object. Here, the executable object may be a kind of application that may be installed in the user terminal apparatus 400 to remotely control the image capturing apparatus 100 for a vehicle.

In addition, in the present specification, an action that triggers an operation of the image capturing apparatus 100 for a vehicle is defined as an event. For example, a type of the event may be impact sensing, noise sensing, motion sensing, user gesture sensing, user touch sensing, reception of a control command from a remote place, and the like. Here, the image capturing apparatus 100 for a vehicle may include all or some a front image capturing apparatus of capturing an image of the front of the vehicle, a rear image capturing apparatus of capturing an image of the rear of the vehicle, side image capturing apparatuses of capturing images of left and right sides of the vehicle, an image capturing apparatus of capturing an image of a face of a vehicle driver, and an interior image capturing apparatus of capturing an image of the interior of the vehicle.

In the present specification, an infrared (Infra-Red) camera for a vehicle, a black-box for a vehicle, a car dash cam, or a car video recorder are other expressions of the image capturing apparatus 100 for a vehicle and may have the same meaning.

The communication apparatus 200 for a vehicle is an apparatus connected to the image capturing apparatus 100 for a vehicle to enable communication of the image capturing apparatus 100 for a vehicle, and the image capturing apparatus 100 for a vehicle may perform communication with an external server through the communication apparatus 200 for a vehicle. Here, the communication apparatus 200 for a vehicle may use various wireless communication connection methods, for example, a cellular mobile communication method such as long term evolution (LTE) and a wireless local area network (WLAN) method such as wireless fidelity (WiFi). In addition, according to an embodiment of the present invention, the communication apparatus 200 for a vehicle that performs wireless communication with the server may be implemented as a communication module using a low-power wide-area (LPWA) technology. Here, as an example of the low-power wide-area communication technology, a low-power wide-band wireless communication module such as long range (LoRa), narrow band-Internet of things (NB-IoT), or Cat M1 may be used.

Meanwhile, the communication apparatus 200 for a vehicle according to an embodiment of the present invention may also perform a location tracking function like a global positioning system (GPS) tracker.

In addition, it has been described by way of example in FIG. 1 that the communication apparatus 200 for a vehicle is an external apparatus provided separately from the image capturing apparatus 100 for a vehicle, but the communication apparatus 200 for a vehicle is not limited thereto, and may be implemented as an internal communication module provided inside the image capturing apparatus 100 for a vehicle.

In the present specification, a dongle is another expression of the communication apparatus 200 for a vehicle, and the dongle and the communication apparatus 200 for a vehicle may have the same meaning.

The server 300 for providing a parking lot guidance service may relay various data between the communication apparatus 200 for a vehicle and the user terminal apparatus 400 to enable a parking lot guidance service to be described later.

Specifically, the server 300 for providing a parking lot guidance service may receive data including an image captured by the image capturing apparatus 100 for a vehicle and various information generated by the image capturing apparatus 100 for a vehicle from the communication apparatus 200 for a vehicle.

In addition, the server 300 for providing a parking lot guidance service may match and store the received data to parking lot identification information. Here, the parking lot identification information may refer to information that makes a plurality of parking lots distinguishable from each other, such as a parking lot ID, a parking lot name, a parking lot phone number, and a parking lot location.

In addition, the server 300 for providing a parking lot guidance service may generate a parking lot model representing a real-time situation of a parking lot as an image based on the received data, and transmit various data for providing the parking lot guidance service to the user terminal apparatus 400 subscribed to the parking lot guidance service based on the generated parking lot model.

Here, the parking lot guidance service may include a parking slot location guidance service, a parking possible location guidance service, a vehicle parking location guidance service, a parking lot route guidance service, and a parking impact event guidance service.

The parking possible location guidance service may be a service that guides a parking possible location such as a parking possible space of a parking lot, the number of parking possible floors, and a parking possible slot to a user who wants to park the vehicle.

In addition, the vehicle parking location guidance service may be a service that guides a vehicle parking location to a user who wants to find a parked vehicle.

In addition, the parking lot route guidance service may be a service that guides a route from a parking location of the vehicle to a destination (e.g., an exit of the parking lot, etc.).

In addition, the parking impact event guidance service may be a service that provides information regarding a parking impact based on an image captured by an adjacent surrounding vehicle when an impact event occurs in a parked vehicle.

The user terminal apparatus 400 may display, on a screen, a user interface providing various meaningful information based on the data received from the server 300 for providing a parking lot guidance service.

Specifically, an application according to the present invention (hereinafter, referred to as a "parking lot guidance service application") may be installed in the user terminal apparatus 400, the user may execute the parking lot guidance service application installed in the user terminal apparatus 400, and a user interface may be configured and displayed on the screen based on various data received from the server 300 for providing a parking lot guidance service according to the execution of the application.

Here, the user interface may include a user interface corresponding to the parking possible location guidance service, a user interface corresponding to the vehicle parking location guidance service, a user interface corresponding to the parking lot route guidance service, and a user interface corresponding to the parking impact event guidance service.

Here, the user terminal apparatus 400 may be implemented as a smartphone, a tablet personal computer, a laptop computer, a personal digital assistant (PDA), a portable multimedia player (PMP), or the like, or be implemented as a wearable device such as a smart glasses or a head mounted display (HMD) that may be worn on a user's body.

Here, the user may be a person having management authority for the vehicle and/or image capturing apparatus 100 for a vehicle, such as a vehicle owner, a vehicle driver, an owner of the image capturing apparatus 100 for a vehicle, or a supervisor of the image capturing apparatus 100 for a vehicle.

Hereinafter, the image capturing apparatus 100 for a vehicle, the server 300 for providing a parking lot guidance service and the user terminal apparatus 400 according to an embodiment of the present invention will be described in more detail with reference to the drawings.

It has been described that the server 300 for providing a parking lot guidance service according to an embodiment of the present invention described above determines the parking possible location through analysis of the image obtained through the image capturing apparatus 100 for a vehicle mounted in the vehicle, but in another embodiment of the present invention, a parking possible space may be identified through deep learning analysis of a parking lot image obtained through a fixed image obtaining apparatus such as a closed circuit television (CCTV) installed in the parking lot, and an autonomous parking service may be provided to a user terminal apparatus and/or an autonomous driving system using the identified parking possible space.

Figure 2:
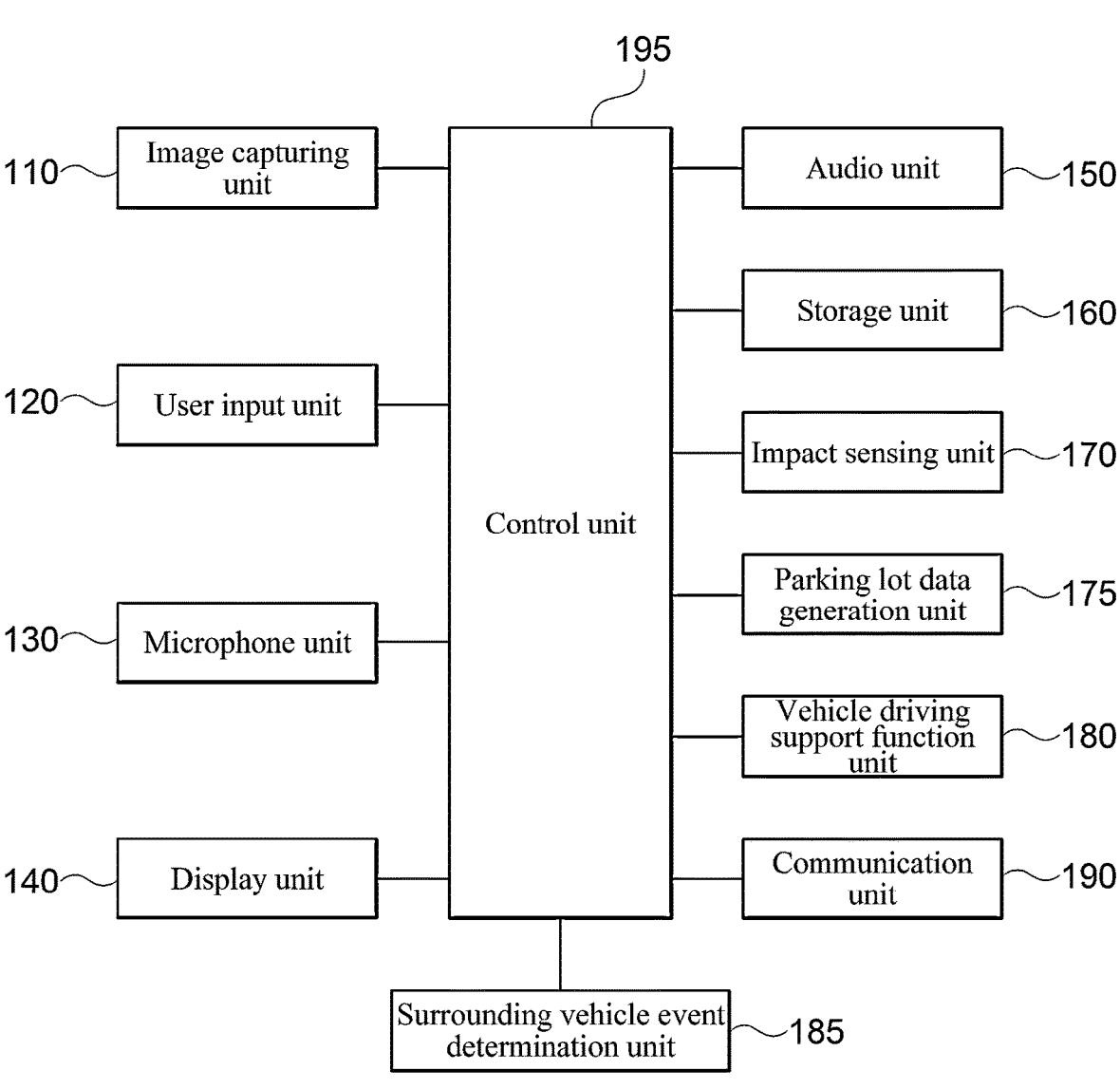
FIG. 2 is a block diagram illustrating an image capturing apparatus for a vehicle according to an embodiment of the present invention.

FIG. 2 is a block diagram illustrating an image capturing apparatus for a vehicle according to an embodiment of the present invention. Referring to FIG. 2, the image capturing apparatus 100 for a vehicle may include an image capturing unit 110, a user input unit 120, a microphone unit 130, a display unit 140, an audio unit 150, a storage unit 160, an impact sensing unit 170, a parking lot data generation unit

175, a vehicle driving support function unit 180, a surrounding vehicle event determination unit 185, a communication unit 190, and a control unit 195.

The image capturing unit 110 may capture an image in at least one situation of parking, stopping, and driving of the vehicle.

Here, the captured image may include a parking lot image, which is a captured image regarding the parking lot. The parking lot image may include an image captured during a period from a point in time when the vehicle enters the parking lot to a point in time when the vehicle exits from the parking lot. That is, the parking lot image may include an image captured from the point in time when the vehicle enters the parking lot to a point in time when the vehicle is parked (e.g., a point in time when an engine of the vehicle is turned off in order to park the vehicle), an image captured during a period in which the vehicle is parked, and an image captured from a parking completion point in time of the vehicle (e.g., a point in time when the engine of the vehicle is turned on in order for the vehicle to exit from the parking lot) to the point in time when the vehicle exits from the parking lot.

In addition, the captured image may include an image of at least one of the front, the rear, the sides, and the interior of the vehicle.

In addition, the image capturing unit 110 may include an infrared camera capable of monitoring a driver's face or pupil, and the control unit 195 may determine a driver's state including whether or not the driver is drowsy by monitoring the driver's face or pupil through the infrared camera.

Such an image capturing unit 110 may include a lens unit and an image capturing element. The lens unit may perform a function of condensing an optical signal, and the optical signal transmitted through the lens unit arrives at an image capturing area of the image capturing element to form an optical image. Here, as the image capturing element, a charge coupled apparatus (CCD), a complementary metal oxide semiconductor image sensor (CIS), a high-speed image sensor, or the like, that converts an optical signal into an electrical signal may be used. In addition, the image capturing unit 110 may further include all or some of a lens unit driving unit, a diaphragm, a diaphragm driving unit, an image capturing element control unit, and an image processor.

The user input unit 120 is a component that receives various user inputs for operating the image capturing apparatus 100 for a vehicle, and may receive various user inputs such as a user input for setting an operation mode of the image capturing apparatus 100 for a vehicle, a user input for displaying a recorded image on the display unit 140, and a user input for setting manual recording.

Here, the operation mode of the image capturing apparatus 100 for a vehicle may include a continuous recording mode, an event recording mode, a manual recording mode, and a parking recording mode.

The continuous recording mode is a mode executed when the user turns on the engine of the vehicle and starts to drive the vehicle, and may be maintained while the vehicle continues to be driven. In the continuous recording mode, the image capturing apparatus 100 for a vehicle may perform recording in a predetermined time unit (e.g., 1 to 5 minutes). In the present invention, the continuous recording mode and a regular mode may be used as the same meaning.

The parking recording mode may refer to a mode operated in a parked state of the vehicle in which the engine of the vehicle is turned off or the supply of power from a battery for driving the vehicle is stopped. In the parking recording mode, the image capturing apparatus 100 for a vehicle may operate in a parking continuous recording mode of performing regular recording during parking of the vehicle. In addition, in the parking recording mode, the image capturing apparatus 100 for a vehicle may operate in a parking event recording mode of performing recording when an impact event is sensed during the parking of the vehicle. In this case, recording for a predetermined period from a predetermined time before the occurrence of the event to a predetermined time after the occurrence of the event (e.g., recording from 10 seconds before the occurrence of the event to 10 seconds after the occurrence of the event) may be performed. In the present invention, the parking recording mode and a parking mode may be used as the same meaning.

The event recording mode may refer to a mode operated when various events occur during driving of the vehicle.

As an example, when the impact event is sensed by the impact sensing unit 170 or an advanced driving assistance system (ADAS) event is sensed by the vehicle driving support function unit 180, the event recording mode may operate.

In the event recording mode, the image capturing apparatus 100 for a vehicle may perform recording from a predetermined time before the occurrence of the event to a predetermined time after the occurrence of the event (e.g., recording from 10 seconds before the occurrence of the event to 10 seconds after the occurrence of the event).

The manual recording mode may refer to a mode in which the user manually operates recording. In the manual recording mode, the image capturing apparatus 100 for a vehicle may perform recording from a predetermined time before the occurrence of a manual recording request of the user to a predetermined time after the occurrence of the manual recording request of the user (e.g., recording from 10 seconds before the occurrence of the event to 10 seconds after the occurrence of the event).

Here, the user input unit 120 may be configured in various manner capable of receiving a user input, such as a keypad, a dome switch, a touch pad, a jog wheel, and a jog switch.

The microphone unit 130 may receive a sound generated outside or inside the vehicle. Here, the received sound may be a sound generated by an external impact or a human voice related to a situation inside/outside the vehicle, and may help to recognize the situation at that time together with the image captured by the image capturing unit 110. The sound received through the microphone unit 130 may be stored in the storage unit 160.

The display unit 140 may display various information processed by the image capturing apparatus 100 for a vehicle. As an example, the display unit may display a "live view image", which is an image captured in real time by the image capturing unit 110, and may display a setting screen for setting an operation mode of the image capturing apparatus 100 for a vehicle.

The audio unit 150 may output audio data received from an external apparatus or stored in the storage unit 140. Here, the audio unit 150 may be implemented as a speaker outputting audio data. As an example, the audio unit 150 may output audio data indicating that a parking event has occurred.

The storage unit 160 stores various data and programs necessary for an operation of the image capturing apparatus 100 for a vehicle. In particular, the storage unit 160 may store the image captured by the image capturing unit 110, voice data input through the microphone unit 130, and parking data generated by the parking lot data generation unit 175.

In addition, the storage unit 160 may classify and store data obtained according to an operation mode of the image capturing apparatus 100 for a vehicle into and in different storage areas.

Such a storage unit 160 may be configured inside the image capturing apparatus 100 for a vehicle, may be detachably configured through a port provided in the image capturing apparatus 100 for a vehicle, or may exist outside the image capturing apparatus 100 for a vehicle. When the storage unit 160 is configured inside the image capturing apparatus 100 for a vehicle, the storage unit 160 may exist in the form of a hard disk drive or a flash memory. When the storage unit 160 is detachably configured in the image capturing apparatus 100 for a vehicle, the storage unit 160 may exist in the form of a secure digital (SD) card, a micro SD card, a universal serial bus (USB) memory, or the like. When the storage unit 160 is configured outside the image capturing apparatus 100 for a vehicle, the storage unit 160 may exist in a storage space provided in another apparatus or a database server through the communication unit 190.

The impact sensing unit 170 may sense an impact applied to the vehicle or sense a case where an amount of change in acceleration is a predetermined value or more. Here, the impact sensing unit 170 may include an acceleration sensor, a geomagnetic sensor, or the like in order to sense the impact or the acceleration.

The vehicle driving support function unit 180 may determine whether or not a driving assistance function is necessary for the driver of the vehicle based on a driving image captured by the image capturing unit 110.

For example, the vehicle driving support function unit 180 may sense the start of a vehicle located in front of the vehicle based on the driving image captured by the image capturing unit 110, and determine whether or not a forward vehicle start alarm (FVSA) is required for the driver. When a predetermined time elapses after a forward vehicle has started, the vehicle driving support function unit 180 may determine that a forward vehicle start alarm is necessary.

In addition, the vehicle driving support function unit 180 may sense whether or not a signal has been changed based on the driving image captured by the image capturing unit 110, and determine whether a traffic light change alarm (TLCA) is necessary for the driver. As an example, when a stop state (0 km/h) is maintained for 4 seconds in a state in which the signal is changed from a stop signal to a straight movement signal, the vehicle driving support function unit 180 may determine that the traffic light change alarm is necessary.

In addition, the vehicle driving support function unit 180 may sense whether or not the vehicle departs from a lane based on the driving image captured by the image capturing unit 110, and determine whether a lane departure warning system (LDWS) is required for the driver. As an example, when the vehicle deviates from the lane, the vehicle driving support function unit 180 may determine that the lane departure warning system is necessary.

In addition, the vehicle driving support function unit 180 may sense a risk of collision between the vehicle and the forward vehicle based on the driving image captured by the image capturing unit 110, and determine whether or not a forward collision warning system (FCWS) is necessary for the driver. As an example, the vehicle driving support function unit 180 may determine that a primary forward collision warning system is necessary when sensing an initial forward collision risk, and determine that a secondary forward collision warning system is necessary when an interval between the vehicle and the forward vehicle is further reduced after sensing the initial forward collision risk.

Here, the forward collision warning system may further include an urban FCWS (uFCWS) that provides the forward collision warning system at a lower driving speed so as to be suitable for an environment in which a driving speed is low.

Meanwhile, the parking lot data generation unit 175 may generate parking lot data during a period from a point in time when the vehicle enters the parking lot (in other words, an entry point in time) to a point in time when the vehicle exits from the parking lot (in other words, an exit point in time).

Here, the parking lot data may include at least one of parking lot location information, parking space information, parked vehicle information, own vehicle location information, time information, and a parking lot image.

Figure 3:
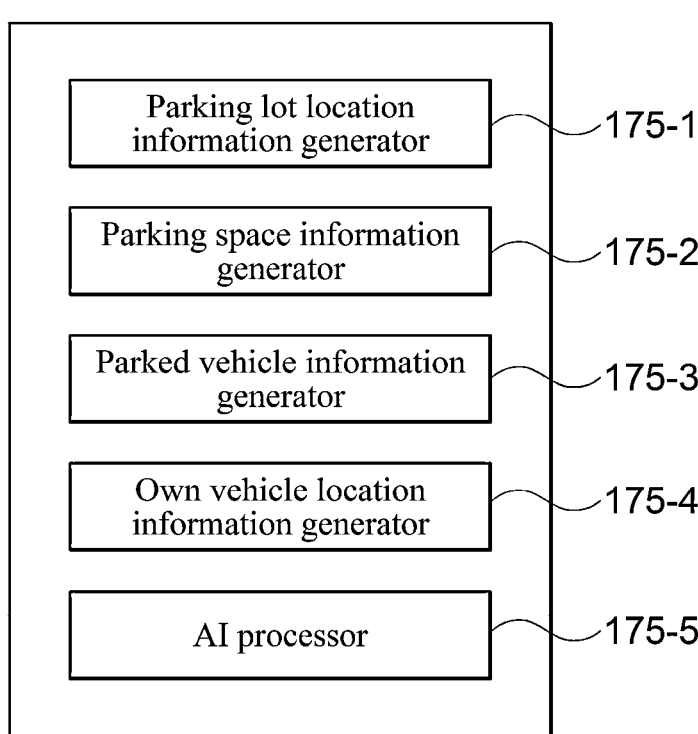
FIG. 3 is a block diagram illustrating a parking lot data generation unit according to an embodiment of the present invention in more detail.

Specifically, referring to FIG. 3, the parking lot data generation unit 175 may include a parking lot location information generator 175-1, a parking space information generator 175-2, a parked vehicle information generator 175-3, an own vehicle location information generator 175-4, and an artificial intelligence (AI) processor 175-5.

The parking lot location information generator 175-1 may determine a location of the parking lot and generate the parking lot location information. As an example, when the vehicle is located in an outdoor parking lot, the parking lot location information generator 175-1 may generate location information of the outdoor parking lot using satellite positioning data. As another example, when the vehicle is located in an indoor parking lot, the parking lot location information generator 175-1 may generate location information of the indoor parking lot based on the last reception point of satellite positioning data, generate location information of the indoor parking lot based on positioning information using base stations of a cellular network located in the indoor parking lot, or generate location information of the indoor parking lot based on positioning information using access points of a WiFi network located in the indoor parking lot.

The parking space information generator 175-2 may include location information of a parking space and parking slot information of the parking space for a parking space included in the parking lot image. Here, the parking slot information may be extracted by identifying parking slots existing in the parking space from the parking lot image, and may include information on the number of parking slots, parking slot identification information, and information on whether or not the vehicles are parked in the parking slots. The parking space information generator 175-2 according to an embodiment of the present invention may identify the parking slot information using edge detection, feature point detection, a deep learning result for marked lines of the parking slots, or a deep learning result for parked vehicles in an image included in the parking lot image.

Specifically, the parking space information generator 175-2 may generate the location information of the parking space included in the parking lot image based on a location identifier included in the parking lot image.

Here, the location identifier is information included in the parking lot image to enable identification of the location of the parking space in the parking lot, and may include at least one of a text (e.g., a text such as a "parking lot entrance", a "3rd floor", or "3B-2"), a structure (e.g., a parking crossing gate, a parking tollbooth, etc.), and a unique identification symbol (e.g., a specific QR code, a specific sticker, a specific text, etc.) with a defined location.

That is, the parking space information generator 175-2 may generate the location information of the parking space included in the parking lot image based on the location identifier recognized through analysis of the captured image. As an example, when location identifiers of "3B-1" and "3B-2" are marked on both side pillars of the parking space, the parking space information generator 175-2 may generate information of a parking space between "3B-1" and "3B-2" as location information of the corresponding parking space.

In this case, the parking space information generator 175-2 may recognize the location identifier using a learned neural network of the AI processor 175-5 so as to calculate a prediction result for whether or not the location identifier exists in the captured image. An example of such an artificial neural network will be described in more detail with reference to FIG. 4.

Figure 4:
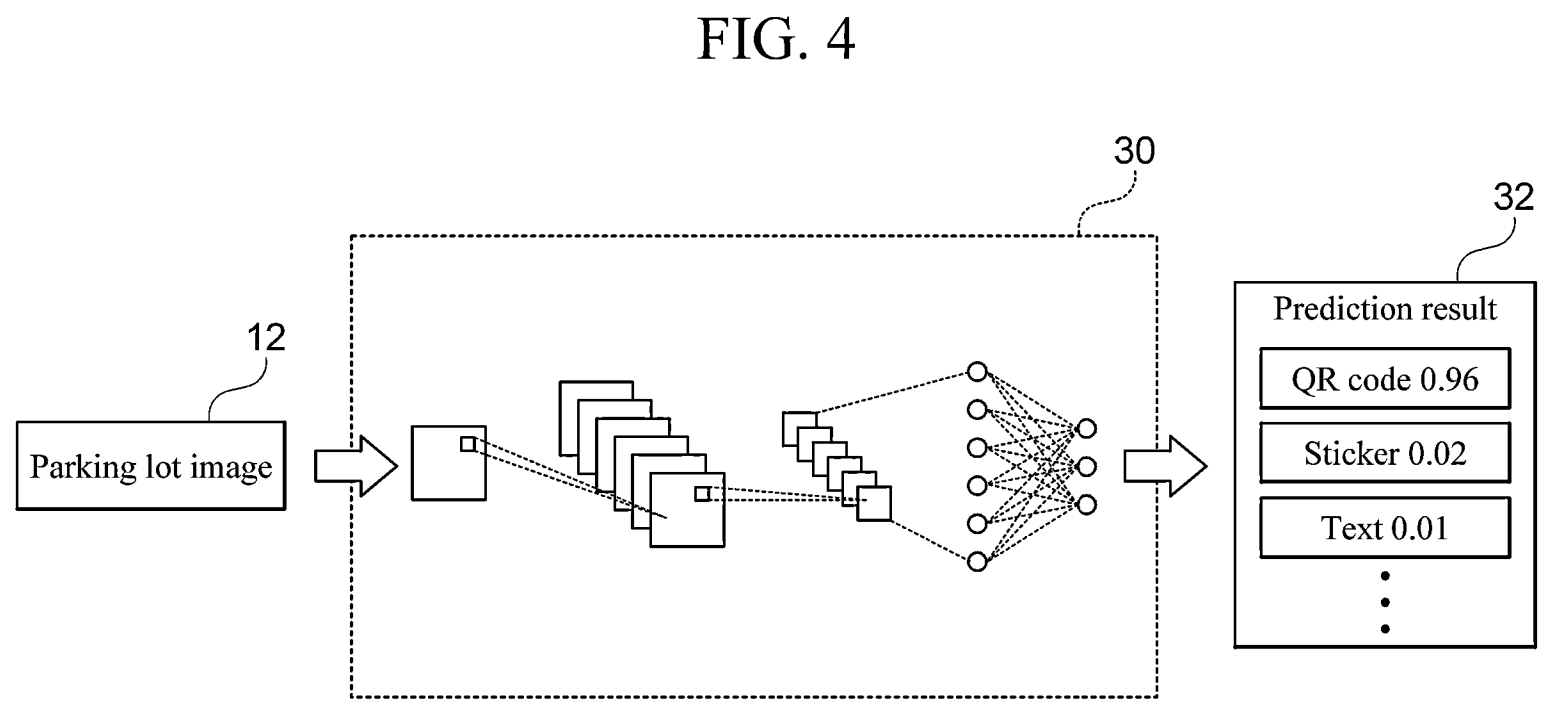

FIG. 4 is an illustrative view illustrating a configuration of a neural network according to an embodiment of the present invention.

Referring to FIG. 4, a neural network 30 according to the present embodiment may be configured as a convolution neural network (CNN) model including layers performing a plurality of convolution operations.

When a parking lot image 12 is input to the neural network 30, feature values according to a unique shape or color indicating a location identifier included in the parking lot image while passing through the layers inside the neural network 30 may be emphasized through convolution.

Various feature values included in the parking lot image as the location identifier may be output in the form of a new feature map through an operation with a filter determined for each convolution layer, and a final feature map generated through an iterative operation for each layer may be input to and flattened in a fully-connected layer. A difference between the flattened feature information and reference feature information defined for each location identifier may be calculated, and an existence probability of the location identifier may be output as a prediction result 32 according to the calculated difference.

In this case, in order to increase accuracy, the parking lot image may be divided and input to the neural network 30. As an example, since the location identifier is generally marked in a non-parking space (e.g., a pillar, etc.) rather than a parking space in which the vehicle is parked, according to the present invention, only a non-parking space image in the parking lot image may be divided and input to the neural network 30.

The learning of the neural network 30 may be performed using a learning data set classified for each location identifier as labeling data including parking lot image data and a determination result for whether or not the location identifier exists. For example, the neural network may be learned using a plurality of driving image data labeled as data in which each of a specific QR code, a specific sticker, and the like, exists as the location identifier in the parking lot image, as learning data.

The learned neural network 30 may determine whether or not the location identifier exists with respect to the input parking lot image, and provide a prediction probability value for each location identifier as a prediction result 32.

Figure 5:
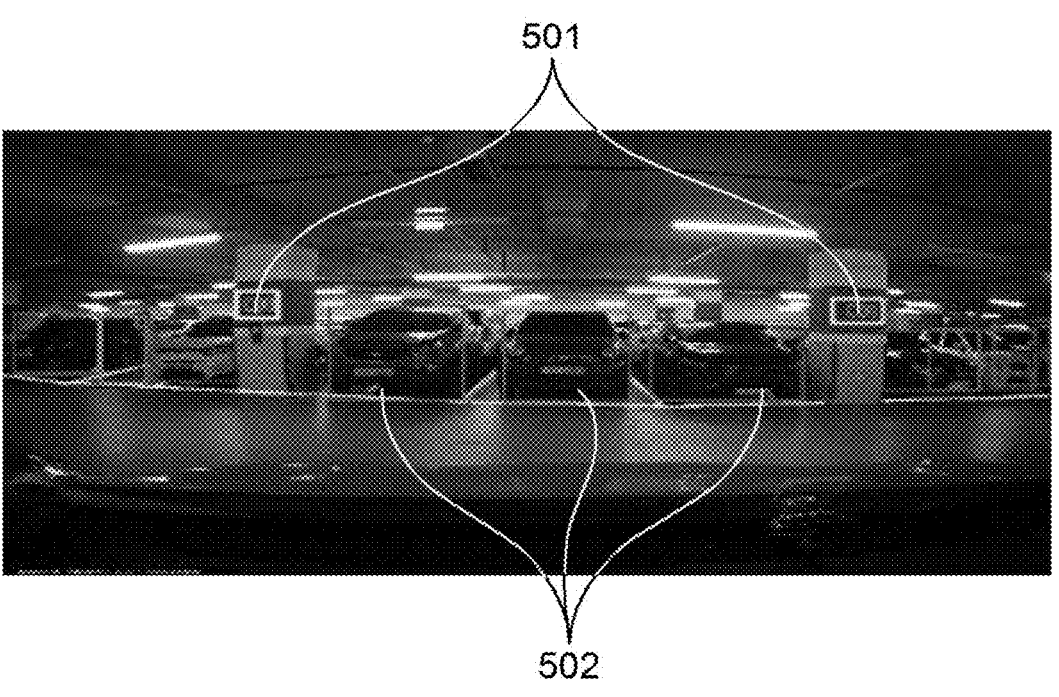
FIG. 5 is a view illustrating an image of a parking lot according to an embodiment of the present invention.

That is, FIG. 5 is a view illustrating a parking lot image according to an embodiment of the present invention. Referring to FIG. 5, a parking lot image captured by the image capturing apparatus 100 for a vehicle of a parked vehicle may include a plurality of location identifiers 501 and a plurality of vehicles 502.

The AI processor 175-5 according to the present invention may recognize the location identifiers 501 from the parking lot image using the artificial neural network.

Meanwhile, the parking space information generator 175-2 may generate information on the number of parking slots of the parking space included in the parking lot image by analyzing the parking lot image. Specifically, the parking space information generator 175-2 may detect line markings of the parking space, generate information on the number of parking slots in the parking space based on the detected line markings, and generate parking slot identification information making a plurality of parking slots distinguishable from each other.

In addition, the parking space information generator 175-2 may generate information on whether or not the vehicle is parked in parking slot included in the parking space. Specifically, the parking space information generator 175-2 may analyze the parking lot image to detect the vehicle, determine where the detected vehicle is located among the plurality of parking slots constituting the parking space, and generate information on whether or not the vehicle is parked in the parking slot included in the parking space. Here, the information on whether or not the vehicle is parked in the parking slot may be generated for each of the plurality of parking slots constituting the parking space, and may be generated separately for each floor of the parking lot.

In this case, the parking space information generator 175-2 may recognize the vehicle in the parking lot image using the learned neural network of the AI processor 175-5. In this regard, a principle is the same as that of the neural network 30 learned in order to recognize the location identifier in FIG. 4, and a detailed description thereof will thus be omitted.

That is, FIG. 5 is a view illustrating a parking lot image according to an embodiment of the present invention, and the AI processor 175-5 according to the present invention may recognize the plurality of vehicles 502 from the parking lot image using the artificial neural network.

Meanwhile, the parked vehicle information generator 175-3 may generate parked vehicle information on a plurality of parked vehicles parked in the surrounding of an own vehicle by analyzing the parking lot image. Here, the parked vehicle information may include vehicle type information and vehicle number information. In addition, the parked vehicle information may be generated separately for each of the plurality of parking slots constituting the parking space.

The vehicle type information may include classification information according to the use purpose of the vehicle, such as a sedan, hatchback, wagon, and SUV, and classification information for each brand of the vehicle. In addition, the vehicle number information may be number information written on a vehicle license plate.

In this case, the parked vehicle information generator 175-3 may use the learned neural network of the AI processor 175-5 in order to recognize surrounding vehicles from the captured image. Accordingly, the learned neural network 30 may determine whether or not the vehicles exist with respect to the input parking lot image, and provide a type of each vehicle, a number of each vehicle, and the like as a prediction result.

Meanwhile, the own vehicle location information generator 175-4 may generate location information of the vehicle in which the image capturing apparatus 100 for a vehicle is mounted.

Specifically, when the vehicle is located in the outdoor parking lot, the own vehicle location information generator 175-4 may own generate vehicle location information in the outdoor parking lot using satellite positioning data received from a global navigation satellite system (GNSS).

In addition, when the vehicle is located in the indoor parking lot, the own vehicle location information generator 175-4 may generate location information of the own vehicle in the indoor parking lot using the location identifier described above.

However, the present invention is not limited thereto, and according to another embodiment of the present invention, even when the vehicle is located in the outdoor parking lot, the own vehicle location information generator 175-4 may generate location information of the own vehicle in the outdoor parking lot using the location identifier.

In addition, the own vehicle location information generator 175-4 may generate location information of the own vehicle based on whether or not the own vehicle has been parked. Here, the own vehicle location information generator 175-4 may determine whether or not the own vehicle has been parked, based on one of turn-off of an engine of the own vehicle, turn-off power of a battery, parking (P stage) gear shift, whether or not the passenger has gotten off the vehicle, a location of a vehicle key (when the vehicle key is located outside the vehicle), whether or not side mirrors have been folded, and whether or not Bluetooth connection between the user terminal apparatus 400 and the vehicle has been made.

For example, when the parking gear shift of the own vehicle is made and the Bluetooth connection between the user terminal apparatus 400 and the vehicle are released, the own vehicle location information generator 175-4 may determine that the vehicle has been parked at a corresponding location of the own vehicle and generate vehicle location information of the own vehicle.

Meanwhile, when the parking lot location information, the parking space information, the surrounding parked vehicle information, and the own vehicle location information are generated according to the processes described above, the parking lot data generation unit 175 may generate parking lot data by combining time information matched to the generated information and a parking lot image matched to the generated information.

Meanwhile, the surrounding vehicle event determination unit 185 may determine whether or not an event of another vehicle parked in the surrounding of the own vehicle has occurred. Here, the surrounding vehicle event may refer to an event situation in which an impact is applied to another vehicle parked in the surrounding of the own vehicle by a vehicle, a person, or any object.

The surrounding vehicle event determination unit 185 may determine whether or not the event of another vehicle parked in the surrounding of the own vehicle has occurred based on a sound, a motion of a front object, and the like.

As an example, when a scream sound, an impact sound, a tire sound, a conversation sound including a specific word, or the like, is input from the microphone unit 130, the surrounding vehicle event determination unit 185 may determine that the event of another vehicle parked in the surrounding of the own vehicle has occurred.

Alternatively, the nearby vehicle event determination unit 185 may determine whether or not the surrounding vehicle event has occurred according to a request from a remote place. As an example, when an impact event is detected in another vehicle parked in the surrounding of the own vehicle and the image capturing apparatus 100 for a vehicle mounted on another vehicle transmits an impact notification of the server 300 for providing a parking lot guidance service or the user terminal apparatus 400, the server 300 for providing a parking lot guidance service or the user terminal apparatus 400 may notify the image capturing apparatus 100 for a vehicle of the own vehicle located in the surrounding of the vehicle in which the impact has occurred, of the occurrence of the event. In addition, when the notification is received, the surrounding vehicle event determination unit 185 may recognize that the event has occurred in the surrounding vehicle.

Meanwhile, the communication unit 190 may enable the image capturing apparatus 100 for a vehicle to communicate with other devices. Here, the communication unit 190 may be implemented as various known communication modules such as communication modules that use various wireless communication connection methods, for example, a cellular mobile communication method such as long term evolution (LTE) and a wireless local area network (WLAN) method such as wireless fidelity (WiFi), and a low-power wide-area (LPWA) technology. In addition, the communication unit 190 may also perform a location tracking function like a global positioning system (GPS) tracker.

Accordingly, the image capturing apparatus 100 for a vehicle may perform communication with the server 300 for providing a parking lot guidance service and/or the user terminal apparatus 400 through the communication unit 190.

Here, the communication unit 190 may refer to the same thing as the communication apparatus 200 for a vehicle of FIG. 1.

The control unit 195 controls overall operations of the image capturing apparatus s 100 for a vehicle. Specifically, the control unit 195 may control all or some of the image capturing unit 110, the user input unit 120, the microphone unit 130, the display unit 140, the audio unit 150, the storage unit 160, the impact sensing unit 170, the parking lot data generation unit 175, the vehicle driving support function unit 180, the surrounding vehicle event determination unit 185, and the communication unit 190.

In particular, the control unit 195 may set the operation mode of the image capturing apparatus 100 for a vehicle to one of the continuous recording mode, the event recording mode, the parking recording mode, and the manual recording mode based on at least one of whether or not the engine of the vehicle is turned on, a vehicle battery voltage measurement result, a sensing result of the impact sensing unit 170, a determination result of the vehicle driving support function unit 180, and an operation mode setting value. In addition, when a battery voltage of the vehicle falls to a threshold value or less, the control unit 195 may control the image capturing apparatus 100 for a vehicle to stop an operation of the image capturing apparatus 100 for a vehicle.

In addition, the control unit 195 may determine whether or not the parking lot data needs to be updated, control the parking lot data generation unit 175 to update the parking lot data when the parking lot data needs to be updated, and control the communication unit 190 to transmit the updated parking lot data to the server 300 for providing a parking lot guidance service.

Here, an update condition of the parking lot data may include a case where a change occurs in the parking lot image as a parked vehicle located in the surrounding of the own vehicle exits from a parking slot of the parking space or another vehicle enters the parking slot of the parking space.

In addition, the update condition of the parking lot data may include a case where a preset period has arrived.

In addition, the update condition of the parking lot data may include a case where the degree of completeness of the parking data is lower than a preset reference value. Here, the case where the degree of completeness is lower than the preset reference value may include a case where resolution of the parking lot image is low or there is incomplete data.

In addition, the update condition of the parking lot data may include a case where an update request from a remote place (e.g., the server 300 for providing a parking lot guidance service or the user terminal apparatus 400) is received. Here, the update request from the remote place may be performed by determining the necessity for the update in the server 300 for providing a parking lot guidance service or the user terminal apparatus 400 based on the update condition of the parking lot data described above.

In addition, when it is determined in the surrounding vehicle impact event determination unit 185 that a surrounding vehicle impact event has occurred, the control unit 195 may control the parking lot data generation unit 175 to update the parking lot data, and control the communication unit 190 to transmit the updated parking lot data to the server 300 for providing a parking lot guidance service. Here, the updated parking lot data may include data a predetermined time before and after an occurrence point in time of the surrounding vehicle impact event.

Figure 6:
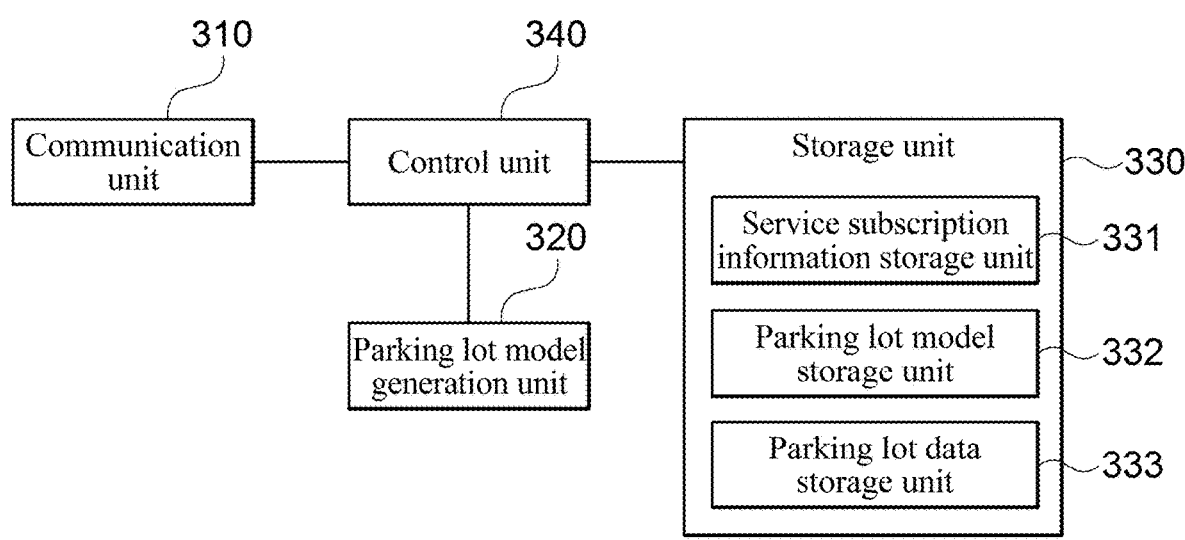
FIG. 6 is a block diagram illustrating a server for providing a parking lot guidance service according to an embodiment of the present invention.

FIG. 6 is a block diagram illustrating a server for providing a parking lot guidance service according to an embodiment of the present invention. Referring to FIG. 6, the server 300 for providing a parking lot guidance service may include a communication unit 310, a parking lot model generation unit 320, a storage unit 330, and a control unit 340.

Before describing FIG. 6, according to the image capturing apparatus 100 for a vehicle described above, it has been described by way of example that operations of the parking lot data generation unit 175 and the surrounding vehicle event determination unit 185 are performed in the image capturing apparatus 100 for a vehicle, but all or some of these operations may also be performed in the server 300 for providing a parking lot guidance service.

The communication unit 310 may be provided for the server 300 for providing a parking lot guidance service to communicate with other devices. Specifically, the communication unit 310 may transmit and receive data to and from at least one of the image capturing apparatus 100 for a vehicle and the user terminal apparatus 400. Here, the communication unit 310 may be implemented as various known communication modules.

The parking lot model generation unit 320 may generate a parking lot model representing a real-time situation of the parking lot as an image using the parking lot data received from the image capturing apparatus 100 for a vehicle.

Specifically, the parking lot model generation unit 320 may perform modeling on the parking lot using the parking space information and the surrounding parked vehicle information of the parking data received from the image capturing apparatus 100 for a vehicle, and perform modeling for each floor of the parking lot.

That is, the parking lot model generation unit 320 may determine a location of the corresponding parking space in the parking lot based on the location information of the parking space, and perform modeling of the parking slots for the parking space based on information on the number of parking slots in the parking space. In addition, the parking lot model generation unit 320 may determine whether or not to dispose a vehicle model in the parking slot based on information on whether or not the vehicle is parked in the parking slot.

In addition, the parking lot model generation unit 320 may generate a vehicle model reflecting a license plate and a vehicle type based on type information of the parked vehicle and number information of the parked vehicle, and dispose the generated vehicle model in the corresponding parking slot.

Additionally, the parking lot model generation unit 320 may analyze the parking lot image received from the image capturing apparatus 100 for a vehicle to generate at least one of spatial shape information and road surface information, and generate a parking lot model based on the generated information.

Here, the spatial shape information may refer to information on a shape of a structure in the parking lot, such as a wall, a pillar, a parking space, and a parking barrier. In addition, the spatial shape information may further include color information of the structure.

In addition, a road surface mark is an indicator for guiding the movement of the vehicle in the parking lot, and may include a passage direction of the vehicle, and the like. Here, a direction of the route may be determined with reference to the road surface mark at the time of guiding a vehicle route in the parking lot.

Such spatial shape information and road surface information may be generated by the image capturing apparatus 100 for a vehicle and transmitted to the server 300 for providing a parking lot guidance service or may be generated through image processing of the parking lot image by the server 300 for providing a parking lot guidance service.

In addition, the parking lot model generation unit 320 may analyze the parking lot image of the parking lot data received from the image capturing apparatus 100 for a vehicle, compare the parking lot data received from the image capturing apparatus 100 for a vehicle and parking lot data generated through image analysis of the parking lot model generation unit 320 with each other, and generate a parking lot model by giving priority to the parking lot data generated by the server 300 for providing a parking lot guidance service when there is a difference between these parking lot data.

Meanwhile, the parking lot model generation unit 320 may hold a basic parking lot model for each of a plurality of parking lots. Here, the basic parking lot model is a model in which a real-time parking situation of the corresponding parking lot is not reflected, and may be a model in which a wall, a pillar, a parking space, and the like, indicating a spatial shape of the corresponding parking lot are reflected. In this case, the parking lot model generation unit 320 may generate a parking lot model by updating the basic parking lot model using the parking lot data received from the image capturing apparatus 100 for a vehicle.

Such a parking lot model generated by the parking lot model generation unit 320 may be a three-dimensional (3D) model. This will be described in more detail with reference to FIG. 7.

Figure 7:
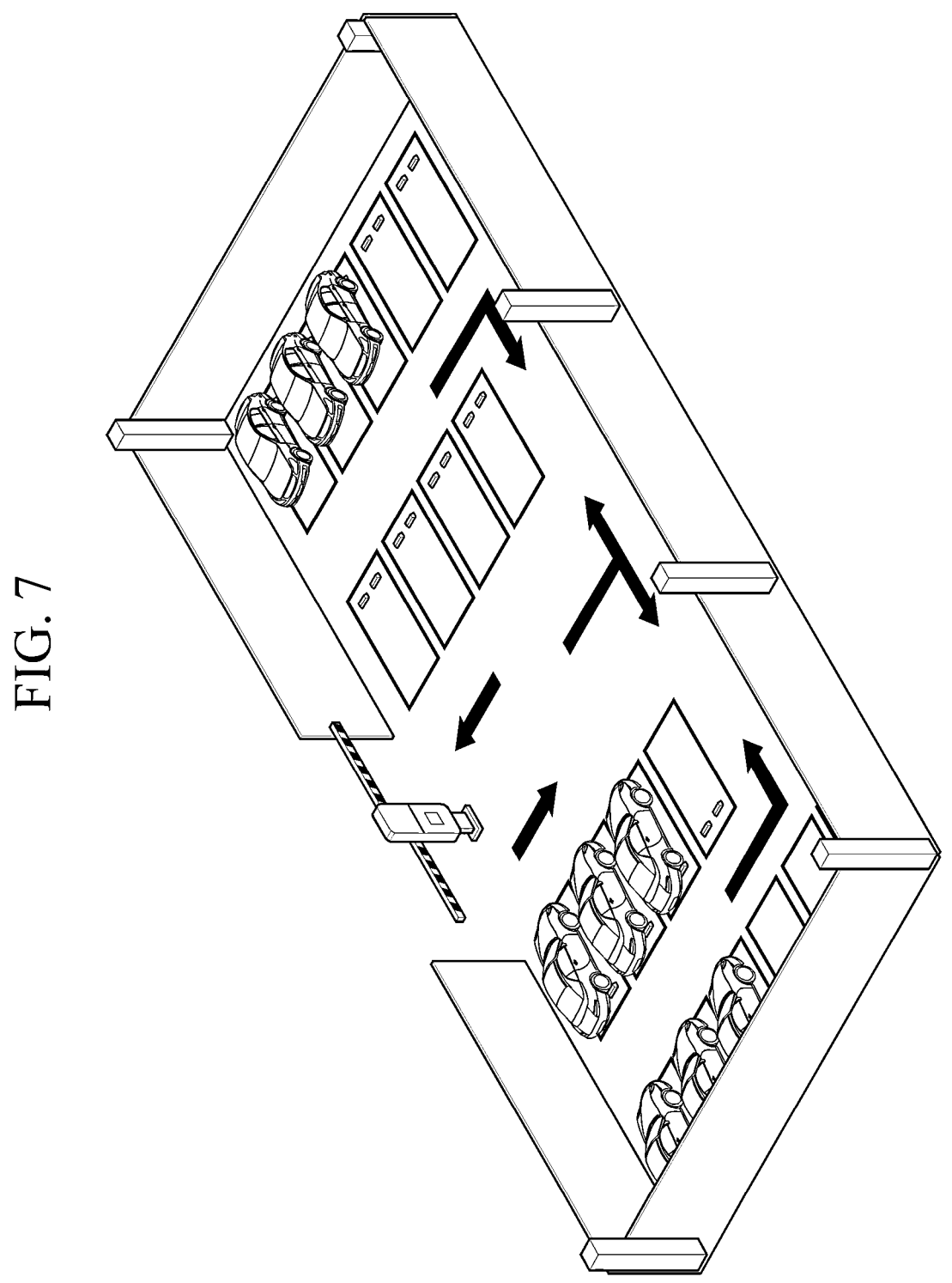
FIG. 7 is a view illustrating a parking lot model according to an embodiment of the present invention.

FIG. 7 is a view illustrating a parking lot model according to an embodiment of the present invention. Referring to FIG. 7, the parking lot model generation unit 320 may model a parking slot for a parking space based on information on the number of parking slots of the parking space, and determine whether or not to disposed a vehicle model in the parking slot based on information on whether or not the vehicle is parked in the parking slot to generate a parking lot model in which the vehicle model is disposed.

In addition, the parking lot model generation unit 320 may reflect entrance and exit management equipments and road surface markings disposed in entrance and exit passages of the parking lot to generate a parking lot model.

Such a parking lot model may be transmitted in an expressible format to the user terminal apparatus 400 and displayed on a screen of the user terminal apparatus 400.

Meanwhile, the parking lot model generation unit 320 may continuously receive the parking lot data from the image capturing apparatus 100 for a vehicle to update the parking lot model.

In this case, the parking lot model generation unit 320 may update the parking lot model based on the parking lot location information and parking space location information included in the parking lot data.

For example, when parking lot data for a parking space between "3B-1" and "3B-2" of a first parking lot is received from a first image capturing apparatus 100-1 for a vehicle, the parking lot model generation unit 320 may perform modeling on the corresponding parking space using the received parking lot data, and generate a parking lot model. Thereafter, when parking lot data for the parking space between "3B-1" and "3B-2" of the same first parking lot is received from a second image capturing apparatus 100-2 for a vehicle, the parking lot model generation unit 320 may perform modeling on the corresponding parking space using the parking lot data received from the second image capturing apparatus 100-2 for a vehicle, and update the generated parking lot model.

In this case, the parking lot model generation unit 320 may update the parking lot model by reflecting the latest parking lot data in the time order of the received parking lot data.

In addition, the parking lot model generation unit 320 may update the parking lot model by extracting only a difference portion between the generated parking lot model and a subsequently generated parking lot model and then reflecting only the difference portion, at the time of updating the parking lot model.

Through this, a parking lot model representing the entire interior of the parking lot may be generated, and a change inside the parking lot may be quickly reflected in the parking lot model.

The storage unit 330 may store various data and programs for an operation of the server 300 for providing a parking lot guidance service. Here, the storage unit 330 may include a service subscription information storage unit 331, a parking lot model storage unit 332, and a parking lot data storage unit 333.

Specifically, when a user who wants to receive the parking lot guidance service subscribes to the parking lot guidance service using his/her terminal apparatus 400, the service subscription information storage unit 331 may store service subscription information generated based on information input through the subscription. Here, the service subscription information storage unit 331 may store subscriber information on a subscriber who has subscribed to the parking lot service, information and apparatus information of the corresponding subscriber. The subscriber information may include subscriber identification information and subscription service information.

The subscription service information is information indicating a service to which the corresponding subscriber subscribes in detail, and may include service application details, a rate plan, a service validity period, a data rate, a service type, and the like.

The subscriber identification information is information making each of a plurality of subscribers identifiable, and may include a subscriber ID, a subscriber's password, a subscriber's resident registration number, a subscriber's name, a subscriber's nickname, a subscriber's personal identification number (PIN), and the like.

In addition, the subscriber apparatus information may include at least one of identification information of the image capturing apparatus 100 for a vehicle and identification information of the communication apparatus 200 for a vehicle purchased by the corresponding subscriber. Here, the identification information of the image capturing apparatus 100 for a vehicle is information making each of a plurality of image capturing apparatus for a vehicle identifiable, and may include a model name of the image capturing apparatus for a vehicle, a unique serial number of the image capturing apparatus for a vehicle, and the like. In addition, the identification information of the communication apparatus 200 for a vehicle is information making each of a plurality of communication apparatuses for a vehicle identifiable, and may include a dongle model name, a dongle phone number, a dongle serial number, a universal subscriber identity module (USIM) serial number, and the like.

In addition, the subscriber apparatus information may further include identification information of the user terminal apparatus 400 of the subscriber, and the identification information of the user terminal apparatus 400 may include an international mobile subscriber identity (IMSI), an integrated circuit card ID (ICCID), and an international mobile equipment identity (IMEI), which are unique information given in the network in order to identify the user terminal apparatus 400.

In this case, the service subscription information storage unit 331 may match and store subscriber information and subscriber apparatus information to each other for each subscriber who has subscribed to the service.

Meanwhile, the parking lot model storage unit 332 may store the parking lot model generated by the parking lot model generation unit 320.

In addition, the parking lot data storage unit 333 may store the parking lot data received from the image capturing apparatus 100 for a vehicle.

In this case, the parking lot model storage unit 332 and the parking lot data storage unit 333 may match and store the parking lot model and the corresponding parking lot data to each other.

Specifically, the parking lot model storage unit 332 may match and store the parking lot model and the corresponding parking lot location information, parking space information, surrounding parked vehicle information, own vehicle location information, time information, and parking lot image to each other.

Here, the storage unit 330 may be implemented as a built-in module of the server 300 for providing a parking lot guidance service or be implemented as a separate database (DB) server.

Meanwhile, the control unit 340 may control overall operations of the server 300 for providing a parking lot guidance service so that the parking lot guidance service according to the present invention is provided.

Such an operation of the server 300 for providing a parking lot guidance service may be divided into a "new subscription process", a "registration process of a blackbox", a "registration process of a user", and a "parking lot guidance service provision process" of providing a parking lot guidance service to a subscriber who has subscribed to the service.

In the "new subscription process", when a service member subscription is requested from a subscriber, the control unit 340 may initiate a service subscription procedure, obtain subscriber information of the subscriber who has subscribed to the parking lot guidance service and apparatus information of the subscriber, and perform control so that the obtained information is classified and stored in the storage unit 330. Accordingly, the storage unit 330 may construct a service subscriber information database.

When a "registration process of the image capturing apparatus for a vehicle" is performed, the control unit 340 may receive unique information for identifying a communication apparatus, such as a universal subscriber identity module (USIM) chip embedded in the communication apparatus 200 for a vehicle through communication with the communication apparatus 200 for a vehicle, and compare the unique information with information stored in the storage unit 330 to confirm validity of the communication apparatus 200 for a vehicle.

Similarly, in the "registration process of a user", when the user terminal apparatus 400 accesses the server 300 for providing a parking lot guidance service, the control unit 340 may obtain user identification information such as USIM embedded in the user terminal apparatus 400, and then compare the obtained user identification information with information stored in the storage unit 330 to confirm whether or the user terminal apparatus 400 has subscribed to the service, a type of service to which or the user terminal apparatus 400 has subscribed, and the like. When authentication for the user is successfully completed, the control unit 340 may provide various information on the image capturing apparatus 100 for a vehicle in various UX forms based on authority assigned to the user.

In the "parking lot guidance service provision process", when the user terminal apparatus 400 accesses the server 300 for providing a parking lot guidance service, the control unit 340 may detect a parking lot model and parking lot data for a parking lot in which a vehicle of a user of the user terminal apparatus 400 that has accessed the server 300 for providing a parking lot guidance service is parked, and then provide the parking lot guidance service to the user terminal apparatus 400. Here, the parking lot guidance service may include a parking possible location guidance service, a vehicle parking location guidance service, a parking lot route guidance service, and a parking lot payment service.

As an example, in a case of providing the parking possible location guidance service, the control unit 340 may detect information of a parking lot entered by a user when the user enters the parking lot based on location information of the user terminal apparatus 400, and detect the number of parking possible floors of the corresponding parking lot, a location of a parking possible space in each floor, a location of a parking possible slot in the parking possible space, the number of parking possible slots in the parking possible space, and the like, based on the parking lot data stored in the parking lot data storage unit 333. In addition, the control unit 340 may provide a parking possible location guidance service that displays a parking possible location such as the parking possible space, the number of parking possible floors, and the parking possible slot of the parking lot on the parking lot model to the terminal apparatus 400 of the user who wants to park the vehicle, based on the detected information.

As another example, in a case of providing the vehicle parking location guidance service, the control unit 340 may detect parking location information of the user of the user terminal apparatus 400 based on the parking lot data stored in the parking lot data storage unit 333, and provide the vehicle parking location guidance service that displays the detected parking location information on the parking lot model.

Figure 13A:
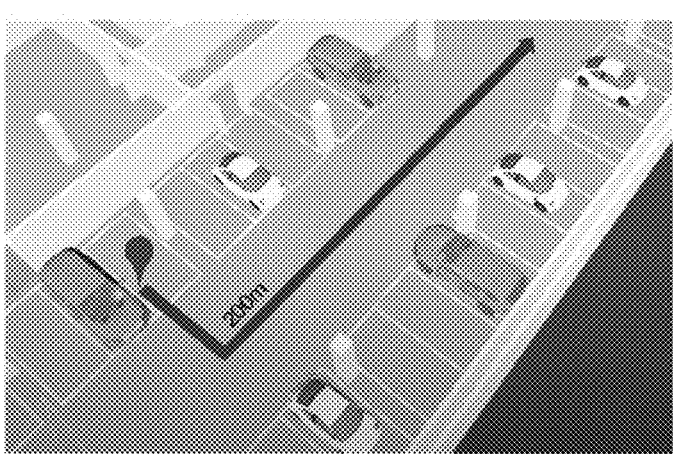
Figure 13B:
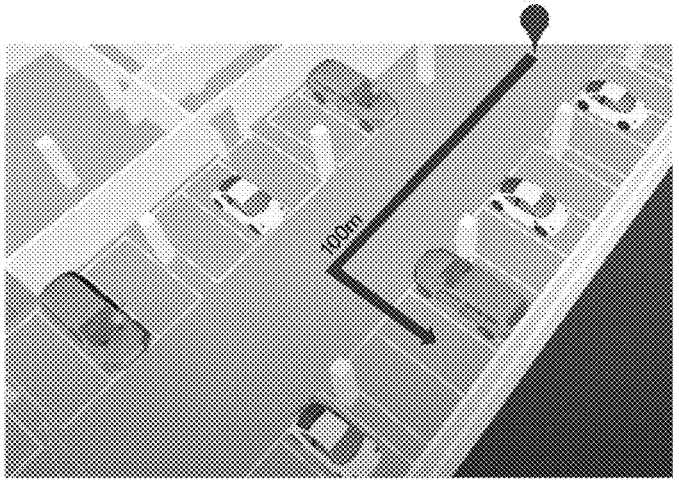

Additionally, the server 300 for providing a parking lot guidance service may determine location information of the user terminal apparatus 400 in the parking lot. In this case, the control unit 340 may provide the vehicle parking location guidance service that displays an optimal moving route and a distance from a current location of the user to a parking location on the parking lot model, based on the parking location information of the user and the location information of the user terminal apparatus 400 in the parking lot. Here, the optical moving route may be displayed in the shape of an arrow in consideration of a passage direction in the parking lot. As an example, the user terminal apparatus 400 may display a user interface for a vehicle parking location guidance service as illustrated in FIG. 13B.

As another example, in a case of providing the parking lot route guidance service, the control unit 340 may detect parking location information of the user of the user terminal apparatus 400 based on the parking lot data stored in the parking lot model storage unit 332, detect exit information of the corresponding parking lot, and provide the parking lot route guidance service that displays a route and a distance from the parking location of the user terminal apparatus 400 to an exit of the parking lot on the parking lot model based on the detected information. Here, the optical moving route may be displayed in the shape of an arrow in consideration of a passage direction in the parking lot. As an example, the user terminal apparatus 400 may display a user interface for a parking lot route guidance service as illustrated in FIG. 13A.

In addition, the parking lot guidance service may further include a parking impact event guidance service. Here, the parking impact event guidance service will be described in more detail with reference to FIG. 8.

Figure 8:
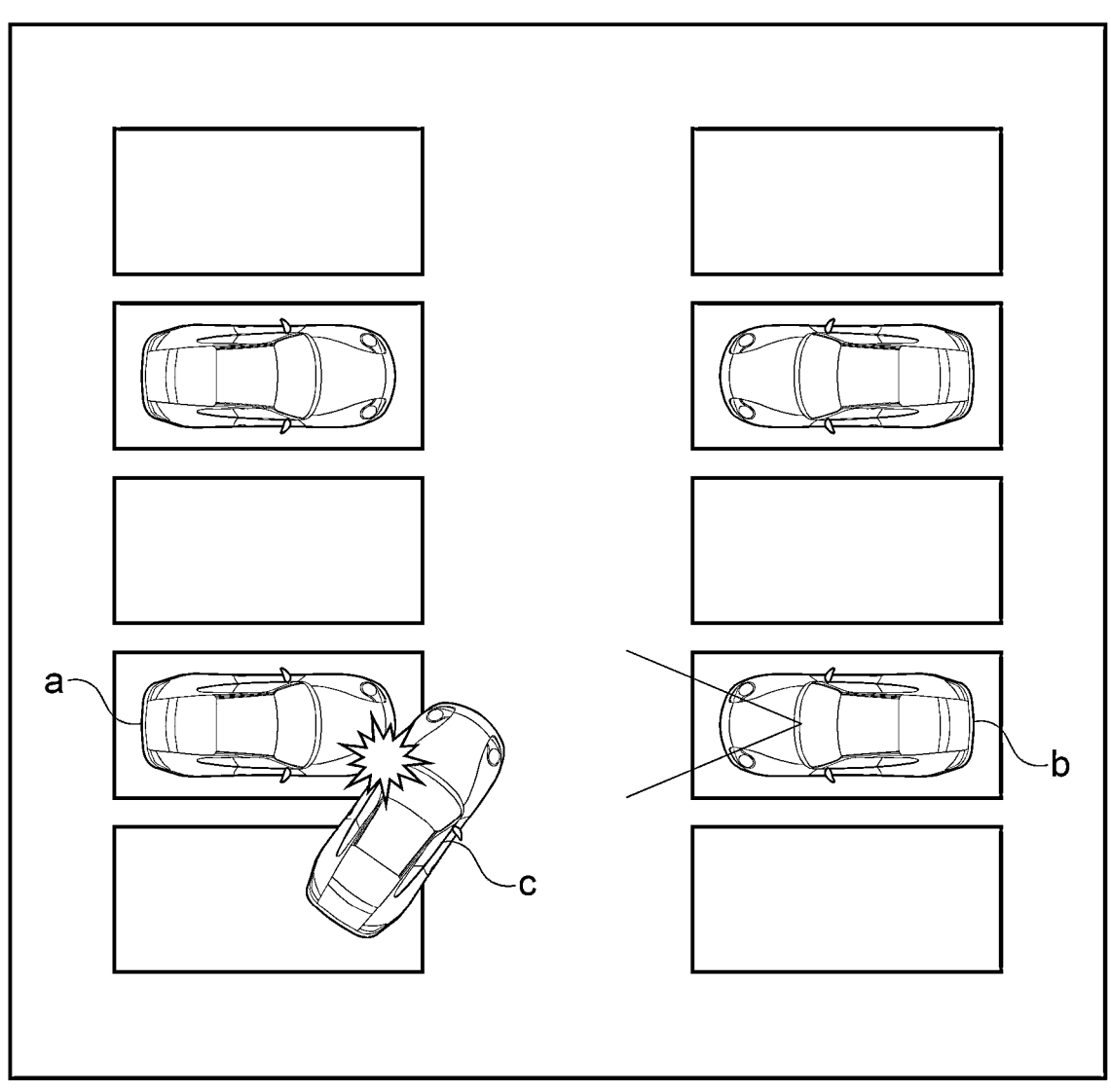
FIG. 8 is an illustrative view illustrating a parking impact event occurrence situation according to an embodiment of the present invention.

FIG. 8 is an illustrative view illustrating the occurrence of a parking impact event according to an embodiment of the present invention. Referring to FIG. 8, an impact may occur in a first vehicle a parked in a parking lot due to a collision with another vehicle c parked next to the first vehicle.

In this case, the surrounding vehicle event determination unit 185 of a second vehicle b may determine that a parking impact event has occurred in the first vehicle a based on a sound, a motion of a front object, and the like.

Alternatively, the impact sensing unit 170 of the first vehicle a may sense an impact from a collision with another vehicle c, and the image capturing apparatus 100 for a vehicle of the first vehicle a may notify the server 300 for providing a parking lot guidance service or the user terminal apparatus 400 of the first vehicle a of the occurrence of the impact event. In this case, the server 300 for providing a parking lot guidance service or the user terminal apparatus 400 may notify the image capturing apparatus 100 for a vehicle for a vehicle located in the surrounding of the first vehicle a, for example, the second vehicle b (i.e., a vehicle capturing an image of the first vehicle) of the occurrence of the event, and the surrounding vehicle event determination unit 185 of the second vehicle b may recognize that the event has occurred in the first vehicle a.

Meanwhile, when it is recognized that the parking impact event has occurred in the first vehicle a, the image capturing apparatus 100 for a vehicle of the second vehicle b may transmit the parking data generated by the parking lot data generation unit 175 to the server 300 for providing a parking lot guidance service. In this case, the server 300 for providing a parking lot guidance service may provide the parking impact event guidance service. Specifically, the control unit 340 may detect a license plate of the vehicle c that has generated the impact to the first vehicle a from the parking lot image of the parking data. In addition, the control unit 340 may detect location information of the parking lot in which the impact has occurred, information on the number of floors, location information of the parking space, and location information of the parking slot from the parking data. In addition, the control unit 340 may provide the parking impact event guidance service that guides the number of the vehicle generating the impact, an impact generation location, and the like, to the parking lot model based on the detected information.

In addition, the parking lot guidance service may further include a guidance service before entering the parking lot. That is, in a case of providing the guidance service before entering the parking lot, the control unit 340 may detect parking data of a parking lot located in the vicinity of the user terminal apparatus 400 among parking data on a plurality of parking lots stored in the parking lot model storage unit 332 using the location information of the user terminal apparatus 400. In addition, the control unit 340 may detect parking possible space information of the corresponding parking lot from the detected parking data, and provide the guidance service before entering the parking lot that displays the number of parking slots of the corresponding parking lot and a parking fee of the corresponding parking lot to the user terminal apparatus 400 based on the detected information.

Figure 12:
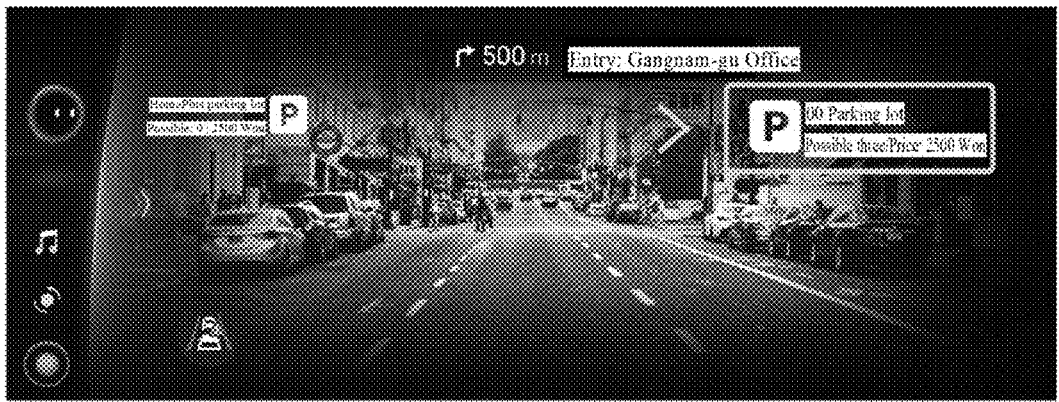
FIGS. 12 to 13B are views illustrating a user interface according to an embodiment of the present invention.

In this case, the user terminal apparatus 400 may display a guidance user interface before entering the parking lot as illustrated in FIG. 12. That is, referring to FIG. 12, the user terminal apparatus 400 may display a user interface including the number of parking possible slots of the corresponding parking lot and a parking fee of the corresponding parking lot. Additionally, the user interface may display a parking lot entry direction with an arrow in consideration of a location of the corresponding parking lot.

Meanwhile, the control unit 340 may provide various services to the user terminal apparatus 400 by analyzing the parking lot model configured by the parking lot model generation unit 320.

As an example, the control unit 340 may generate the total number of parking slots, a degree of congestion, a main congestion time, real-time remaining parking slot information, and own vehicle parking location information of the parking lot based on the parking lot model configured in the parking lot model generation unit 320, match the generated information to the parking lot model, and store the matched information in the storage unit 330.

In this case, the control unit 340 may calculate a degree of congestion by comparing a value obtained by dividing the number of occupied parking slots in the parking lot by the total number of parking slots in the parking lot with a preset value, and determine, for example, that a range of 0-30% is a low degree of congestion, a range of 30-60% is a medium degree of congestion, and a range of 60-100% is a high degree of congestion. Then, the control unit 340 may calculate a main congestion time of the corresponding parking lot based on the calculated degree of congestion and time information at that time.

In addition, the control unit 340 may generate parking fee information of the parking lot, operating hours of the parking lot, electric vehicle charging station information, and the like, match the generated information with the parking lot model, and store the matched information in the storage unit 330. Here, the electric vehicle charging station information may include whether the parking lot possesses an electric vehicle parking slot, the number of electric vehicle parking slots, an electric vehicle charging fee, electric vehicle charging station operating hours, and the like.

In this case, the control unit 340 may provide the total number of parking slots, a degree of congestion, a main congestion time, fee information, operating hours, electric vehicle charging station information, and the like, to the user terminal apparatus 400 connected to the server 300 for providing a parking lot guidance service.

In addition, when it is determined that the parking location is outdoors based on the parking location information on a location at which the vehicle is parked, the control unit 340 may determine whether or not the parking location is a back road parking slot and/or whether or not the parking location is an on-street parking slot based on analysis of the captured image data and/or the location information, and store a determination result in the storage unit 330. In this case, the control unit 340 may provide information whether or not the parking location of the user is the back road parking slot and/or whether or not the parking location of the user is the on-street parking slot, to the user terminal apparatus 400 that has accessed the server 300 for providing a parking lot guidance service.

In addition, the control unit 340 may analyze a commercial area located within a predetermined distance range based on the location of the parking lot in which the vehicle is parked. Specifically, the control unit 340 may analyze the trend of the commercial area based on types (e.g., restaurants, PC rooms, auto repair shops, etc.) of shops located within a predetermined distance based on the location of the parking lot in which the vehicle is parked, rental rates of the shops, maintenance periods of the shops, and the like. In this case, the control unit 340 may provide an analysis result of the trend of the commercial area in the vicinity of the parking location at which the user parks the vehicle, to the terminal apparatus 400 of the user who wants to visit the corresponding parking lot.

In addition, the control unit 340 may predict a parking lot in which the vehicle is expected to be parked and an expected parking time based on a destination of the vehicle, a location of the vehicle, a traffic situation, and the like, and guide a linked and/or alternative parking lot to the user terminal apparatus 400 in consideration of a situation of the expected parking lot. As an example, when a degree of congestion is high or the vehicle cannot be parked in the expected parking lot of the vehicle at the expected parking time, the control unit 340 may guide another parking lot linked to the expected parking lot to the user terminal apparatus 400. As another example, when there is a history of another vehicle parked in a nearby parking lot of the same parking lot as the expected parking lot of the vehicle after another vehicle visits the same parking lot as the expected parking lot, the control unit 340 may guide the nearby parking lot to the user terminal apparatus 400 as an alternative parking lot.

In addition, the control unit 340 may determine whether or not a dangerous situation (e.g., a fire, an accident in the parking lot, etc.) of the parking lot has occurred based on the images captured by the image capturing apparatus 100 for a vehicle, and store a determination result in the storage unit 330. In this case, the control unit 340 may provide information on whether or not the dangerous situation has occurred to the terminal apparatus 400 of the user who wants to visit the corresponding parking lot.

Meanwhile, the control unit 340 may relay data communication between a plurality of image capturing apparatuses 100 for a vehicle each provided in different vehicles to allow the plurality of image capturing apparatuses 100 for a vehicle to be communicatively connected to each other. As an example, the server 300 for providing a parking lot guidance service may be implemented as a cloud server.

Specifically, the control unit 340 may perform an event monitoring function between users. That is, the image capturing apparatus 100 for a vehicle may determine whether or not an event has occurred in another vehicle. As an example, the image capturing apparatus 100 for a vehicle may determine whether or not a situation requiring notification to another vehicle, such as an impact event or an accident event, has occurred in another vehicle through image analysis. When it is determined that the event has occurred, the image capturing apparatus 100 for a vehicle may upload an event image to the server 300 for providing a parking lot guidance service, and the control unit 340 of the server 300 for providing a parking lot guidance service may determine the user terminal apparatus 400 of a user who is the person involved in the occurrence of the event, transmit images captured by the image capturing apparatuses 100 for a vehicle vehicles located in the surrounding of another vehicle to the user terminal apparatus 400 of the corresponding user, and provide a relay service capable of transacting image data.

Furthermore, the control unit 340 may provide a relay service in the same manner for a human accident or theft accident event in addition to the vehicle.

In addition, the control unit 340 may provide a relay service in the same manner as to whether or not a crackdown event has occurred in another vehicle.

Figure 9:
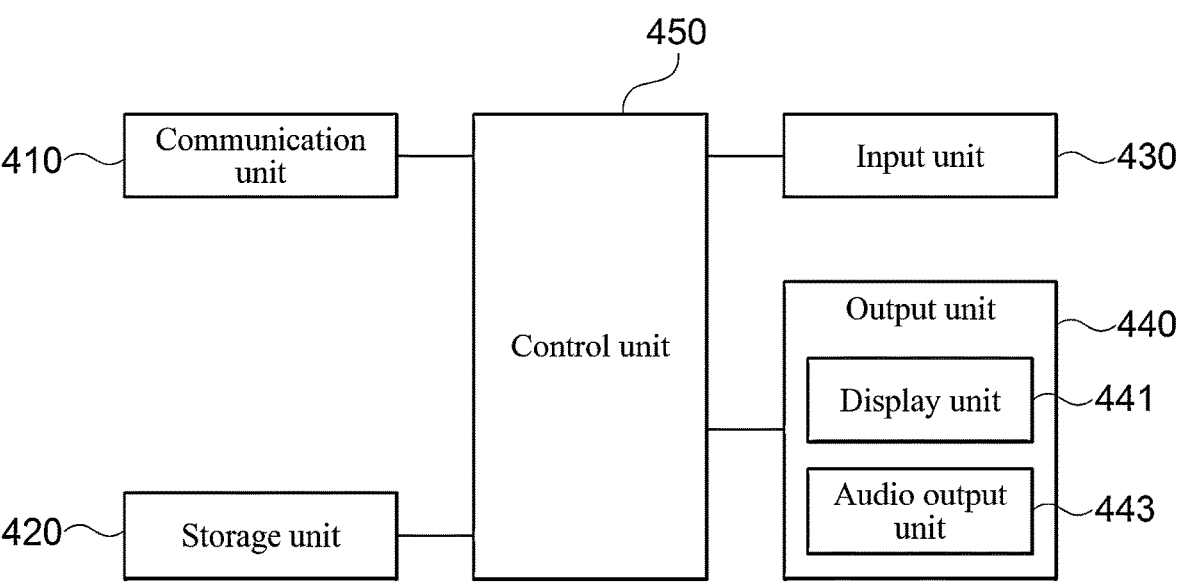
FIG. 9 is a block diagram illustrating a user terminal apparatus according to an embodiment of the present invention.

FIG. 9 is a block diagram illustrating a user terminal apparatus according to an embodiment of the present invention. Referring to FIG. 9, the user terminal apparatus 400 may include all or some of a communication unit 410, a storage unit 420, an input unit 430, an output unit 440, and a control unit 450.

The communication unit 410 may be provided for the user terminal apparatus 400 to communicate with other devices. Specifically, the user terminal apparatus 400 may transmit and receive data to and from at least one of the image capturing apparatus 100 for a vehicle, the communication apparatus 200 for a vehicle, and the server 300 for providing a parking lot guidance service through the communication unit 410.

For example, the communication unit 410 may access the server 300 for providing a parking lot guidance service storing the data generated by the image capturing apparatus 100 for a vehicle, and receive various data for the parking lot guidance service from the server 300 for providing a parking lot guidance service.

Here, the communication unit 410 may be implemented using various communication manners such as a connection form in a wireless or wired manner through a local area network (LAN) and the Internet network, a connection form through a USB port, a connection form through a mobile communication network such as 3G and 4G mobile communication networks, and a connection form through a short range wireless communication manner such as near field communication (NFC), radio frequency identification (RFID), and Wi-Fi.

The storage unit 420 serves to store various data and applications required for an operation of the user terminal apparatus 400. In particular, the storage unit 420 may store a "parking lot guidance service providing application" according to an embodiment of the present invention.

Here, the storage unit 420 may be implemented as a detachable storing element such as a universal serial bus (USB) memory, or the like, as well as an embedded storage element such as a random access memory (RAM), a flash memory, a read only memory (ROM), an erasable programmable ROM (EPROM), an electronically erasable and programmable ROM (EEPROM), a register, a hard disk, a removable disk, a memory card, or a universal subscriber identity module (USIM).

The input unit 430 serves to convert a physical input from the outside of the user terminal apparatus 400 into a specific electrical signal. Here, the input unit 430 may include both or one of a user input unit and a microphone unit.

The user input unit may receive a user input such as a touch, a gesture, or a push operation. Here, the user input unit may be implemented as various buttons, a touch sensor receiving a touch input, a proximity sensor receiving an approaching motion, or the like. In addition, the microphone unit may receive a voice of the user and a sound generated in the inside and the outside of the vehicle.

The output unit 440 is a component outputting data of the user terminal apparatus 400, and may include a display unit 441 and an audio output unit 443.

The display unit 441 may output data that may be visually recognized by the user of the user terminal apparatus 400. In particular, the display unit 441 may display a user interface corresponding to the parking lot guidance service according to the execution of the "parking lot guidance service providing application" according to an embodiment of the present invention.

Here, the parking lot guidance service user interface may include a parking possible location guidance user interface, a vehicle parking location guidance user interface, a parking lot route guidance user interface, and a parking impact event guidance user interface.

Meanwhile, the audio output unit 443 may output data that may be auditorily recognized by the user of the user terminal apparatus 400. Here, the audio output unit 443 may be implemented as a speaker representing data that is to be notified to the user of the user terminal apparatus 400 as a sound.

The control unit 450 controls overall operations of the user terminal apparatus 400. Specifically, the control unit 450 may control all or some of the communication unit 410, the storage unit 420, the input unit 430, and the output unit 440. In particular, when various data are received from the image capturing apparatus 100 for a vehicle, the communication apparatus 200 for a vehicle and/or the server 300 for providing a parking lot guidance service through the communication unit 410, the control unit 450 may process the received data to generate a user interface, and control the display unit 441 to display the generated user interface.

The control unit 450 may execute applications that provide advertisements, the Internet, games, moving images, and the like. In various embodiments, the control unit 450 may include one processor core or include a plurality of processor cores. For example, the control unit 450 may include a multi-core such as a dual-core, a quad-core, or a hexa-core. According to embodiments, the control unit 450 may further include a cache memory located inside or outside.

The control unit 450 may receive commands of other components of the user terminal apparatus 400, interpret the received commands, and perform calculation or process data according to the interpreted commands.

The control unit 450 may process data or signals generated in an application. For example, the control unit 450 may request the storage unit 420 to transmit an instruction, data, or a signal in order to execute or control the application. The control unit 450 may cause the storage unit 420 to write (or store) or update an instruction, data, or a signal in order in order to execute or control the application.

The control unit 450 may interpret and process messages, data, instructions, or signals received from the communication unit 410, the storage unit 420, the input unit 430, and the output unit 440. In addition, the control unit 450 may generate a new message, data, instruction, or signal based on the received messages, data, instructions, or signals. The control unit 450 may provide the processed or generated messages, data, instructions, or signals to the communication unit 410, the storage unit 420, the input unit 430, the output unit 440, and the like.

All or some of the control unit 450 may be electrically or operably coupled with or connected to other components (e.g., the communication unit 410, the storage unit 420, the input unit 430, and the output unit 440) in the user terminal apparatus 400.

According to embodiments, the control unit 450 may include one or more processors. For example, the control unit 450 may include an application processor (AP) that controls an upper layer program such as an application program, a communication processor (CP) that performs control for communication, or the like.

Meanwhile, the input unit 430 described above may receive an instruction, an interaction, or data from a user. The input unit 430 may sense a touch or hovering input of a finger and a pen. The input unit 430 may sense an input caused through a rotatable structure or a physical button. The input unit 430 may include sensors for sensing various types of inputs. The input received by the input unit 430 may have various types. For example, the input received by the input unit 430 may include a touch and release, a drag and drop, a long touch, a force touch, and a physical depression, and the like. The input unit 430 may provide the received input and data related to the received input to the control unit 450. In various embodiments, although not illustrated in FIG. 9, the input unit 430 may include a microphone (or transducer) capable of receiving a user's voice command. In various embodiments, although not illustrated in FIG. 9, the input unit 430 may include an image sensor or a camera capable of receiving a user's motion.

Meanwhile, the display unit 441 described above may output a content, data, or a signal. In various embodiments, the display unit 441 may display an image signal processed by the control unit 450. As an example, the display unit 441 may display a captured or still image. As another example, the display unit 441 may display a moving image or a camera preview image. As still another example, the display unit 441 may display a graphical user interface (GUI) so that the user may interact with the user terminal apparatus 400.

The display unit 441 may be configured with a liquid crystal display (LCD) or an organic light emitting diode (OLED).

According to embodiments, the display unit 441 may be configured with an integrated touch screen by being coupled with a sensor capable of receiving a touch input or the like.

In various embodiments, the control unit 450 may map at least one function to the input unit 430 so that the input unit 430 has at least one function of a plurality of functions that the user terminal apparatus 400 may provide to the user. For example, the at least one function may include at least one of an application execution function, a parking location guidance function of the vehicle, a live view viewing function that is a viewing function of a real-time captured image of the image capturing apparatus 100 for a vehicle, a power turn-on/off control function of the image capturing apparatus 100 for a vehicle, a power turn-on/off function of the vehicle, a parking/driving mode guidance function of the vehicle, an event occurrence guidance function, a current vehicle location inquiry function, a vehicle parking location and parking time guidance function, a parking history guidance function, a driving history guidance function, an image sharing function, an event history function, a remote playback function, and an image viewing function.

In various embodiments, the input unit 430 may receive configuration information from the control unit 450. The input unit 430 may display an indication for indicating the function based on the configuration information.

In various embodiments, the control unit 450 may transmit the configuration information to the input unit 430 in order to indicate what the at least one function is mapped the input unit 430 is. The configuration information may include data for displaying an indication for indicating which function of the plurality of functions is provided through the input unit 430, through the display unit 411. The configuration information may include data for indicating a function selected by the control unit 450 among the plurality of functions.

In addition, the control unit 450 may generate a user interface based on the data received from the server 300 for providing a parking lot guidance service and control the display unit 441 to display the generated user interface.

Meanwhile, when parking of the own vehicle is completed, the control unit 450 may automatically generate parking location information of the own vehicle, generate a user interface based on the automatically generated parking location information, and control the display unit 441 to display the generated user interface. In this case, the control unit 450 may generate the parking location information of the own vehicle using a satellite navigation apparatus such as a GPS provided in the user terminal apparatus 400.

Specifically, the control unit 450 may generate the parking location information of the own vehicle based on whether or not a Bluetooth connection between the user terminal apparatus 400 and the own vehicle has been made or whether a connection of an application for a vehicle (e.g., Apple™, Carplay™, Auto™ of Android™, navigation, parking guidance service providing application, etc.) has been made.

For example, the control unit 450 may generate a location of the user terminal apparatus 400 at a point in time when the Bluetooth connection between the user terminal apparatus 400 and the own vehicle is released as the parking location information of the own vehicle.

Through this, the user terminal apparatus 400 may provide the vehicle parking location guidance service to the user even when the parking location information of the own vehicle is not generated or is erroneously generated in the server 300 for providing a parking lot guidance service.

Figure 10:
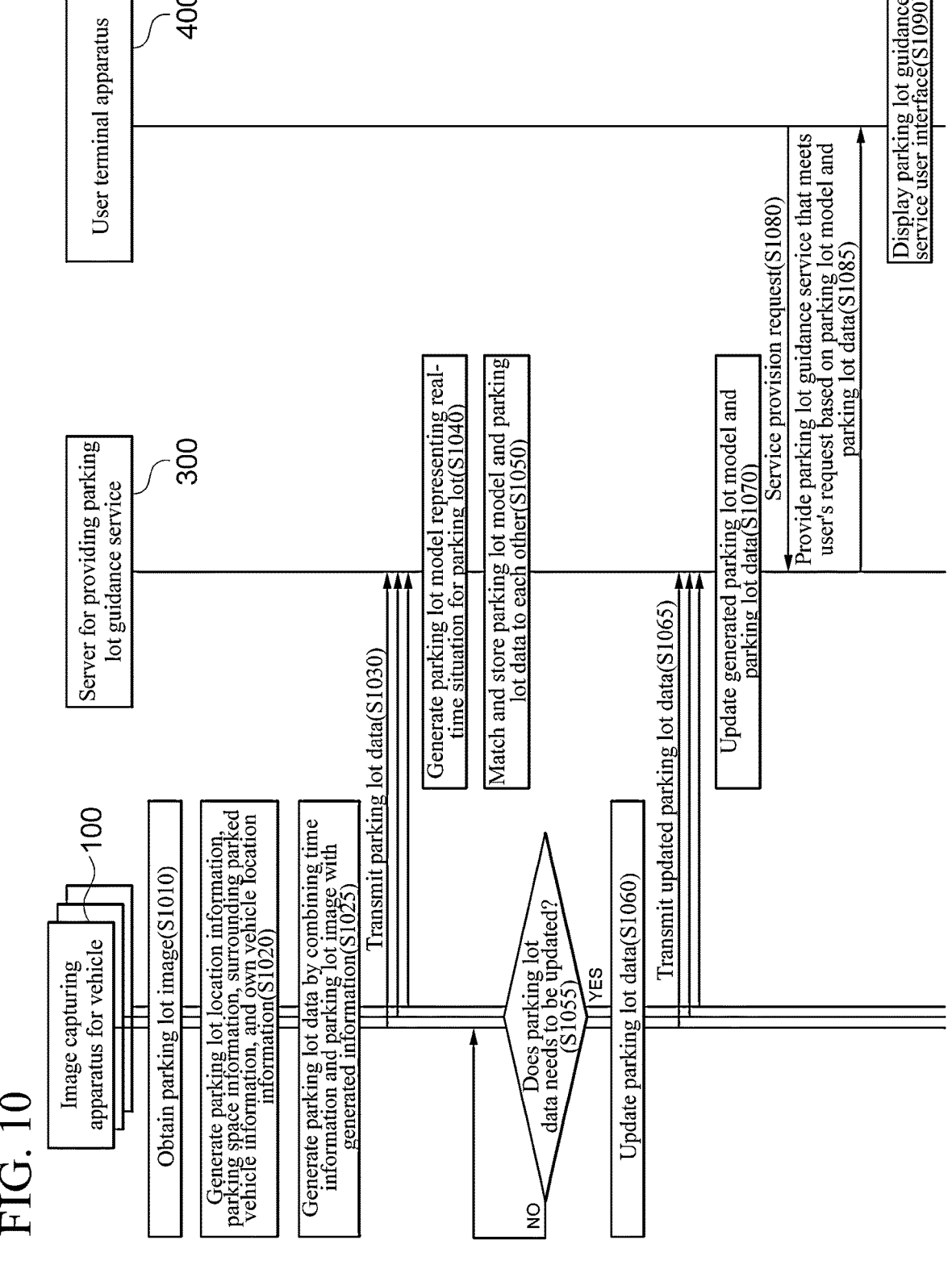
FIG. 10 is a timing diagram illustrating a method for providing a parking lot guidance service according to an embodiment of the present invention.

FIG. 10 is a timing diagram illustrating a method for providing a parking lot guidance service according to an embodiment of the present invention.

Referring to FIG. 10, each of a plurality of image capturing apparatuses 100 for a vehicle may obtain a parking lot image by performing image capturing (S1010). Here, the parking lot image may include an image captured during a period from a point in time when the vehicle enters the parking lot to a point in time when the vehicle exits from the parking lot.

Then, each of the plurality of image capturing apparatuses 100 for a vehicle may generate at least one of parking lot location information, parking space information, surrounding parked vehicle information, and own vehicle location information (S1020). Here, S1020 may be performed by the parking lot location information generator 175-1, the parking space information generator 175-2, the parked vehicle information generator 175-3, the own vehicle location information generator 175-4, and the AI processor 175-5.

Then, each of the plurality of image capturing apparatuses 100 for a vehicle may generate parking lot data by combining time information and the parking lot image with the generated information (S1025), and transmit the generated parking lot data to the server 300 for providing a parking lot guidance service (S1030).

In this case, the server 300 for providing a parking lot guidance service may generate a parking lot model representing a real-time situation for the parking lot using the received parking lot data (S1040). Here, the parking lot model generated by the parking lot model generation unit 320 may be a three-dimensional (3D) model.

Then, the server 300 for providing a parking lot guidance service may match and store the generated parking lot model and parking lot data to each other (S1050). Specifically, in S1050, the parking lot model and the corresponding parking lot location information, parking space information, surrounding parked vehicle information, own vehicle location information, time information, and parking lot image may be matched and stored to each other.

Meanwhile, each of the plurality of image capturing apparatuses 100 for a vehicle may determine whether or not the parking lot data needs to be updated (S1055), update the parking lot data (S1060) when the parking lot data needs to be updated (S1055: Y), and transmit the updated parking lot data to the server 300 for providing a parking lot guidance service (S1065).

Here, an update condition of the parking lot data may include a case where a change occurs in the parking lot image due to an exit of a surrounding vehicle of the own vehicle, a case where a preset period has arrived, or the like.

Meanwhile, the server 300 for providing a parking lot guidance service may update the generated parking lot model and parking lot data using the received parking lot data (S1070). Specifically, the parking lot model generation unit 300 may update the parking lot model by extracting only a difference portion between the generated parking lot model and a subsequently generated parking lot model and then reflecting only the difference portion.

Meanwhile, the server 300 for providing a parking lot guidance service may receive a service provision request from the user terminal apparatus 400 that has accessed the server for providing a parking lot guidance service (S1080).

In this case, the server 300 for providing a parking lot guidance service may provide a parking lot guidance service that meets a user's request based on the parking lot model and the parking lot data (S1085).

In this case, the user terminal apparatus 400 may display a parking lot guidance service user interface corresponding to the parking lot guidance service provided by the server 300 for providing a parking lot guidance service (S1090). Here, the parking lot guidance service user interface may include a parking possible location guidance user interface, a vehicle parking location guidance user interface, and a parking lot route guidance user interface.

Meanwhile, the server 300 for providing a parking lot guidance service may provide a service related alarm to the user terminal apparatus 400 according to a specific condition even though there is no user's service provision request. In this case, the service related alarm is an alarm related to the parking location guidance service, and may be link data linked to a parking location of the own vehicle or a vehicle parking location guidance user interface.

Specifically, the specific condition may include a case where getting-off of the user from the vehicle is sensed, a case where a user's action for finding the parked vehicle is sensed (for example, a case where the user moves to the parking lot, a case where an engine of the vehicle is remotely turned on, a case where navigation is executed, etc.), a predetermined time interval after parking, and the like. Here, the specific condition may be received from the user terminal apparatus 400 or the image capturing apparatus 100 for a vehicle.

Figure 11:
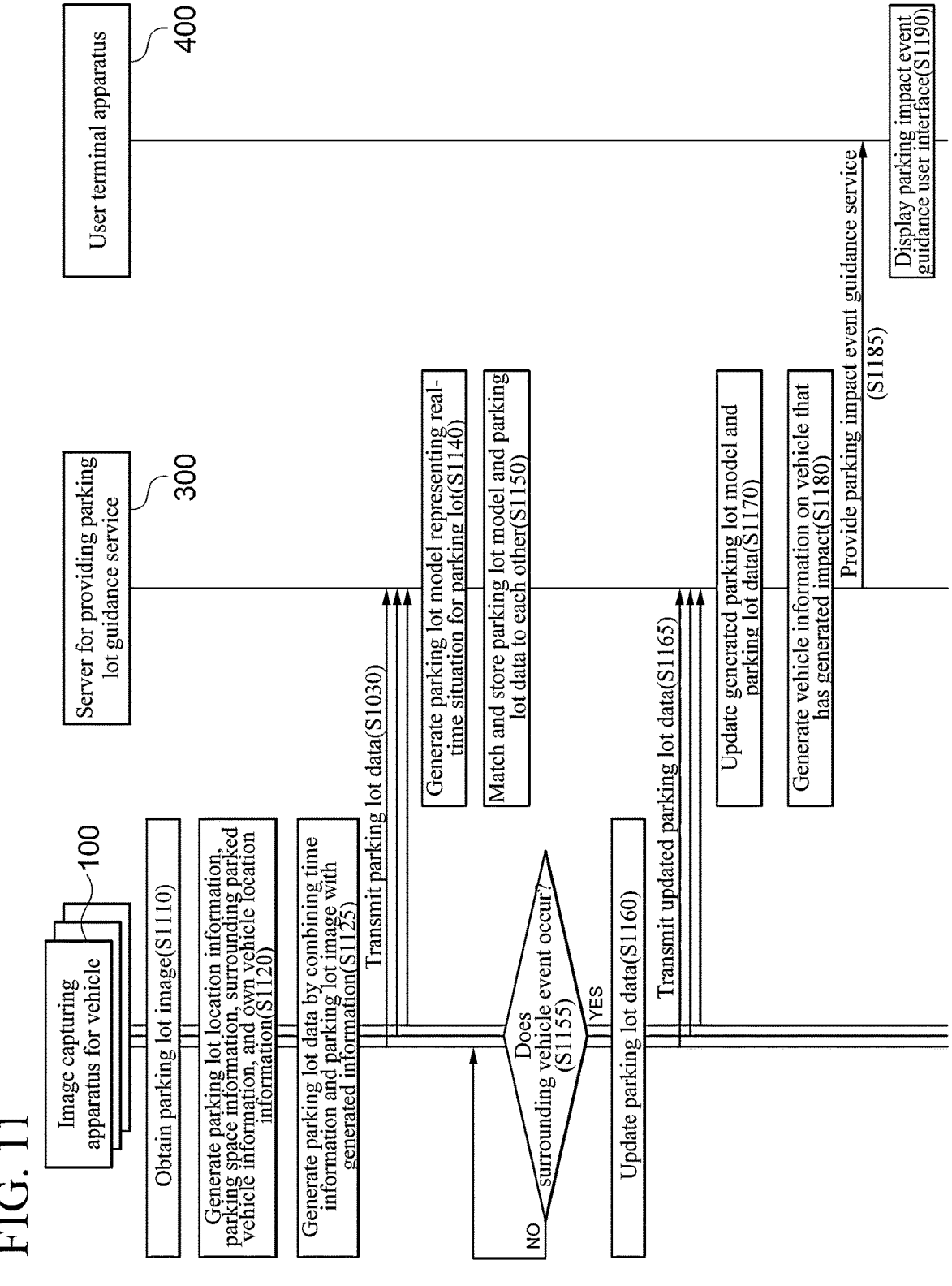
FIG. 11 is a timing diagram illustrating a method for providing a parking lot guidance service according to another embodiment of the present invention.

FIG. 11 is a timing diagram illustrating a method for providing a parking lot guidance service according to another embodiment of the present invention.

Referring to FIG. 11, each of a plurality of image capturing apparatuses 100 for a vehicle may obtain a parking lot image by performing image capturing (S1110). Then, each of the plurality of image capturing apparatuses 100 for a vehicle may generate at least one of parking lot location information, parking space information, surrounding parked vehicle information, and own vehicle location information (S1120).

Then, each of the plurality of image capturing apparatuses 100 for a vehicle may generate parking lot data by combining time information and the parking lot image with the generated information (S1125), and transmit the generated parking lot data to the server 300 for providing a parking lot guidance service (S1130).

In this case, the server 300 for providing a parking lot guidance service may generate a parking lot model representing a real-time situation for the parking lot using the received parking lot data (S1140). Then, the server 300 for providing a parking lot guidance service may match and store the generated parking lot model and parking lot data to each other (S1150).

Meanwhile, each of the plurality of image capturing apparatuses 100 for a vehicle may determine whether or not an event has occurred in another vehicle parked in the surrounding of the own vehicle (S1155).

As an example, each of the plurality of image capturing apparatuses 100 for a vehicle may determine whether or not the event has occurred in the surrounding vehicle based on a sound, a motion of a front object, and the like. Alternatively, each of the plurality of image capturing apparatuses 100 for a vehicle may determine whether or not the event has occurred in the surrounding vehicle according to a request from a remote place.

When it is determined that a surrounding vehicle impact event has occurred (S1155: Y), each of the plurality of image capturing apparatuses 100 for a vehicle may update the parking lot data (S1160), and transmit the updated parking lot data to the server 300 for providing a parking lot guidance service (S1165). Here, the updated parking lot data may include data a predetermined time before and after an occurrence point in time of the surrounding vehicle impact event.

Meanwhile, the server 300 for providing a parking lot guidance service may update the generated parking lot model and parking lot data using the received parking lot data (S1170).

Then, the server 300 for providing a parking lot guidance service may generate vehicle information on a vehicle that has generated the impact from the updated parking lot data (S1180). Here, the vehicle information on the vehicle that has generated the impact may include vehicle number information, location information of a parking lot in which the impact has been generated, information on the number of floors, location information of a parking space, and location information of a parking slot.

Then, the server 300 for providing a parking lot guidance service may provide a parking impact event guidance service to the user terminal apparatus 400 of a user of a vehicle to which the impact has been applied based on the vehicle information on the vehicle that has generated the impact (S1185).

In this case, the user terminal apparatus 400 may display a parking impact event guidance user interface corresponding to the parking impact event guidance service provided by the server 300 for providing a parking lot guidance service (S1190). Here, the parking impact event guidance service user interface may display the number of the vehicle generating the impact, an impact generation location, and the like.

Figure 14:
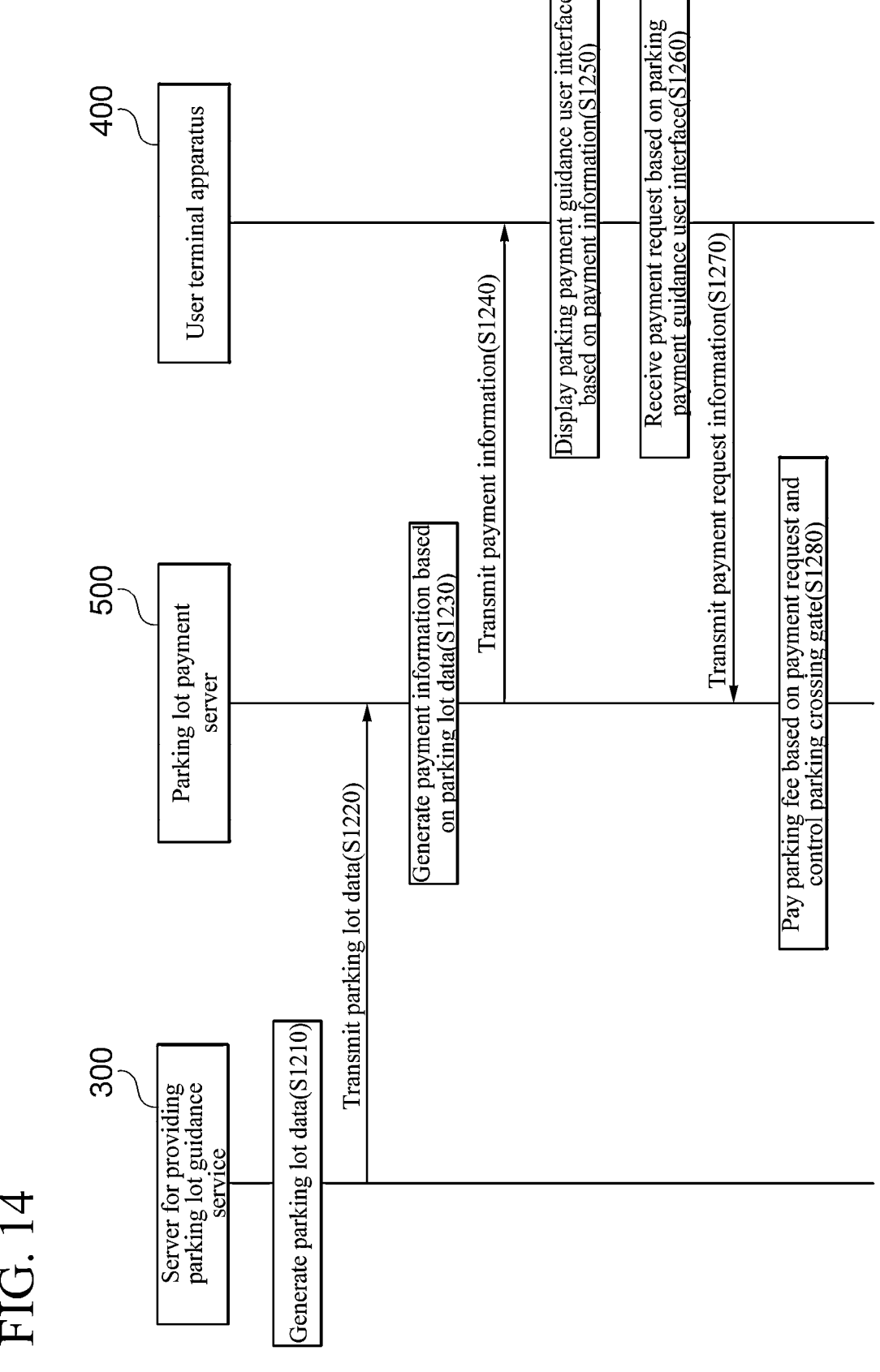
FIG. 14 is a timing diagram illustrating a method for providing a parking lot payment service according to still another embodiment of the present invention.

FIG. 14 is a timing diagram illustrating a method for providing a parking lot payment service according to still another embodiment of the present invention.

Referring to FIG. 14, the server 300 for providing a parking lot guidance service may obtain a parking lot image, generate parking lot location information, parking space information, surrounding parked vehicle information, and own vehicle location information, and generate parking lot data by combining time information and the parking lot image to the generated information (S1210).

Then, the server 300 for providing a parking lot guidance service may transmit the generated parking lot data to a parking lot payment server 500 (S1220), and the parking lot payment server 500 may generate payment information based on the parking lot data (S1230). Here, the payment information may include parking rate, parking time, vehicle type, penalty, and incentive information of the corresponding vehicle.

Specifically, the parking lot payment server 500 may calculate penalty information or incentive information based on the own vehicle location information in the parking lot data, and calculate a parking fee of the corresponding vehicle based on the calculated penalty or incentive information and the time information to generate the payment information. Here, the penalty information or the incentive information is information related to an addition/reduction rate of the parking fee according to a parking location of the corresponding vehicle, and may be determined differently depending on the parking location and the parking time of the vehicle.

As an example, when a vehicle of a non-handicapped person is parked in a handicapped parking area, the parking lot payment server 500 may calculate penalty information for a parking fee reduction rate proportional to a parking time, and apply the penalty information to a parking fee according to the parking time to calculate a parking fee.

As another example, when a vehicle is parked in a non-parking area, when a medium-size vehicle is parked in a light-weight vehicle area, or when a vehicle is parked to obstruct parking of other vehicles (is parked partially out of a parking area), the parking lot payment server 500 may calculate penalty information and generate the payment information.

In addition, the parking lot payment server 500 incentive information based on discount may calculate information and calculate a parking fee of the corresponding vehicle based on the calculated incentive information and time information to generate the payment information. Here, the discount information may include various information related to parking fee discounts such as card payment details in a building in which the corresponding parking lot is located, a parking discount coupon, a discount for a person having many children, an electric vehicle discount, and a discount for a handicapped person. Such discount information may be input from the server 300 for providing a parking lot guidance service or be received from the user terminal apparatus 400.

In addition, the parking lot payment server 500 may transmit the generated payment information to the user terminal apparatus 400 (S1240), and the user terminal apparatus 400 may display a parking payment guidance user interface based on the payment information (S1250). Here, the parking payment guidance user interface may include a parking situation (a parking time, a parking area, etc.), parking fee inquiry, parking fee payment, and the like.

In addition, the user terminal apparatus 400 may receive a payment request from the user based on the parking payment guidance user interface (S1260), and transmit the payment request to the parking lot payment server 500 (S1270). In this case, the payment request may include card information for paying the parking fee.

Then, the parking lot payment server 500 may pay the parking fee of the corresponding vehicle based on the payment request, and control a parking crossing gate of the corresponding parking lot (S1280).

Figure 15:
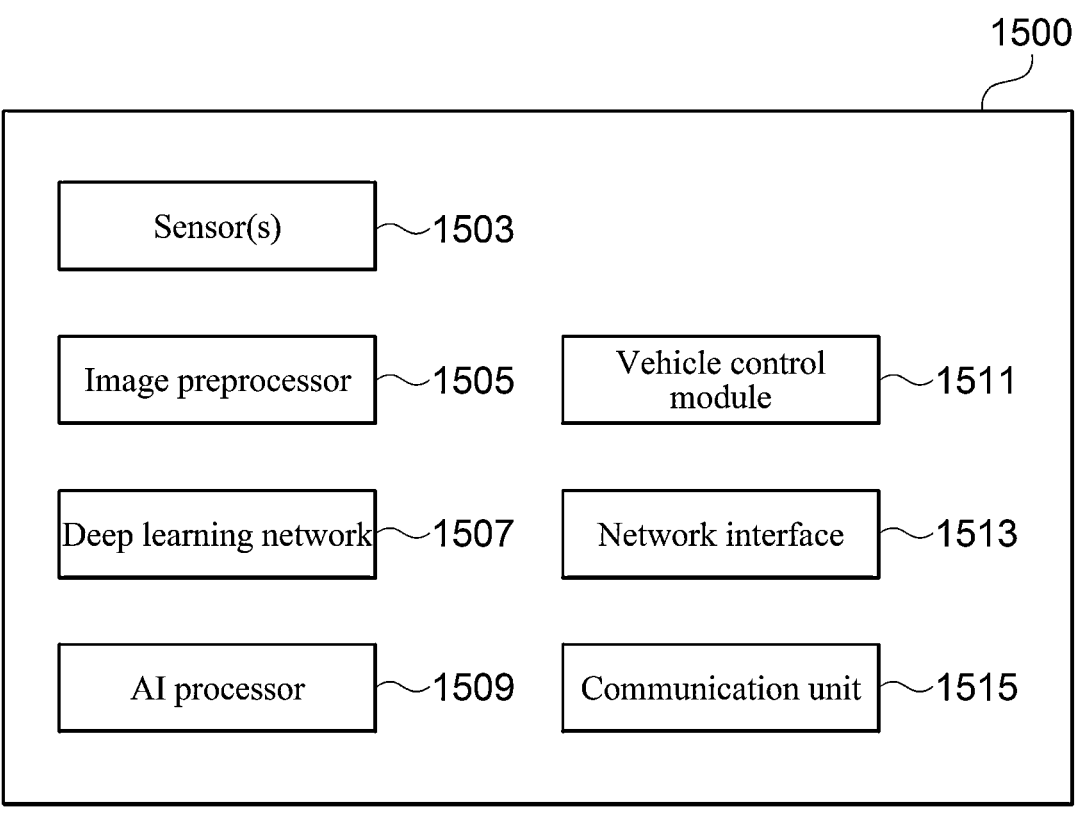
FIG. 15 is a block diagram illustrating an autonomous driving system of a vehicle according to an embodiment of the present invention.

FIG. 15 is a block diagram illustrating an autonomous driving system 1500 of a vehicle according to an embodiment of the present invention.

The autonomous driving system 1500 of a vehicle illustrated in FIG. 15 is a deep learning network including sensors 1503, an image preprocessor 1505, a deep learning network 1507, an artificial intelligence (AI) processor 1509, a vehicle control module 1511, a network interface 1513, and a communication unit 1515. In various embodiments, the respective components may be connected to each other through various interfaces. For example, sensor data sensed and output by the sensors 1503 is fed to the image preprocessor 1505. The sensor data processed by the image preprocessor 1505 is fed to the deep learning network 1507 running on the AI processor 1509. An output of the deep learning network 1507 running on the AI processor 1509 is fed to the vehicle control module 1511. Intermediate results of the deep learning network 1507 running on the AI processor 1507 are fed to the AI processor 1509. In various embodiments, the network interface 1513 performs communication with remote servers based on an autonomous driving operation of the vehicle, and transfers information transmitted and received through the communication with the remote servers to internal block components. In addition, the network interface 1513 is used to transmit sensor data acquired from the sensor(s) 1503 to a remote server or internal block components. In some embodiments, the autonomous driving system 1500 may include additional or fewer components as appropriate. For example, in some embodiments, the image preprocessor 1505 is an optional component. According to another example, in some embodiments, a post-processing component (not illustrated) is used to perform post-processing on an output of the deep learning network 1507 before the output is provided to the vehicle control module 1511.

In some embodiments, the sensors 1503 include one or more sensors. In various embodiments, the sensors 1503 may be attached to different locations of the vehicle and/or so as to face one or more different directions. For example, the sensors 1503 may be directed to a front, sides, a rear, and/or a roof of the vehicle in directions such as forward-facing, rear-facing, side-facing, and the like. In some embodiments, the sensors 1503 may be image sensors such as high dynamic range cameras. In some embodiments, the sensors 1503 include non-visual sensors. In some embodiments, the sensors 1503 include a radio detection and ranging (RADAR), a light detection and ranging (LiDAR), and/or an ultrasonic sensor in addition to the image sensors. In some embodiments, the sensors 1503 are not mounted on a vehicle having the vehicle control module 1511. For example, the sensors 1503 may be included as a part of a deep learning system for capturing sensor data, and may be attached to an environment or a road and/or mounted on surrounding vehicles.

In some embodiments, the image pre-processor 1505 is used to preprocess the sensor data of the sensors 1503. For example, the image preprocessor 1505 may be used to preprocess the sensor data, split the sensor data into one or more components, and/or post-process one or more components. In some embodiments, the image preprocessor 1505 may be a graphics processing unit (GPU), a central processing unit (CPU), an image signal processor, or a specialized image processor. In various embodiments, the image preprocessor 1505 may be a tone-mapper processor for processing high dynamic range data. In some embodiments, the image preprocessor 1505 may be a component of the AI processor 1509.

In some embodiments, the deep learning network 1507 is a deep learning network for implementing control commands for controlling an autonomous vehicle. For example, the deep learning network 1507 may be an artificial neural network, such as a convolutional neural network (CNN) trained using the sensor data, and an output of the deep learning network 1507 is provided to the vehicle control module 1511.

In some embodiments, the artificial intelligence (AI) processor 1509 is a hardware processor for running the deep learning network 1507. In some embodiments, the AI processor 1509 is a specialized AI processor for performing inference using convolutional neural networks (CNNs) on the sensor data. In some embodiments, the AI processor 1509 is optimized for a bit depth of the sensor data. In some embodiments, the AI processor 1509 is optimized for deep learning operations, such as operations of a neural network including convolution, dot product, vector, and/or matrix operations, among others. In some embodiments, the AI processor 1509 may be implemented using a plurality of graphic processing units (GPUs) that may effectively perform parallel processing.

In various embodiments, the AI processor 1509 is coupled to a memory configured to provide an AI processor having instructions causing deep learning analysis to be performed on the sensor data received from the sensor(s) 1503 and causing a machine learning result used to at least partially autonomously operate the vehicle to be determined when executed, through an input/output interface. In some embodiments, the vehicle control module 1511 is used to process commands for vehicle control output from the artificial intelligence (AI) processor 1509 and to translate an output of the AI processor 1509 into instructions for controlling modules of each vehicle in order to control various modules of the vehicle. In some embodiments, the vehicle control module 1511 is used to control a vehicle for autonomous driving. In some embodiments, the vehicle control module 1511 may adjust steering and/or speed of the vehicle. For example, the vehicle control module 1511 may be used to control driving of the vehicle, such as deceleration, acceleration, steering, lane change, and lane maintenance. In some embodiments, the vehicle control module 1511 may generate control signals for controlling vehicle lighting, such as brake lights, turns signals, and headlights. In some embodiments, the vehicle control module 1511 is used to control vehicle audio related systems such as a vehicle's sound system, vehicle's audio warnings, a vehicle's microphone system, and a vehicle's horn system.

In some embodiments, the vehicle control module 1511 is used to control notification systems including warning systems for notifying passengers and/or driver of driving events, such as an approach to an intended destination or a potential collision. In some embodiments, the vehicle control module 1511 is used to adjust sensors such as the sensors 1503 of the vehicle. For example, the vehicle control module 1511 may modify the orientation of the sensors 1503, change output resolution and/or a format type of the sensors 1503, increase or decrease a capture rate, adjust a dynamic range, and adjust a focus of a camera. In addition, the vehicle control module 1511 may individually or collectively turn on/off operations of the sensors.

In some embodiments, the vehicle control module 1511 may be used to change parameters of the image preprocessor 1505 in a manner such as a manner of modifying frequency ranges of filters, adjusting features and/or edge detection parameters for object detection, or adjusting channels and bit depth. In various embodiments, the vehicle control module 1511 is used to control autonomous driving of the vehicle and/or a driver assistance function of the vehicle.

In some embodiments, the network interface 1513 is in charge of an internal interface between block components of the autonomous driving system 1500 and the communication unit 1515. Specifically, the network interface 1513 is an intercommunication interface for receiving and/or sending data including voice data. In various embodiments, the network interface 1513 interfaces with external servers in order to connect voice calls, receive and/or sends text messages, transmit the sensor data, updates software of the vehicle with the autonomous driving system, or to update software of the autonomous driving system of the vehicle through the communication unit 1515.

In various embodiments, the communication unit 1515 includes various wireless interfaces in a cellular or WiFi manner. For example, the network interface 1513 may be used to receive an update for operating parameters and/or instructions for the sensors 1503, the image preprocessor 1505, the deep learning network 1507, the AI processor 1509, and the vehicle control module 1511 from servers connected through the communication unit 1515. For example, a machine learning model of the deep learning network 1507 may be updated using the communication unit 1515. According to another example, the communication unit 1515 may be used to update operating parameters of the image preprocessor 1505 such as image processing parameters and/or firmware of the sensors 1503.

In another embodiment, the communication unit 1515 is used to activate communication for emergency services and emergency contact in an accident or a near-accident event. For example, in a crash event, the communication unit 1515 may be used to hail emergency services for assistance, and may notify the outside of emergency services of crash details and a location of the vehicle. In various embodiments, the communication unit 1515 may update or obtain an expected arrival time and/or a destination location.

Figure 16:
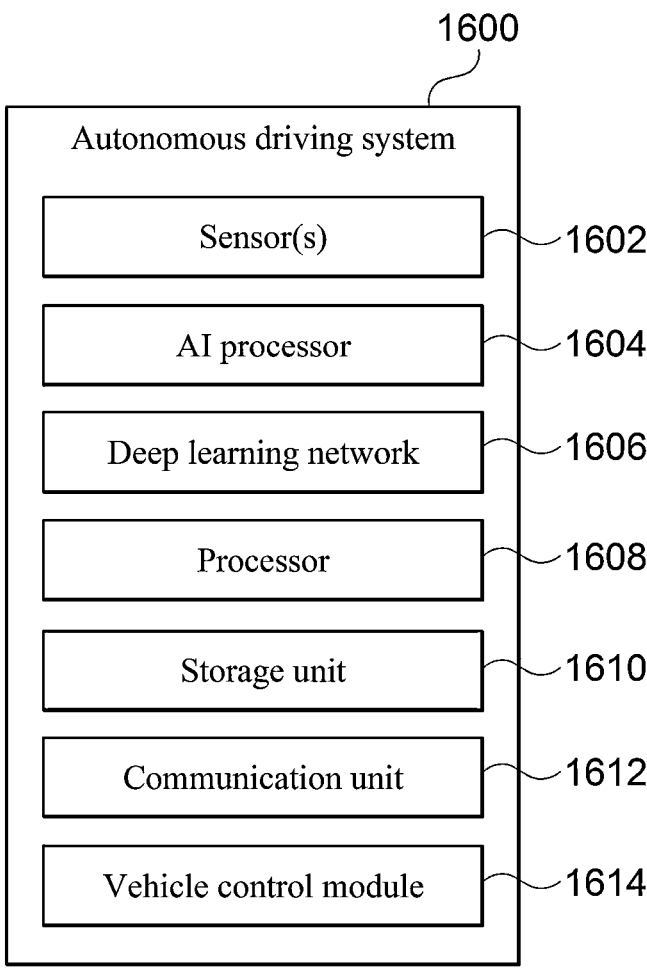
FIG. 16 is a block diagram of an autonomous driving system according to another embodiment of the present invention.

FIG. 16 is a block diagram of an autonomous driving system 1600 according to another embodiment of the present invention.

Referring to FIG. 16, sensors 1602 include one or more sensors. In various embodiments, the sensors 1602 may be attached to different locations of the vehicle and/or so as to face one or more different directions. For example, the sensors 1602 may be directed to a front, sides, a rear, and/or a roof of the vehicle in directions such as forward-facing, rear-facing, side-facing, and the like. In some embodiments, the sensors 1503 may include image sensors such as high dynamic range cameras and/or non-visual sensors. In some embodiments, the sensors 1602 may include a RADAR, a LiDAR, and/or an ultrasonic sensor in addition to the image sensors.

An AI processor 1604 may include a high-performance processor capable of accelerating learning of an AI algorithm such as deep learning by efficiently processing a large amount of data required in order to perform autonomous driving and autonomous parking of the vehicle.

A deep learning network 1606 is a deep learning network for implementing control commands for controlling autonomous driving and/or autonomous parking of the vehicle. For example, the deep learning network 1606 may be an artificial neural network, such as a convolutional neural network (CNN) trained using the sensor data, and an output of the deep learning network 1606 is provided to a vehicle control module 1614.

The processor 1608 may control overall operations of the autonomous driving system 1600, and control the sensor(s) 1602 to acquire sensor information necessary for the autonomous driving and/or the autonomous parking of the vehicle according to an output result of the deep learning network 1606. In addition, the processor 1608 may generate control information of the vehicle for performing the autonomous driving and/or the autonomous parking of the vehicle using the acquired sensor information and a deep learning result, and output the control information to the vehicle control module 1614.

In addition, when an autonomous parking request is input by the user, the processor 1608 may transfer an autonomous parking service request (parking lot empty space request message) to a server 1800 for providing a service through a communication unit 1612, and control the vehicle control module 1614 to perform m autonomous driving and autonomous parking to a parking possible space according to an autonomous parking service response (parking empty space response message) received from the server 1800 for providing a service. In this case, the autonomous parking request by the user may be performed through a user's touch gesture input through a display unit (not illustrated) or a voice command input through a voice input unit.

In addition, the processor 1608 may perform control to download an application and/or map data for a service possible area from the server for providing a service through the communication unit 1612 when the vehicle enters a parking lot guidance service and/or autonomous parking service possible area.

In addition, when the vehicle arrives at a parking possible area and the autonomous parking of the vehicle is completed, the processor 1608 transmits a parking completion message to the server 1800 for providing a service through the communication unit 1612, and turns off an engine of the vehicle, or turns off power of the vehicle. In this case, the parking completion message may include parking completion time and location information of the vehicle, wake-up time information of the autonomous driving system 1600, and the like.

In addition, when an autonomous vehicle enters a parking space, a processor 1608 generates a control command for performing autonomous parking using various sensor information obtained from the sensors 1602 and outputs the control command to the vehicle control module 1614. For example, the processor 1608 may identify a parking slot located in a parking lot from a parking lot image obtained through an image obtaining sensor, and also identify whether or not a vehicle is parked in the parking slot. For example, when a parking line marked in the parking lot is detected through analysis of the parking lot image obtained through the image obtaining sensor, the processor 1608 may identify a detected area as a parking slot, and determine whether or not parking is possible according to whether or not a vehicle exists in the identified parking slot. In addition, the processor 1608 outputs a control command for parking the vehicle while preventing a collision with an obstacle using a direction and a location of the obstacle obtained from the sensors 1602 (ultrasonic sensor, RADAR, LiDAR, etc.) of the vehicle to the vehicle control module 1614 in order to autonomously park the vehicle in a parking possible slot.

In another embodiment, when the autonomous vehicle enters the parking space, the processor 1608 uses the sensor data of the sensors 1602 so as to move and park the vehicle to and at a location corresponding to location information of a parking possible slot received from the server 1800 for providing a service. Specifically, the processor 1608 outputs a control command for performing autonomous parking while avoiding collision with walls and pillars of the parking lot and other vehicles parked in other parking slots of the parking lot using the sensor data of the sensors 1602 to the vehicle control module 1614.

The storage unit 1610 may store training data for a deep learning network for performing the autonomous driving and/or the autonomous parking of the vehicle and/or software for performing the autonomous driving and/or the autonomous parking of the vehicle, and electronic map data for route guidance and the autonomous driving.

The communication unit 1612 transmits and receives data through a wireless communication network between the autonomous driving system 1600 and a user terminal apparatus 1700 and/or the server 1800 for providing a service.

The vehicle control module 1614 may output control commands for controlling acceleration, deceleration, steering, gear shift, and the like, of the vehicle for performing an autonomous driving function of the vehicle and/or an autonomous parking function of the vehicle to respective components. For example, the vehicle control module 1614 outputs an acceleration command to an engine and/or an electric motor of the vehicle when the acceleration of the vehicle is required, outputs a brake command to the engine and/or the electric motor or a braking device of the vehicle when the deceleration of the vehicle is required, and generates and outputs a control command for moving the vehicle in a determined vehicle traveling direction to a vehicle steering wheel or a vehicle wheel when a change of a vehicle traveling direction is required.

Figure 17:
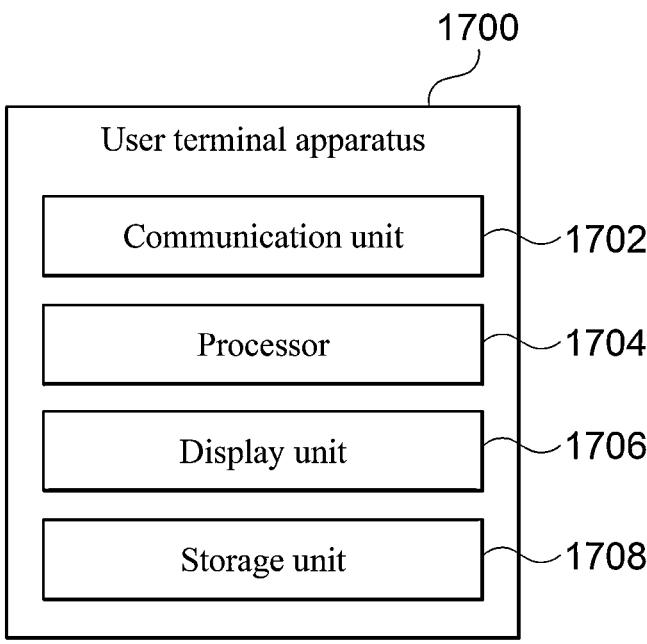
FIG. 17 is a block diagram of a user terminal apparatus according to another embodiment of the present invention.

FIG. 17 is a block diagram of a user terminal apparatus 1700 according to another embodiment of the present invention.

The user terminal apparatus 1700 according to another embodiment of the present invention includes a communication unit 1702, a processor 1704, a display unit 1706, and a storage unit 1708. The communication unit 1702 is connected to and transmits and receives data to and from the autonomous driving system 1600 and/or the server 1800 for providing a service through a wireless network.

The processor 1704 controls overall functions of the user terminal apparatus 1700, and transmits an autonomous driving command and/or an autonomous parking command input from a user to the autonomous driving system 1600 through the communication unit 1702 according to another embodiment of the present invention. When a push notification message related to autonomous driving and/or autonomous parking is received from the server 1800 for providing a service, the processor 1704 controls the display unit 1706 to display the push notification message to the user. In this case, the push notification message may include autonomous driving information, autonomous parking completion, parking location information, fee information, and the like. In addition, when a parking fee payment request input is received by the user, the processor 1704 may run an application for payment of a parking fee to confirm payment information (credit card information, account number, etc.) of the user, and request a server (not illustrated) for providing a payment service of the user to pay a parking fee charged by the server 1800 for providing a service.

In addition, when a vehicle hailing service provision is requested from the user, the processor 1704 according to another embodiment of the present invention drives a vehicle hailing application and outputs the vehicle hailing application through the display unit 1706, and transmits a vehicle hailing service request message to the server 1800 for providing a service through the communication unit 1702 when a vehicle hailing location is input and a vehicle hailing command is then input from the user. In addition, when a vehicle hailing request success message is received from the server 1800 for providing a service through the communication unit 1702, the processor 1704 according to another embodiment of the present invention provides a notification for notifying the user that the vehicle hailing request has been successfully made to the user through the vehicle hailing application.

In addition, when various information (vehicle departure notification, estimated time of arrival and current location of a vehicle, and arrival notification information) according to a vehicle hailing service is received from the server 1800 for providing a service, the processor 1704 according to another embodiment of the present invention provides the various information to the user through a push notification message or the like.

In addition, when it is determined that current location information of the vehicle has deviated from a service possible area, the processor 1704 according to another embodiment of the present invention may perform control to transmit a notification for notifying the user that the vehicle has deviated from the service possible area to the server 1800 for providing a service through the communication unit 1702, and perform control to delete the vehicle hailing application and/or an autonomous parking application downloaded from the server 1800 for providing a service and stored in the storage unit 1708.

In addition, the storage unit 1708 of the user terminal apparatus 1700 may store at least one data of an application for an autonomous parking service and/or a vehicle hailing service, a route guidance application, map data, and user payment information.

When a user gesture for the autonomous parking service application displayed through the display unit 1706 is input, the processor 1704 may perform an operation corresponding to the user gesture. For example, when a selection gesture for selecting an autonomous parking service providing parking lot and parking slot is input from the user through an user experience (UX) of the display unit 1706, the processor 1704 may transmit an autonomous parking service request including a vehicle ID, a parking lot ID, and a parking slot ID to the server 1800 for providing a service through the communication unit 1702. In this case, the parking lot ID is information for identifying a parking lot supporting the autonomous parking service, and location information of the corresponding parking lot may also be mapped and stored in the storage unit 1806.

Through this process, in another embodiment of the present invention, it is also possible for the user to reserve a space in which the vehicle is to be autonomously parked in the parking lot through the user terminal apparatus 1700. In addition, when parking is impossible for the parking lot ID included in the autonomous parking service request and the parking spot ID of the parking lot ID, the server 1800 for providing a service may transmit a parking impossible message to the user terminal apparatus 1700 or transmit another parking possible parking lot ID and/or parking possible slot ID to the user terminal apparatus 1700. The user terminal apparatus 1700 may visually display a parking slot corresponding to a parking possible slot ID, a parking slot corresponding to a parking impossible slot ID, and the like, on an autonomous parking service providing application through the display unit 1706.

In the present specification, the parking lot ID is information given in order to identify a parking lot, and may be set to be mapped to location information on a location at which a parking lot is located, and the parking slot ID is information for identifying a plurality of parking slots included in a corresponding parking lot, and may be set to be mapped to relative location information of each parking slot.

Figure 18:
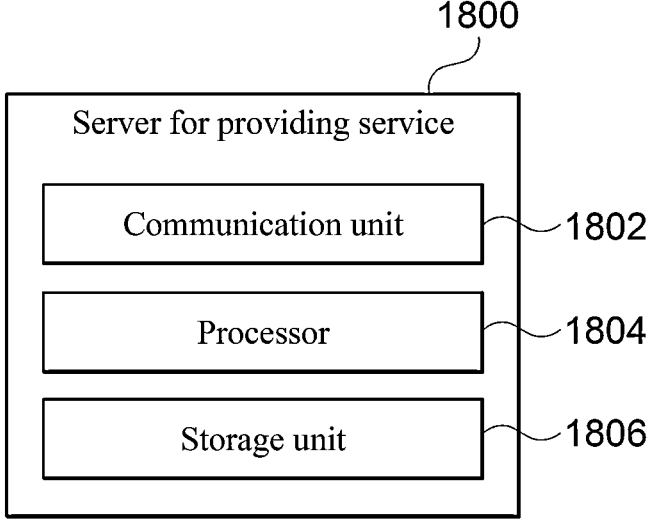
FIG. 18 is a block diagram of a server for providing a service according to another embodiment of the present invention.

FIG. 18 is a block diagram of a server 1800 for providing a service according to another embodiment of the present invention.

The server 1800 for providing a service according to another embodiment of the present invention includes a communication unit 1802, a processor 1804, and a storage unit 1806. The communication unit 1802 of the server 1800 for providing a service according to another embodiment of the present invention is connected to and transmits and receives data to and from the autonomous driving system 1600 and/or the user terminal apparatus 1700 through a wireless network.

The processor 1804 of the server 1800 for providing a service according to another embodiment of the present invention confirms a parking possible area when a parking lot empty space request message is received from the autonomous driving system 1600 through the communication unit 1802, and transmits location information of the parking possible area and digital map data of the parking lot to the autonomous driving system through the communication unit 1802 when the parking possible area is confirmed. At this time, the processor 1804 of the server 1800 for providing a service confirms a parking possible area through parking lot images obtained from a closed circuit television (CCTV) located in the parking lot and image capturing apparatuses of vehicles parked in the parking lot, a parking lot model generated in order to represent a real-time situation of the parking lot, and sensor information obtained from sensors located in parking slots. Specifically, empty parking slots in the parking lot and parking slots in which vehicles are parked may be distinguished from each other through analysis of parking lot images obtained from the CCTV located in the parking lot and an image capturing apparatus of a parked vehicle. In addition, sensors installed in each parking slot within the parking lot may sense whether or not a vehicle has been parked in the corresponding parking slot, and the processor 1804 of the server 1800 for providing a service may identify empty parking slots in the parking lot and parking slots in which the vehicles are parked using the sensed information. In addition, the processor 1804 of the server 1800 for providing a service according to another embodiment of the present invention may include the confirmed parking possible area in a parking lot empty space response message and then transmit the parking lot empty space response message to the autonomous driving system 1600 or the user terminal apparatus 1700 through the communication unit 1802. In addition, when a parking completion message is received from the autonomous driving system 1600, the processor 1802 transmits the parking completion message to the user terminal apparatus 1700 through the communication unit 1802.

When a vehicle hailing service request is received from the user terminal apparatus 1700 through the communication unit 1802, the processor 1804 of the server 1800 for providing a service according to another embodiment of the present invention searches for a parking location corresponding to a vehicle identifier (VID) in the parking lot, transfers the vehicle hailing service request to an autonomous driving system 1600 of a vehicle parked at the transmits information searched parking location, and received as a response to the vehicle hailing service from the autonomous driving system 1600 to the user terminal apparatus 1700.

The processor 1804 of the server 1800 for providing a service according to another embodiment of the present invention stores a location of a parking lot providing an autonomous parking service, map data, a parking lot model representing a real-time situation of the parking lot, parking lot data, a parking lot image, and parking space information in the storage unit 1806. In addition, when the vehicle of the user who has requested the vehicle hailing service and the autonomous parking service deviates from the service possible area, the processor 1804 of the server 1800 for providing a service according to another embodiment of the present invention deletes a vehicle ID, a user ID, and related information stored in the storage unit 1806.

When autonomous parking service requests are received from a plurality of user terminal apparatuses 1700 through the communication unit 1802, the processor 1804 of the server 1800 for providing a service may schedule an order in which the autonomous parking services of the respective vehicles are to be performed, and transmit an autonomous parking service response for each vehicle according to the scheduled order.

In addition, when an autonomous parking service request message is received from the user terminal apparatus 1700, the processor 1804 of the server 1800 for providing a service according to another embodiment may retrieve parking lot ID and parking slot ID information included in the autonomous parking service request message from the map data stored in the storage unit 1806, and transmit location information of the retrieved parking lot ID and location information of the retrieved parking slot ID to the autonomous driving system 1600 to cause the autonomous driving system 1600 to perform autonomous driving and/or autonomous parking to the corresponding parking lot location.

The processor 1804 of the server 1800 for providing a service according to another embodiment of the present invention may store parking lot-related information in the form illustrated in the following Table 1 in the storage unit 1806 in order to provide the autonomous parking service.

TABLE 1

| Field | Parking lot ID | Floor | Parking Slot ID | Parking slot state | Parking Time | Parking Date | Fare | User ID | Vehicle ID |
|-------|----------------|-------|-----------------|--------------------|--------------|--------------|------|---------|------------|
| 1 | 69 | B3 | 74 | Full | 1 hour | Sep. 30, 2020 | ₩4,000 | tkhan | 03H3394 |
| ... | ... | ... | ... | ... | ... | ... | ... | ... | ... |
| | 80 | 1st Floor | 84 | Empty | — | — | — | — | — |
| | 42 | B2 | 34 | Reserved | — | — | — | kimkim | 09A2413 |

The processor 1804 of the server 1800 for providing a service according to another embodiment of the present invention may store a database having the form as illustrated in the above Table 1 in the storage unit 1806 in order to provide the autonomous parking service, and update data of the database whenever a parked state of a vehicle for a corresponding parking slot is changed.

For example, when the autonomous parking service request message is received from the user terminal apparatus 1700, the processor 1804 of the server 1800 for providing a service retrieves information on a parking possible lot and parking slots from the database, and then transmits the retrieved parking lot ID, parking slot ID, and corresponding location information to the autonomous driving system 1600 of the vehicle connected to the user terminal apparatus 1700. In addition, when it is confirmed that the vehicle has entered the parking lot for autonomous parking and confirms that parking has been completed in the parking slot, the processor 1804 of the server 1800 for providing a service changes parking slot state information to Full, and updates a parking time, a parking date, fee information, user ID, and vehicle ID information.

On the other hand, when a vehicle hailing request from the user terminal apparatus 1800 for the autonomously parked vehicle is received, the processor 1804 of the server 1800 for providing a service updates a data field of the above Table 1 stored in the database. For example, when the vehicle is changed to an autonomous driving state and then deviates from the parking slot, the processor 1804 changes the parking slot state to Empty, and initializes the parking time, the parking date, the parking fee information, and the like, for the corresponding parking slot when the user pays a parking fee.

On the other hand, when a parking slot in which the autonomous vehicle is to be parked is selected from the user terminal apparatus 1700, the processor 1804 of the server 1800 for providing a service may change the selected parking slot ID field in the database to a reserved state and update user ID and vehicle ID fields to prevent the autonomous parking service for a duplicate parking slot ID from being provided to other users.

Figure 19:
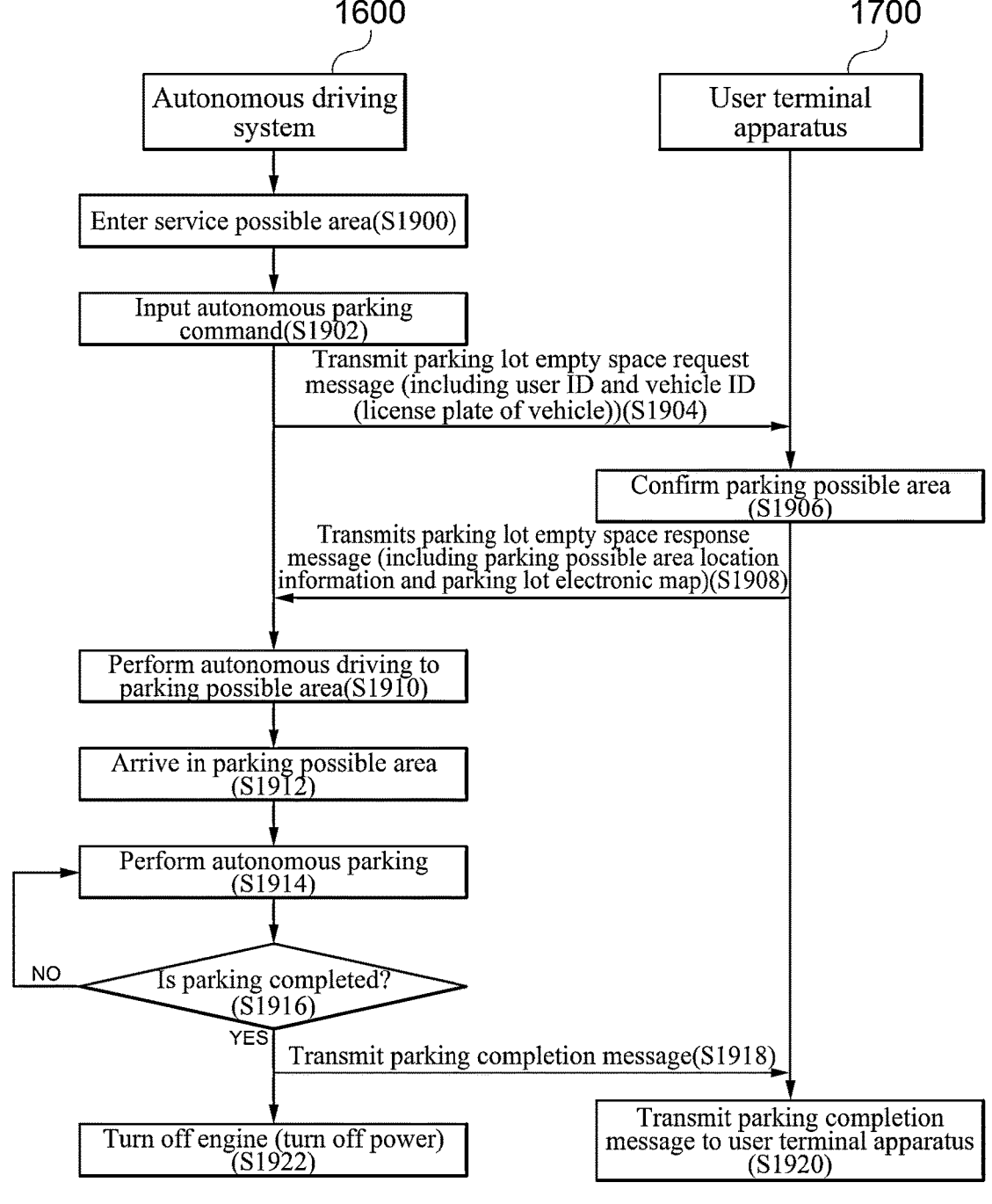
FIG. 19 is a flowchart for describing a flow of operations of an autonomous parking system according to another embodiment of the present invention.

FIG. 19 is a flowchart for describing a flow of operations of an autonomous parking system according to another embodiment of the present invention.

First, when the vehicle enters the service possible area (S1900) and an autonomous parking command is input from the user (S1902), the autonomous driving system 1600 transmits a parking lot empty space request message to the server 1800 for providing a service (S1904). In this case, the parking lot empty space request message may include a user ID and a vehicle ID requesting the autonomous parking service. In this case, the user ID may include information that may identify the user, such as an ID subscribed to the autonomous parking service or a social security number, and the vehicle ID may include information that may identify the vehicle, such as a license plate of the vehicle or a vehicle identification number (VIN).

In addition, the server 1800 for providing a service which has received the parking lot empty space request message confirms a parking possible area in the parking lot in which the vehicle is to be parked (S1906), and transmits a parking lot empty space response message to the autonomous driving system 1600 (S1908). In this case, the parking lot empty space response message may include parking possible area location information and a parking lot electronic map. In the confirming (S1906) of the parking possible area by the server 1800 for providing a service, parking possible states for each parking slot may be identified through an image obtained from a CCTV installed in the parking lot, images obtained from image capturing apparatuses installed in vehicles parked in respective parking slots of the parking lot, and sensed data sensed by sensors installed in the respective parking slots.

The autonomous driving system 1600 which has received the parking lot empty space response message in S1908 calculates a route from a current location of the vehicle to the confirmed parking possible area location information, and then performs autonomous driving to the parking possible area (S1910).

Then, when the vehicle arrives in the parking possible area (S1912), the autonomous driving system 1600 performs autonomous parking (S1914), transmits a parking completion message to the server 1800 for providing a service (S1918) when the parking is completed ("Yes" in S1916), and turns off an engine of the vehicle or turns off power of the vehicle (S1922). In this case, the parking completion message may include location information on a location at which the vehicle is parked and time information on a time when the vehicle is parked.

The server 1800 for providing a service that has received the parking completion message in S1918 transmits the parking completion message to the user terminal apparatus 1700 (S1920).

Figure 20:
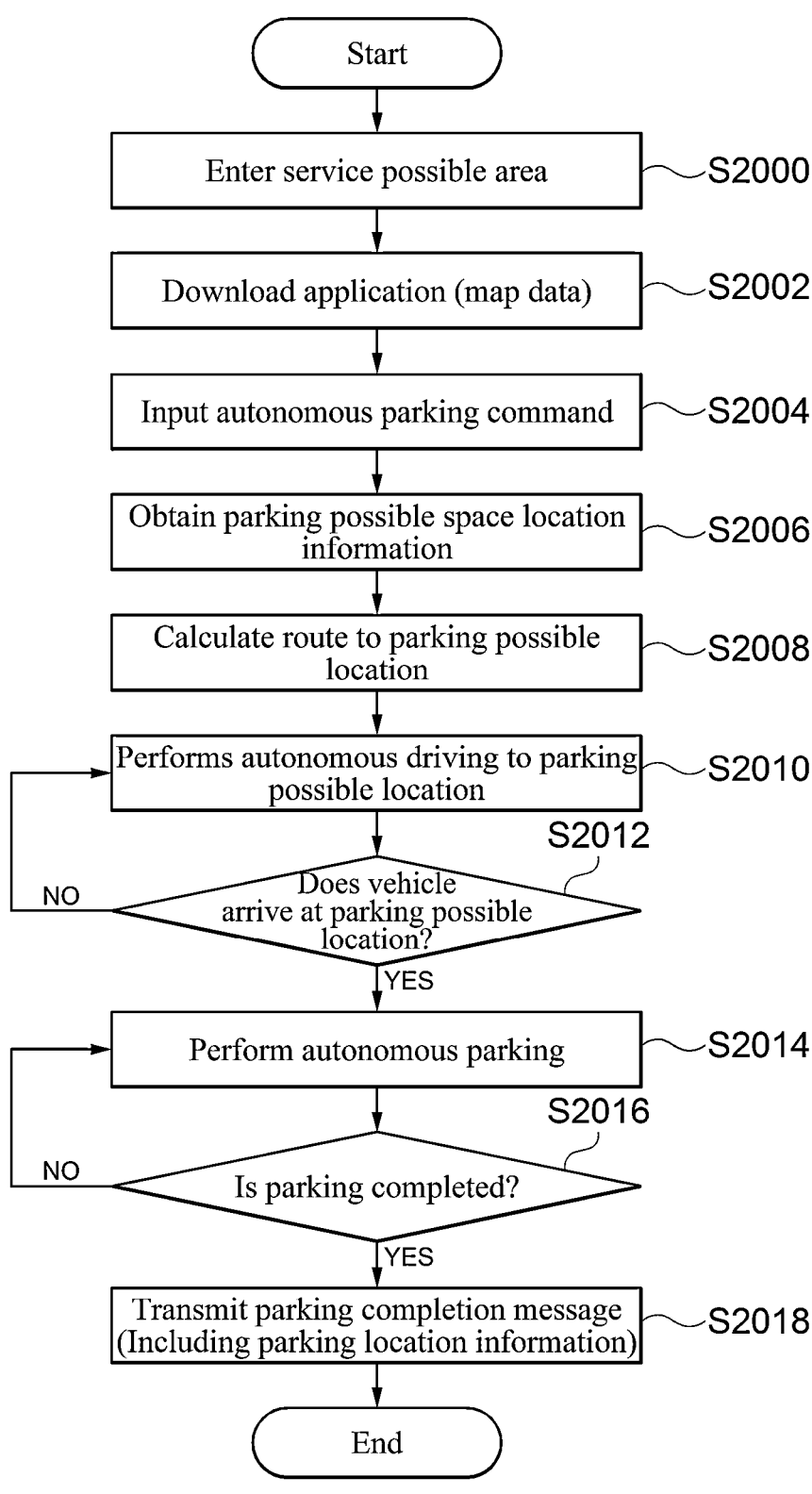
FIG. 20 is a flowchart for describing a flow of autonomous parking operations of a user terminal apparatus according to another embodiment of the present invention.

FIG. 20 is a flowchart for describing a flow of autonomous parking operations of the user terminal apparatus 1700 according to another embodiment of the present invention.

First, when the vehicle enters a service possible area (S2000), the user terminal apparatus 1700 downloads an application for providing an autonomous parking service from the server for providing a service (S2002). In this case, when the user terminal apparatus 1700 downloads the application, the user terminal apparatus 1700 may also download map data for a parking lot. Then, when an autonomous parking command is input from the user (S2004), the user terminal apparatus 1700 obtains parking possible space location information (S2006), calculates a route from a current location of the vehicle on the map data to a location of the obtained parking possible space (S2008), and performs autonomous driving to the parking possible location according to the calculated route (S2010). When the autonomous vehicle arrives at the parking possible location ("Yes" in S2012), the user terminal apparatus 1700 performs autonomous parking (S2014), and transmits a parking completion message to the server for providing a service (S2018) when the parking is completed ("Yes" in S2016). In this case, the parking completion message may include parking location information and parking completion time information. In this case, the parking location information may also include a parking lot ID, a parking lot location, and a parking slot (parking space) ID, and location information of the parking slot.

Figure 21:
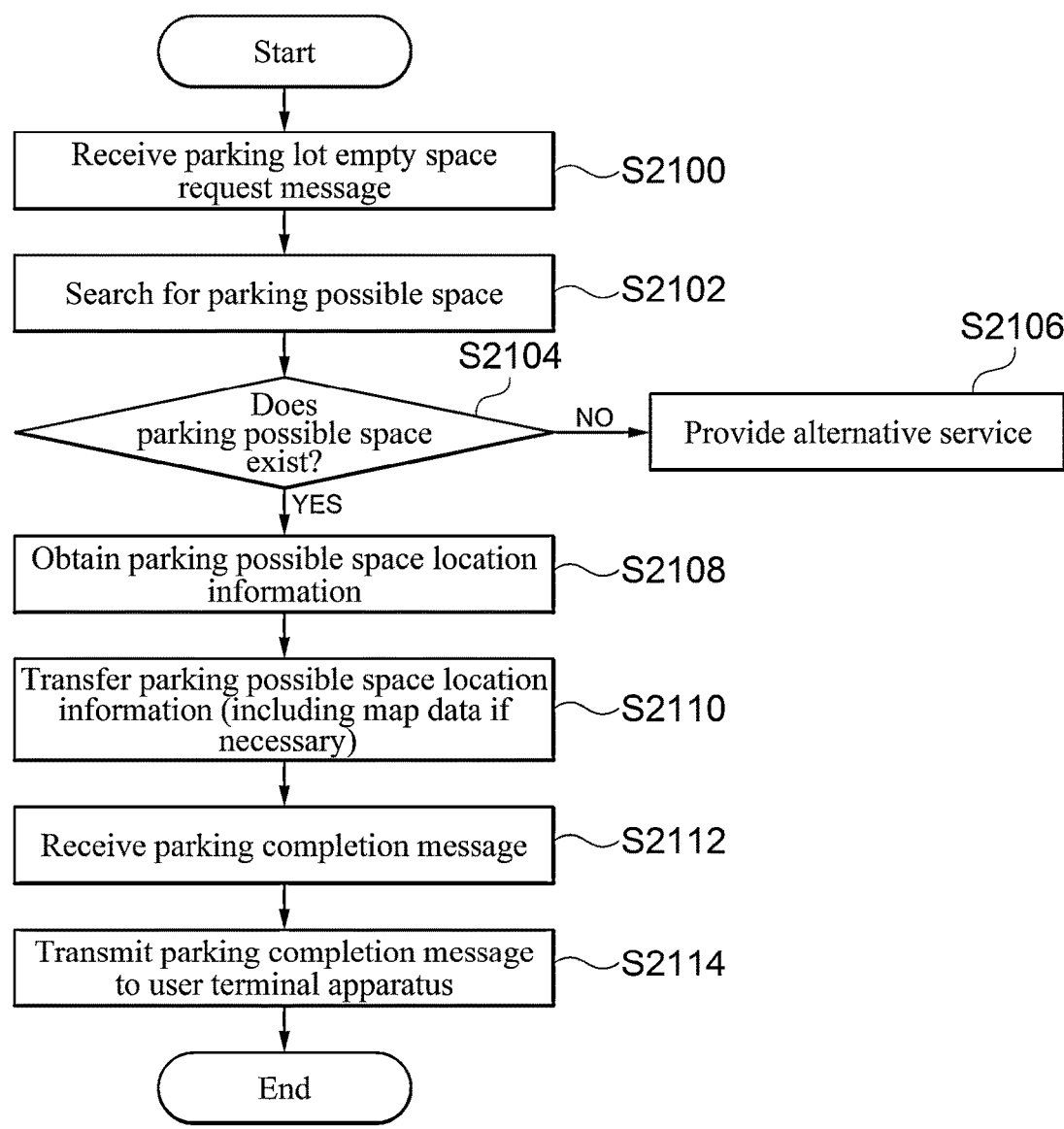
FIG. 21 is a flowchart for describing a flow of autonomous parking operations of a server for providing a service according to another embodiment of the present invention.

FIG. 21 is a flowchart for describing a flow of autonomous parking operations of the server 1800 for providing a service according to another embodiment of the present invention.

First, when a parking lot empty space request message is received (S2100), the server 1800 for providing a service searches for a parking possible space (S2102). When the parking possible space exists as a search result ("Yes" in S2104), the server 1800 for providing a service obtains parking possible space location information (S2108), and when the parking possible space does not exist ("No" in S2104), the server 1800 for providing a service provides an alternative service (S2106). In this case, the alternative service includes a function of searching for and guiding a nearby parking lot location and parking possible space or notifying the user that there is no parking possible space.

Then, the server 1800 for providing a service transfers the parking possible space location information to the autonomous driving system 1600 (S2110), and transmits a parking completion message to the user terminal apparatus 1700 (S2114) when the parking completion message is received from the autonomous driving system 1600 (S2112).

Figure 22A:
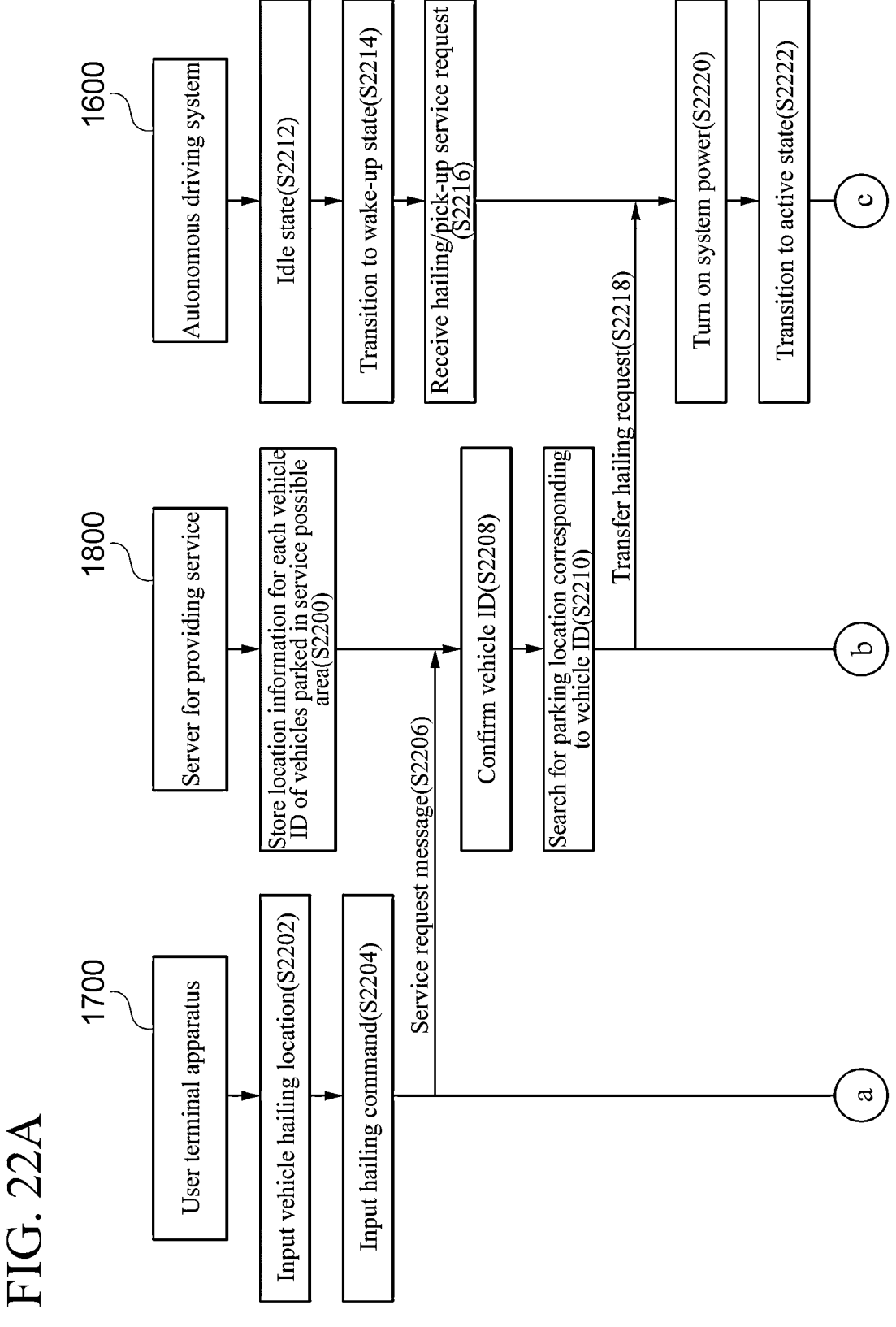
Figure 22B:
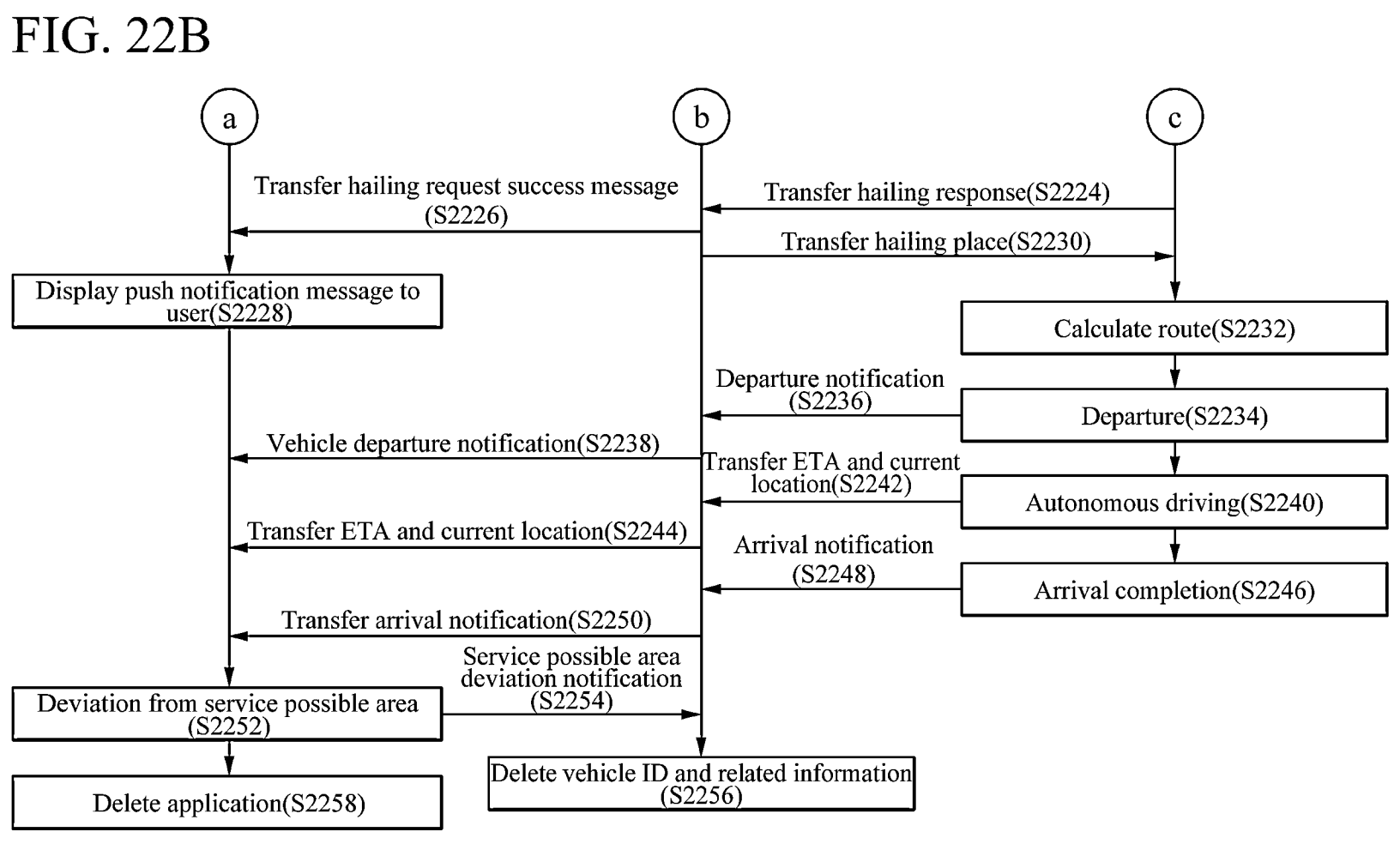

FIGS. 22A and 22B are flowcharts for describing a flow of operations for providing a vehicle hailing service or a passenger pick-up service of an autonomous driving system according to another embodiment of the present invention.

First, the server 1800 for providing a service stores location information for each vehicle ID of vehicles parked in a service possible area (S2200). Then, when a vehicle hailing location is input from a user (S2202) and a vehicle hailing command is input from the user (S2204), the user terminal apparatus 1700 transmits a vehicle hailing service request message to the server 1800 for providing a service (S2206). The server 1800 for providing a service that has received the vehicle hailing request message in S2206 confirms a vehicle ID (ID of a target vehicle to be hailed) included in the vehicle hailing request message (S2208), searches for a parking location corresponding to the confirmed vehicle ID (S2210) when it is identified that the vehicle ID is a vehicle of a user who is a vehicle hailing service providing target, and transfers a hailing request to the autonomous driving system 1600 of the hailed vehicle (S2218).

Then, the autonomous driving system 1600 transitions from an idle state (step S2212) to a wake-up state (S2214). In this case, the transition from the idle state to the wake-up state may occur per predetermined period or at a predetermined time. The reason why the autonomous driving system 1600 transitions from the idle state to the wake-up state whenever necessary is to save power of a battery of the vehicle. The processor 1608 of the autonomous driving system 1600 transitioning to the wake-up state in S2214 may supply power to the communication unit 1612 to demodulate/decode signals transmitted to the autonomous driving system 1600. In addition, the autonomous driving system 1600 checks whether a vehicle hailing service/passenger pick-up service request is received (S2216), turns on system power of the vehicle (S2220) when the hailing request message is received in S2218, and then transitions to an active state (S2222). When the autonomous driving system 1600 transitions to the active state in S2222, the autonomous driving system 1600 supplies operating power for driving each part of the vehicle for autonomous driving of the vehicle, and generates a control command for vehicle control.

The autonomous driving system 1600 transitioning to the active state in S2222 transmits a vehicle hailing response message to the server 1800 for providing a service (S2224), and the server 1800 for providing a service transmits a vehicle hailing request success message to the user terminal apparatus 1700 as response to the vehicle hailing service request message in S2206 (S2226). The user terminal apparatus 1700 receiving the vehicle hailing request success message in S2226 displays a push notification message notifying the user that the vehicle hailing has been successful (S2228).

Then, the server 1800 for providing a service that has transmitted the vehicle hailing request success message to the user terminal apparatus 1700 in S2226 transfers a message including hailing place information to the autonomous driving system 1600 (S2230). The autonomous driving system 1600 calculates a route for autonomous driving to the hailing place (S2232), and transmits a departure notification message to the server 1800 for providing a service (S2236) when the vehicle starts to be driven (S2234).

The server 1800 for providing a service transmits a vehicle departure notification message to the user terminal apparatus 1700 (S2238), and the server 1800 for providing a service transfers estimated time of arrival (ETA) information and current location information of the vehicle to the user terminal apparatus 1700 (S2244) when an ETA and current location information transmitted by the autonomous driving system 1600 while the autonomous driving system 1600 performs autonomous driving (S2240) is transferred (S2242).

Then, when the vehicle arrives at the hailing location (S2246), the autonomous driving system 1600 transfers an arrival notification to the server 1800 for providing a service (S2248), and the server 1800 for providing a service transfers the arrival notification to the user terminal apparatus 1700 (S2250).

In addition, when the vehicle deviates from a service possible area (S2252), the user terminal apparatus 1700 transmits a service possible area deviation message to the server 1800 for providing a service (S2254), the server 1800 for providing a service deletes a vehicle ID and related information included in the service possible area deviation message (S2256), and the user terminal apparatus 1700 may automatically delete a vehicle hailing service application (S2258).

On the other hand, it has been described that S2252, S2254, and S2258 are performed by the user terminal apparatus 1700 in FIGS. 22A and 22B, but S2252, S2254, and S2258 may also be performed by the autonomous driving system 1600 of the vehicle.

Figure 23:
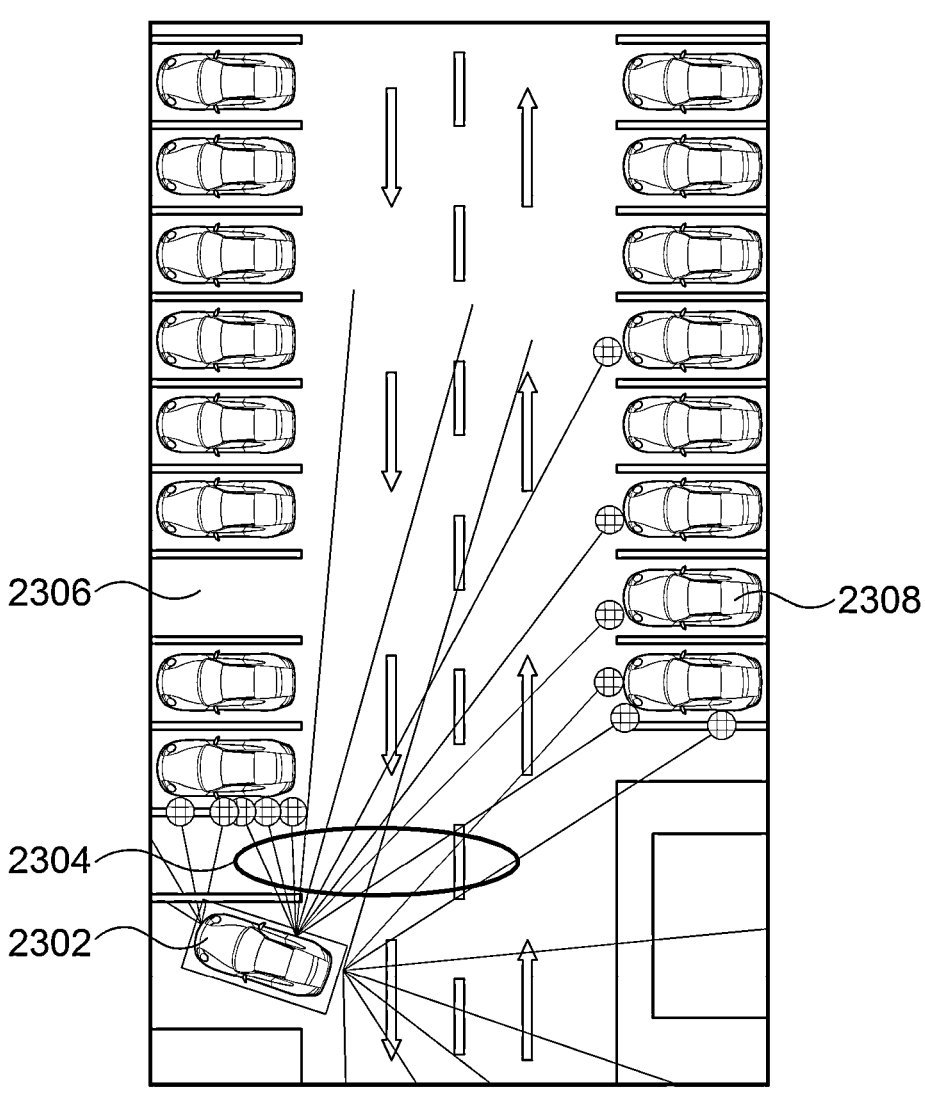
FIG. 23 is a view for describing a process in which an autonomous driving system of a vehicle performs autonomous parking according to another embodiment of the present invention.

FIG. 23 is a view for describing a process in which an autonomous driving system of a vehicle performs autonomous parking according to another embodiment of the present invention.

An autonomous driving system of a vehicle 2302 recognizes the existence of a parking possible space 2306 and a parked vehicle 2308 by data 2304 sensed by the sensors 1602 attached to the vehicle 2302 and a deep learning result by learning of the deep learning network 1606, and then performs autonomous parking to the parking possible space.

Figure 24:
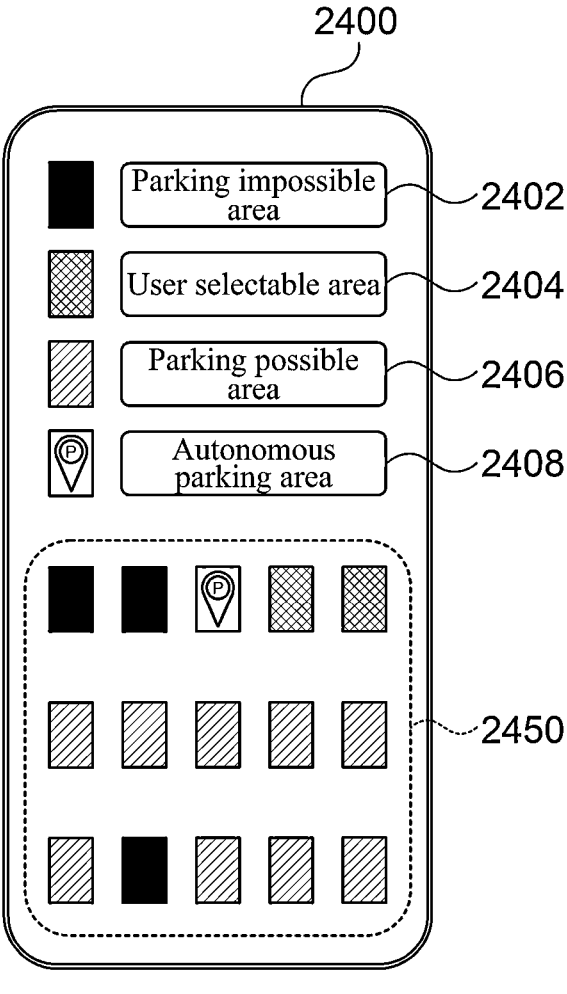
FIG. 24 is a view illustrating a UX screen displayed on a user terminal apparatus when an autonomous parking system of the vehicle performs autonomous parking according to another embodiment of the present invention.

FIG. 24 is a view illustrating a UX screen 2400 displayed on the user terminal apparatus 1700 when an autonomous parking system of the vehicle performs autonomous parking according to another embodiment of the present invention.

In FIG. 24, reference number 2402 denotes an area where parking is impossible due to parking of other vehicles, or the like, in a parking lot in which the vehicle is to perform autonomous parking, reference number 2404 denotes an autonomous parking area selectable by a user, reference number 2406 denotes an empty space area in which parking is possible, and reference numeral 2408 denotes an area in which the vehicle is autonomously parked.

Reference number 2450 is a screen visually showing a parking space in which the vehicle has completed autonomous parking in the parking lot. An area denoted by reference number 2450 may move and display the parking space of the parking lot on the display unit 1706 of the user terminal apparatus 1700 according to a user's touch gesture (drag, pinch-to-zoom, etc.).

In addition, the processor 1704 of the user terminal apparatus 1700 according to another embodiment of the present invention may transmit a parking lot ID and a parking slot ID corresponding to the parking area selected by the user through the display unit 1706 to the server 1800 for providing a service through the communication unit 1702.

FIG. 25 is a view illustrating an example of a push notification or a push message displayed on a user terminal apparatus 1700 of a user using an autonomous parking service/vehicle hailing service of a vehicle according to another embodiment of the present invention.

Reference numeral 2502 is a view illustrating a message for receiving an autonomous parking service request function, and when the user selects the message through a touch gesture, the user terminal apparatus transmits an autonomous parking service request message to the server for providing a service.

Reference numeral 2504 is a view illustrating a message notifying the user that autonomous parking of the vehicle in the parking lot by a request of the user has been completed and a space location at which the vehicle is parked in a text form. In addition, a push notification displayed in the text form of reference number 2504 may be linked to a hyperlink capable of displaying a location at which the vehicle is parked on a map. That is, when the user selects a push notification message of reference number 2504 indicating a location at which the vehicle is parked, the processor 1704 of the user terminal apparatus 1700 may display a location at which the vehicle is parked on the map data in a symbol form while running a map data application.

Reference numeral 2506 is a view illustrating that selection of the hailing location has been completed while displaying a hailing location on the map when a vehicle hailing location is selected on the map by a request of the user. The vehicle hailing location of reference number 2506 may be moved on the map by a user's touch gesture.

FIG. 26 is a view illustrating an example of a push notification or a push message displayed on a user terminal apparatus 1700 of a user using an autonomous parking service of a vehicle according to another embodiment of the present invention.

Reference numeral 2602 is a view for describing a message displayed on the user terminal apparatus 1700 when a user hails a parked vehicle, and when the user selects a parked vehicle hailing message 2602a, the user terminal apparatus 1700 sends a vehicle hailing request message to the server for providing a service. In addition, the user terminal apparatus 1700 may display a parked vehicle hailing completion message 2602b, a vehicle departure notification message 2602c, an ETA and movement information display message 2602d, and an arrival notification message 2602e.

Reference numeral 2604 is a view in which the user terminal apparatus 1700 displays a message 2604a notifying the user that the vehicle has deviated from a service possible area and a vehicle hailing application deletion message 2604b that may be used only in a designated service possible area. When the application deletion message 2604b is selected by a request of the user, the corresponding application is deleted.

Reference numeral 2606 is a view in which the user terminal apparatus 1700 displays a message 2606a for displaying a parking time and a parking fee, a payment progress message 2606b, and a discount rate application notification message 2606c. In order for the user to be applied with a discount rate for the parking fee, the user may input a QR code through a camera of the user terminal apparatus 1700 or input a discount code through an input unit of the user terminal apparatus 1700.

Figure 27:
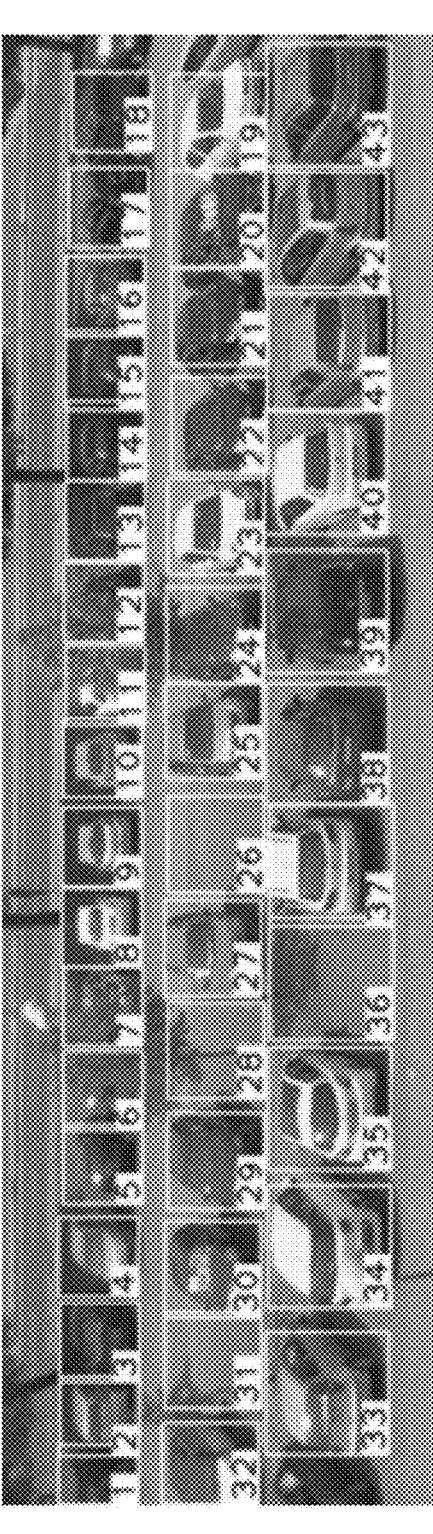
FIG. 27 is a view for describing an example in which a server for providing an autonomous parking service identifies a parking possible space through deep learning analysis when an autonomous parking service of a vehicle is requested according to another embodiment of the present invention.

FIG. 27 is a view for describing an example in which the server 1800 for providing a service identifies a parking possible space through deep learning analysis when an autonomous parking service of a vehicle is requested according to another embodiment of the present invention.

When a parking lot image is input through an image obtaining apparatus such as a CCTV located in a parking lot, the server 1800 for providing a service identifies parking slots of a parking lot through analysis of the parking lot image through deep learning according to another embodiment of the present invention, and determines whether or not vehicles have been parked for each identified parking slot. In FIG. 27, Nos. 1 to 43 are parking slot IDs assigned to each parking slot, and the server 1800 for providing a service may recognize parking lines marked on a road from the obtained parking lot image, and identify the parking slots through a recognized result. In addition, the server 1800 for providing a service may identify a parking space in which a vehicle requesting autonomous parking may be parked by additionally analyzing whether or not a vehicle learned through deep learning is located in each parking slot. In FIG. 27, parking slots of Nos. 26, 31, and 36 may be determined as parking possible locations.

In addition, the server 1800 for providing a service may transmit a parking lot ID of a parking lot determined as a parking lot in which the vehicle may be parked, location information of the parking lot, and a parking slot ID in the parking lot ID to the autonomous driving system 1600. The parking lot ID of the parking lot determined as the parking lot in which the vehicle may be parked, the location information of the parking lot, and the parking slot ID in the parking lot ID may be included in parking possible information. Then, after the parking possible information is transmitted to the autonomous driving system 1600, the server 1800 for providing a service sets the parking slot ID of the parking lot ID included in the transmitted parking possible information to parking reservation completion to prevent a duplicate service by not providing the service even though a parking service provision request using the corresponding parking slot ID is received from another vehicle.

In addition, when the vehicle deviates from the parking lot, the server 1800 for providing a service updates vehicle parking state information of the parking slot by resetting a parking slot ID of the parking slot in which the vehicle was parked to an empty space.

Meanwhile, in the specification and the claims, terms such as "left", "right", "front", "rear", "top", "bottom", "over", "under", and the like, do not necessarily indicate relative locations that are not changed, but are used for explanation. It will be understood that these terms compatible with each other under an appropriate are environment so that embodiments of the present invention set forth herein may be operated in a direction different from a direction illustrated or described herein. A term "connected" used herein is defined as being directly or indirectly connected in an electrical or non-electrical manner. Here, targets described as being "adjacent to" each other may be in physical contact with each other, be physically close to each other, or be in the same general range or region, in the context in which the above phrase is used. Here, a phrase "in an embodiment" means the same embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

On the other hand, it is to be understood that when one component is referred to as being "connected directly to" or "coupled directly to" another component, it may be connected to or coupled to another component without the other component interposed therebetween.

In addition, terms "module" and "unit" for components used in the present specification are used only in order to easily make the specification. Therefore, these terms do not have meanings or roles that distinguish from each other in themselves.

In addition, terms used in the present specification are for describing embodiments rather than limiting the present invention. Singular forms used in the present specification include plural forms unless the context clearly indicates otherwise. In the present application, the terms "comprising" or "including", and the like, are not to be construed as necessarily including several components or several steps described in the specification, and it is to be construed that some of the above components or steps may not be included or additional components or steps may be further included.

Hereinabove, the present invention has been described with reference to embodiments. All embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, embodiments disclosed herein should be considered in an illustrative aspect rather than a restrictive aspect. The scope of the present invention should be defined by the claims rather than the abovementioned description, and equivalents to the claims should be interpreted to fall within the present invention.

Meanwhile, the method for providing a parking lot guidance service according to various embodiments of the present invention described above may be implemented as programs and be provided to servers or devices. Therefore, the respective apparatuses may access the servers or the devices in which the programs are stored to download the programs.

In addition, the method for providing a parking lot guidance service according to various embodiments of the present invention described above may be implemented as programs and be provided in a state in which it is stored in various non-transitory computer-readable media. The non-transitory computer readable medium is not a medium that stores data for a while, such as a register, a cache, a memory, or the like, but means a medium that semi-permanently stores data and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to the present invention, it: is possible to generate a parking lot model representing a real-time situation of a parking lot using an image captured by the image capturing apparatus for a vehicle and provide a parking lot guidance service to a user using the generated 3D model.

In particular, according to the present invention, even though a parking control system is not provided in the parking lot, it is possible to provide a real-time parking situation service.

In addition, according to the present invention, it is possible to shorten a parking time of a user and improve parking convenience of the user by providing a parking possible location guidance service such as a parking possible area of a parking lot, the number of parking possible floors, and a parking possible space to a user who wants to park a vehicle.

Further, according to the present invention, it is possible to help a user to find a parked vehicle more conveniently by providing a vehicle parking location guidance service to a user who wants to find the parked vehicle.

Further, according to the present invention, it is possible to improve convenience of a user by providing a parking lot route guidance service from a parking location of a vehicle to a destination (e.g., an exit of a parking lot, etc.).

Further, according to the present invention, it is possible to provide more detailed information on a parking impact situation to a user by providing information regarding the parking impact situation based on an image captured by another vehicle located in the surrounding of a parked vehicle when an impact event occurs in the parked vehicle.

Furthermore, according to the present invention, it is possible to provide an own vehicle location confirmation service using an image capturing apparatus for a vehicle of a third party even without a physically fixed closed circuit television (CCTV) by securing real-time image data using an image capturing apparatus of a vehicle parked in a specific area.

Although the embodiments of the invention have been illustrated and described hereinabove, the invention is not limited to the specific embodiments described above, but may be variously modified by those skilled in the art to which the invention pertains without departing from the scope and spirit of the invention as claimed in the claims. These modifications should also be understood to fall within the technical spirit and scope of the invention.

51

What is claimed is:

1. A method of operating an autonomous parking system, the method comprising:

transmitting, by an autonomous driving system, a parking lot empty space request message to a service providing server;

confirming, by the service providing server, a parking possible area in a parking lot where a vehicle to be parked, and transmitting a parking lot empty space response message to the autonomous driving system;

performing, by the autonomous driving system, autonomous driving from the current location of the vehicle to the parking possible area based on the parking lot empty space response message; and performing, by the autonomous driving system, autonomous parking when the vehicle arrives at the parking possible area.

2. The method of claim 1, wherein the parking lot empty space request message includes at least one of a user ID and a vehicle ID requesting autonomous parking service.

3. The method of claim 1, wherein the parking lot empty space response message includes location information of the parking possible area and digital map data of the parking lot.

4. The method of claim 1, wherein the confirming, by the service providing server, including:

identifying parking possible states for each parking slot through at least one of an image obtained from a CCTV installed in the parking lot, an image obtained from image capturing apparatuses installed in vehicles parked in respective parking slots of the parking lot, and sensor data sensed by sensors installed in the respective parking slots.

5. The method of claim 1, further including:

transmitting, by the autonomous driving system, a parking completion message to the service providing server when the autonomous parking is completed.

6. The method of claim 5, wherein the parking completion message includes at least one of parking location information, parking time information, and wake-up time information of the autonomous driving system.

7. The method of claim 4, further including:

turning off an engine of the vehicle or turning off a power of a battery of the vehicle, by the autonomous driving system, after transmitting the parking completion message.

8. The method of claim 1, further including:

searching for and providing, by the service providing server, guidance on nearby parking lot location and parking possible area when there is no parking possible area.

9. The method of claim 1, wherein the performing, by the autonomous driving system, the autonomous parking including:

recognizing an existence of the parking possible area and a parked vehicle by data sensed by sensors attached to the vehicle and a deep learning result by learning of the deep learning network.

10. The method of claim 1, further including:

transmitting, by a user terminal apparatus, an autonomous parking service request when an input for selecting an autonomous parking service providing parking lot and parking slot is received from a user of the user terminal device.

11. The method of claim 1, displaying, by a user terminal apparatus, an interface screen visually showing a parking space in which the vehicle has completed autonomous parking in the parking lot.

12. An autonomous parking system comprising:

an autonomous driving system transmitting a parking lot empty space request message to a service providing server; and a service providing server confirming a parking possible area in a parking lot where a vehicle to be parked, and transmitting a parking lot empty space response message to the autonomous driving system, wherein the autonomous driving system performs autonomous driving from the current location of the vehicle to the parking possible area based on the parking lot empty space response message and performs autonomous parking when the vehicle arrives at the parking possible area.

13. The autonomous parking system of claim 12, wherein the service providing server identifies parking possible states for each parking slot through at least one of an image obtained from a CCTV installed in the parking lot, an image obtained from image capturing apparatuses installed in vehicles parked in respective parking slots of the parking lot, and sensor data sensed by sensors installed in the respective parking slots.

14. The autonomous parking system of claim 12, wherein the autonomous driving system transmits a parking completion message to the service providing server when the autonomous parking is completed.

15. The autonomous parking system of claim 14, wherein the parking completion message includes at least one of parking location information, parking time information, and wake-up time information of the autonomous driving system.

16. The autonomous parking system of claim 12, wherein the service providing server searches for and provides guidance on nearby parking lot location and parking possible area when there is no parking possible area.

17. The autonomous parking system of claim 12, wherein the autonomous driving system recognizes an existence of the parking possible area and a parked vehicle by data sensed by sensors attached to the vehicle and a deep learning result by learning of the deep learning network, and autonomously parks in the parking possible space.

18. The autonomous parking system of claim 12, further including:

a user terminal apparatus transmitting an autonomous parking service request when an input for selecting an autonomous parking service providing parking lot and parking slot is received from a user.

19. The autonomous parking system of claim 12, further including:

a user terminal apparatus displays an interface screen visually showing a parking space in which the vehicle has completed autonomous parking in the parking lot.

20. A non-transitory computer readable storage medium containing instructions, that when executed by one or more processors, cause the one or more processors to perform a method, the method comprising:

transmitting, by an autonomous driving system, a parking lot empty space request message to a service providing server;

confirming, by the service providing server, a parking possible area in a parking lot where a vehicle to be parked, and transmitting a parking lot empty space response message to the autonomous driving system;

performing, by the autonomous driving system, autonomous driving from the current location of the vehicle to the parking possible area based on the parking lot empty space response message; and performing, by the autonomous driving system, autonomous parking when the vehicle arrives at the parking possible area.

* * * * *